US007998234B2

(12) United States Patent
Hwang et al.

(10) Patent No.: US 7,998,234 B2
(45) Date of Patent: Aug. 16, 2011

(54) VACUUM CLEANER WITH REMOVABLE DUST COLLECTOR, AND METHODS OF OPERATING THE SAME

(75) Inventors: Man Tae Hwang, Changwon-si (KR); Hae Seock Yang, Changwon-si (KR); Hoi Kil Jeong, Changwon-si (KR); Myung Sig Yoo, Changwon-si (KR); Jae Kyum Kim, Kimhae-si (KR); Moo Hyun Ko, Moonkyung-si (KR); Kie Tak Hyun, Changwon-si (KR); Jong Su Choo, Busan-si (KR); Young Bok Son, Changwon-si (KR); Kyeong Seon Jeong, Changwon-si (KR); Min Park, Busan-si (KR); Sung Hwa Lee, Changwon-si (KR); Il Joong Kim, Masan-si (KR); Jin Hyouk Shin, Busan-si (KR); Gun Ho Ha, Busan-Si (KR); Jin Wook Seo, Busan-si (KR); Chang Ho Yun, Changwon-si (KR); Jin Young Kim, Busan-si (KR); Chang Hoon Lee, Changwon-si (KR); Yun Hee Park, Kimhae-si (KR)

(73) Assignee: LG Electronics Inc., Seoul (KR)

(*) Notice: Subject to any disclaimer, the term of this patent is extended or adjusted under 35 U.S.C. 154(b) by 285 days.

(21) Appl. No.: 12/407,224

(22) Filed: Mar. 19, 2009

(65) Prior Publication Data

US 2009/0229073 A1 Sep. 17, 2009

Related U.S. Application Data

(63) Continuation of application No. 11/565,241, filed on Nov. 30, 2006, now Pat. No. 7,749,295, which is a continuation-in-part of application No. 11/565,206, filed on Nov. 30, 2006, now Pat. No. 7,882,592.

(30) Foreign Application Priority Data

| | | |
|---|---|---|
| Dec. 20, 2005 | (KR) | 10-2005-0121279 |
| Dec. 20, 2005 | (KR) | 10-2005-0126270 |
| Dec. 29, 2005 | (KR) | 10-2005-0134094 |
| Feb. 24, 2006 | (KR) | 10-2006-0018119 |
| Feb. 24, 2006 | (KR) | 10-2006-0018120 |
| May 3, 2006 | (KR) | 10-2006-0040106 |
| May 17, 2006 | (KR) | 10-2006-0044359 |
| May 17, 2006 | (KR) | 10-2006-0044362 |
| May 20, 2006 | (KR) | 10-2006-0045415 |
| May 20, 2006 | (KR) | 10-2006-0045416 |
| May 23, 2006 | (KR) | 10-2006-0046077 |
| Sep. 6, 2006 | (KR) | 10-2006-0085919 |
| Sep. 6, 2006 | (KR) | 10-2006-0085921 |
| Oct. 10, 2006 | (KR) | 10-2006-0098191 |

(51) Int. Cl.
*B01D 45/12* (2006.01)

(52) U.S. Cl. ......... 55/428; 55/429; 55/459.1; 55/DIG. 3

(58) Field of Classification Search .................... 55/426, 55/428, 429, 459.1, DIG. 3; 96/405, 417, 96/418, 419, 421
See application file for complete search history.

(56) References Cited

U.S. PATENT DOCUMENTS 83,469 A 10/1868 Crandall (Continued)

FOREIGN PATENT DOCUMENTS

AU 2005229774 8/2006

(Continued)

OTHER PUBLICATIONS

Japanese Office Action dated May 13, 2010.*

(Continued)

*Primary Examiner* — Robert A Hopkins
(74) *Attorney, Agent, or Firm* — KED & Associates LLP

(57) ABSTRACT

A vacuum cleaner includes a dust collector that compresses dust stored inside a dust container to minimize the volume of the dust. The dust collector would include one or more pressing plates that are used to compress the dust stored in dust collector. Various methods are used to control movements of the movable pressing plates to facilitate the compression operations. Also, various methods are used to determine when the dust collector is full and needs to be emptied.

36 Claims, 44 Drawing Sheets

U.S. PATENT DOCUMENTS

| | | | | |
|---|---|---|---|---|
| 2,283,836 | A | 5/1942 | White | |
| 2,714,426 | A | 8/1955 | White | 183/58 |
| 3,367,462 | A | 2/1968 | Bibbens | |
| 4,379,385 | A * | 4/1983 | Reinhall | |
| 4,545,794 | A | 10/1985 | Himukai | 55/362 |
| 4,601,082 | A | 7/1986 | Kurz | |
| 4,617,034 | A | 10/1986 | Ikezaki et al. | 55/276 |
| 4,809,394 | A | 3/1989 | Suka et al. | 15/327 |
| 5,033,151 | A | 7/1991 | Kraft et al. | 15/319 |
| 5,135,552 | A | 8/1992 | Weistra | |
| 5,159,738 | A | 11/1992 | Sunagawa et al. | 15/326 |
| 5,233,682 | A | 8/1993 | Abe et al. | |
| 5,251,358 | A | 10/1993 | Moro et al. | |
| 5,265,305 | A | 11/1993 | Kraft et al. | |
| 5,323,483 | A | 6/1994 | Baeg | |
| 5,542,146 | A | 8/1996 | Hoekstra et al. | |
| 6,460,217 | B2 | 10/2002 | Fukushima et al. | 15/346 |
| 6,625,845 | B2 | 9/2003 | Matsumoto et al. | |
| 6,689,225 | B2 * | 2/2004 | Illingworth | |
| 6,694,917 | B1 * | 2/2004 | Wang | |
| 6,735,816 | B2 | 5/2004 | Oh et al. | 15/353 |
| 6,757,933 | B2 | 7/2004 | Oh et al. | 15/353 |
| 6,779,229 | B2 | 8/2004 | Lee et al. | 15/329 |
| 6,782,584 | B2 | 8/2004 | Choi | 15/352 |
| 6,922,868 | B1 | 8/2005 | Jeong | |
| 7,028,369 | B2 | 4/2006 | Park et al. | 15/353 |
| 7,152,276 | B2 | 12/2006 | Jin et al. | |
| 7,351,269 | B2 | 4/2008 | Yau | 55/297 |
| 7,475,449 | B2 | 1/2009 | Lee | 15/326 |
| 7,481,868 | B2 | 1/2009 | Lee et al. | |
| 7,547,340 | B2 | 6/2009 | Park | 55/429 |
| 7,582,128 | B2 | 9/2009 | Hwang et al. | |
| 7,601,188 | B2 | 10/2009 | Hwang et al. | 55/343 |
| 7,608,123 | B2 | 10/2009 | Pineschi | 55/429 |
| 7,640,625 | B2 | 1/2010 | Oh et al. | 15/352 |
| 7,644,469 | B2 | 1/2010 | Beers et al. | 15/319 |
| 7,647,672 | B2 | 1/2010 | Nam et al. | 15/352 |
| 7,704,290 | B2 | 4/2010 | Oh | 55/295 |
| 7,749,295 | B2 | 7/2010 | Hwang et al. | 55/428 |
| 7,770,253 | B2 | 8/2010 | Ha et al. | 15/319 |
| 7,785,381 | B2 | 8/2010 | Oh et al. | 55/300 |
| 7,785,396 | B2 | 8/2010 | Hwang et al. | 95/1 |
| 7,854,782 | B2 * | 12/2010 | Oh et al. | 55/429 |
| 2001/0025395 | A1 | 10/2001 | Matsumoto et al. | 15/353 |
| 2002/0073505 | A1 * | 6/2002 | Bolden | |
| 2002/0088079 | A1 | 7/2002 | Oh | |
| 2002/0124538 | A1 | 9/2002 | Oh et al. | |
| 2004/0211025 | A1 | 10/2004 | Jung et al. | |
| 2004/0261216 | A1 | 12/2004 | Choi et al. | 15/352 |
| 2005/0091787 | A1 | 5/2005 | Bair et al. | |
| 2005/0138763 | A1 | 6/2005 | Tanner et al. | |
| 2005/0172584 | A1 | 8/2005 | Oh et al. | |
| 2005/0252179 | A1 | 11/2005 | Oh et al. | |
| 2006/0123750 | A1 | 6/2006 | Lee et al. | 55/428 |
| 2006/0230722 | A1 | 10/2006 | Oh et al. | |
| 2007/0136980 | A1 | 6/2007 | Fujiwara et al. | |
| 2007/0143953 | A1 * | 6/2007 | Hwang et al. | |
| 2007/0209149 | A1 | 9/2007 | Lee | 15/352 |
| 2007/0209339 | A1 | 9/2007 | Conrad | |
| 2008/0023035 | A1 | 1/2008 | Ha et al. | 134/18 |
| 2008/0023036 | A1 | 1/2008 | Ha et al. | 134/21 |
| 2008/0047094 | A1 * | 2/2008 | Ha et al. | |
| 2008/0052870 | A1 | 3/2008 | Lee et al. | |
| 2008/0172824 | A1 | 7/2008 | Yun et al. | 15/352 |
| 2008/0172993 | A1 | 7/2008 | Yun et al. | 55/337 |
| 2008/0263816 | A1 | 10/2008 | Oh et al. | 15/347 |
| 2008/0264007 | A1 | 10/2008 | Oh et al. | 55/304 |
| 2008/0264014 | A1 | 10/2008 | Oh et al. | 55/423 |
| 2008/0264015 | A1 | 10/2008 | Oh et al. | 55/429 |
| 2008/0264016 | A1 | 10/2008 | Oh et al. | 55/429 |
| 2009/0178231 | A1 | 7/2009 | Hwang et al. | 15/347 |
| 2009/0178235 | A1 | 7/2009 | Yun et al. | 15/352 |
| 2009/0178236 | A1 | 7/2009 | Yun et al. | 15/352 |
| 2009/0229072 | A1 | 9/2009 | Hwang et al. | 15/352 |
| 2009/0229073 | A1 | 9/2009 | Hwang et al. | 15/352 |
| 2009/0235956 | A1 | 9/2009 | Hwang et al. | 134/21 |
| 2009/0241286 | A1 | 10/2009 | Hwang et al. | 15/347 |
| 2009/0249578 | A1 | 10/2009 | Hwang et al. | 15/352 |
| 2009/0255083 | A1 | 10/2009 | Hwang et al. | 15/347 |
| 2009/0266382 | A1 | 10/2009 | Hwang et al. | 134/21 |
| 2009/0293221 | A1 | 12/2009 | Hwang et al. | 15/347 |
| 2009/0293223 | A1 | 12/2009 | Hwang et al. | 15/352 |
| 2009/0293224 | A1 | 12/2009 | Hyun et al. | 15/353 |
| 2009/0293915 | A1 | 12/2009 | Hwang et al. | 134/21 |

FOREIGN PATENT DOCUMENTS

| | | | |
|---|---|---|---|
| AU | 2007200406 | B2 | 9/2007 |
| CN | 2162679 | | 4/1994 |
| CN | 2186039 | | 12/1994 |
| CN | 2409894 | | 12/2000 |
| CN | 1334061 | | 2/2002 |
| CN | 1434749 | A | 8/2003 |
| CN | 1593324 | | 3/2005 |
| CN | 1695537 | | 11/2005 |
| CN | 1695538 | | 11/2005 |
| CN | 1777385 | | 5/2006 |
| CN | 1778246 | | 5/2006 |
| DE | 102 40 618 | | 9/2003 |
| EP | 1 371 318 | A2 | 12/2003 |
| EP | 1 671 570 | | 6/2006 |
| EP | 01 136 028 | | 7/2006 |
| EP | 1 733 669 | * | 12/2006 |
| EP | 1857032 | | 11/2007 |
| FR | 2 823 091 | | 10/2002 |
| GB | 2 368 516 | | 5/2002 |
| GB | 2 377 881 | | 1/2003 |
| GB | 2 388 769 | | 4/2004 |
| GB | 2404887 | | 2/2005 |
| GB | 2 406 064 | | 3/2005 |
| GB | 2416721 | | 2/2006 |
| JP | 1972-14759 | | 8/1972 |
| JP | 50-022355 | | 3/1975 |
| JP | 53-051663 | | 5/1978 |
| JP | 54-28457 | | 3/1979 |
| JP | 54-51259 | | 4/1979 |
| JP | 54-085560 | | 7/1979 |
| JP | 54-085561 | | 7/1979 |
| JP | 54-119272 | | 8/1979 |
| JP | 54-114358 | | 9/1979 |
| JP | 54-114366 | | 9/1979 |
| JP | 54-114367 | | 9/1979 |
| JP | 54161751 | | 12/1979 |
| JP | 55-74553 | | 6/1980 |
| JP | 56-26044 | | 3/1981 |
| JP | 58-84066 | A | 5/1983 |
| JP | 58-175532 | | 10/1983 |
| JP | 58-218934 | | 12/1983 |
| JP | 59-125354 | | 8/1984 |
| JP | 64-029246 | | 1/1989 |
| JP | 02-007927 | | 1/1990 |
| JP | 4-116933 | U | 10/1992 |
| JP | 06-054778 | | 3/1994 |
| JP | 7-241265 | | 9/1995 |
| JP | 07-313412 | | 12/1995 |
| JP | 408000514 | | 1/1996 |
| JP | 08-112223 | A | 5/1996 |
| JP | 08-140907 | | 6/1996 |
| JP | 10-243900 | | 9/1998 |
| JP | 11-004789 | | 1/1999 |
| JP | 2000-262449 | | 9/2000 |
| JP | 2002-143060 | | 5/2002 |
| JP | 2002-187336 | | 7/2002 |
| JP | 2002-360474 | | 12/2002 |
| JP | 2003-019097 | | 1/2003 |
| JP | 2003-119575 | | 4/2003 |
| JP | 2003-125995 | | 5/2003 |
| JP | 2003-190056 | A | 7/2003 |
| JP | 2003-310502 | | 11/2003 |
| JP | 2003-310506 | A | 11/2003 |
| JP | 2004-065357 | | 3/2004 |
| JP | 2004-528087 | A | 9/2004 |
| JP | 2004-528876 | | 9/2004 |
| JP | 2005-34213 | | 2/2005 |
| JP | 2005-324002 | | 11/2005 |
| JP | 06-061439 | | 3/2006 |
| JP | 2006-068500 | | 3/2006 |
| JP | 3119575 | | 3/2006 |

| | | | |
|---|---|---|---|
| JP | 2006-340972 | | 12/2006 |
| JP | 2007-007381 | A | 1/2007 |
| JP | 2008-73066 | | 4/2008 |
| JP | 2003-524522 | | 8/2008 |
| KR | 1993-0008369 | | 8/1993 |
| KR | 2002-0091510 | | 12/2002 |
| KR | 10-2005-0005611 | | 1/2005 |
| KR | 10-2005-013694 | | 2/2005 |
| KR | 10-0546629 | B1 | 1/2006 |
| KR | 10-0553042 | B1 | 2/2006 |
| KR | 10-2006-031442 | | 4/2006 |
| KR | 2006-0116992 | | 11/2006 |
| KR | 10-0730956 | | 6/2007 |
| KR | 10-2007-084734 | | 8/2007 |
| KR | 10-2007-088022 | | 8/2007 |
| KR | 10-0800188 | | 1/2008 |
| KR | 10-0800189 | | 1/2008 |
| KR | 10-0838886 | | 6/2008 |
| KR | 10-0838887 | | 6/2008 |
| RU | 2172132 | | 8/2001 |
| RU | 2 243 714 | | 1/2005 |
| RU | 2 269 919 | | 9/2005 |
| SU | 1326236 | | 7/1987 |
| WO | WO 00/74548 | | 12/2000 |
| WO | WO/01/35809 | | 5/2001 |
| WO | WO 01/60524 | | 8/2001 |
| WO | WO 2004/064591 | | 8/2004 |
| WO | WO2005099545 | | 10/2005 |

OTHER PUBLICATIONS

U.S. Office Action U.S. Appl. No. 11/831,473 dated May 14, 2010.*
U.S. Office Action U.S. Appl. No. 12/406,803 dated May 26, 2010.*
U.S. Office Action U.S. Appl. No. 11/965,133 dated Jul. 9, 2010.*
Canadian Office Action dated Jun. 30, 2010.
U.S. Office Action U.S. Appl. No. 12/408,066 dated Jul. 23, 2010.
Japanese Office Action dated Aug. 3, 2010.
U.S. Office Action U.S. Appl. No. 12/406,779 dated Aug. 18, 2010.
U.S. Office Action U.S. Appl. No. 11/831,473 dated Sep. 1, 2010.
Russian Office Action dated Oct. 19, 2010 issued in Application No. 2009143355 (with English translation).
Chinese Office Action dated Oct. 27, 2010 issued in Application No. 200610168848.0 (with English translation).
Chinese Office Action dated Nov. 9, 2010 issued in Application No. 200610169333.2 (with English translation).
U.S. Notice of Allowance dated Jan. 12, 2011 issued in U.S. Appl. No. 11/965,133.
European Search Report dated Jan. 20, 2010.
Chinese Office Action dated Feb. 5, 2010. (with translation).
U.S. Appl. No. 11/965,133 Notice of Allowance dated Jan. 13, 2010.
U.S. Appl. No. 11/565,241 Notice of Allowance dated Feb. 19, 2010.
U.S. Appl. No. 11/831,564 Notice of Allowance dated Feb. 24, 2010.
Korean Office Action dated Mar. 18, 2010.
Korean Office Action dated Mar. 25, 2010.
U.S. Office Action U.S. Appl. No. 11/565,206 dated Apr. 19, 2010.
U.S. Notice of Allowance U.S. Appl. No. 11/831,519 dated Apr. 21, 2010.
Russian Office Action dated Oct. 4, 2007 (2007103555) (translation).
Russian Office Action dated Oct. 12, 2007 (2007103557).
Korean Office Action dated Mar. 25, 2008 (016285635).
Australian Office Action dated Apr. 15, 2008 (2007200407).
Australian Office Action date Apr. 24, 2008 (2007200409).
European Office Action dated May 8, 2008 (07101388.2-2316).
Korean Office Action dated Sep. 30, 2008 (050567614).
Chinese Office Action dated Dec. 12, 2008 (200710002992.1) (translation).
U.S. Office Action dated May 13, 2009 (U.S. Appl. No. 11/965,133).
Chinese Office Action dated May 22, 2009 (200710002992.1) (translation).
Japanese Office Action dated Jul. 28, 2009 (2007-066748).
Chinese Office Action dated Aug. 21, 2009 (200710002991.7) (translation).
U.S. Office Action dated Sep. 10, 2009 (U.S. Appl. No. 11/565,241).
U.S. Office Action dated Oct. 6, 2009 (U.S. Appl. No. 12/406,803).
European Search Report dated Oct. 15, 2009. (0162556.0-2316).
Japanese Office Action dated Nov. 4, 2009. (2007-019770).
Chinese Office Action dated Nov. 13, 2009 (200710085701.X) (translation).
Canadian Office Action dated Nov. 18, 2009 (2) (50514-26) (50514-27).
Japanese Office Action dated Nov. 25, 2009 (2007-019861).
Chinese Office Action dated Dec. 11, 2009 (200710002992.1).
Notice of Allowance dated Jan. 13, 2010 (U.S. Appl. No. 11/965,133).
Notice of Allowance dated Feb. 19, 2010 (U.S. Appl. 11/565,241).
Notice of Allowance dated Feb. 24, 2010 (U.S. Appl. No. 11/831,564).
Russian Office Action dated Sep. 28, 2007 issued in Application No. 2007103559 (translation only).
Australian Office Action dated Apr. 17, 2008 issued in Application No. 2007200408.
Russian Office Action dated Apr. 21, 2008 issued in Application No. 2007103560 (with translation).
Australian Office Action dated Jun. 3, 2008 issued in Application No. 2006249267.
U.S. Office Action dated Aug. 28, 2008 issued in U.S. Appl. No. 11/713,022.
U.S. Office Action dated Sep. 19, 2008 issued in U.S. Appl. No. 11/831,564.
U.S. Office Action dated Oct. 20, 2008 issued in U.S. Appl. No. 11/831,473.
Japanese Office Action dated Nov. 6, 2008 issued in U.S. Appl. No. 2006-333685.
U.S. Final Office Action dated Mar. 9, 2009 issued in U.S. Appl. No. 11/713,022.
Russian Office Action dated Mar. 25, 2009 issued in Application No. 2008102660 (with translation).
Australian Office Action dated Apr. 16, 2009 issued in Application No. 2008200340.
U.S. Final Office Action dated May 28, 2009 issued in U.S. Appl. No. 11/831,473.
Chinese Office Action dated Aug. 21, 2009 issued in Application No. 200810008716.0 (with translation).
U.S. Office Action dated Sep. 3, 2009 issued in U.S. Appl. No. 11/831,564.
Japanese Office Action dated Nov. 25, 2009 issued in Application No. 2007-021083.
Japanese Office Action dated Nov. 25, 2009 issued in Application No. 2007-066748.
Korean Office Action dated Aug. 29, 2008.
Japanese Office Action dated Sep. 18, 2008.
International Search Report and Written Opinion dated Dec. 10, 2008.
Japanese Office Action dated Dec. 24, 2008.
Chinese Office Action dated Feb. 6, 2009.
Japanese Office Action dated Mar. 12, 2009.
Japanese Office Action dated Mar. 13, 2009.
Chinese Office Action dated Apr. 3, 2009 (translation).
Chinese Office Action dated May 8, 2009 (translation).
Japanese Office Action dated May 22, 2009.
Chinese Office Action dated Jun. 5, 2009 (translation).
European Search Report dated Jun. 16, 2009 (in English).
Korean Office Action dated Jun. 19, 2009.
Chinese Office Action dated Jul. 3, 2009 (with translation).
Japanese Office Action dated Jul. 28, 2009 (with translation).
U.S. Office Action dated Feb. 11, 2008 (U.S. Appl. No. 11/831,473).
U.S. Office Action dated Feb. 11, 2008 (U.S. Appl. No. 11/831,564).
U.S. Office Action dated Jul. 24, 2008 (U.S. Appl. No. 11/831,473).
U.S. Office Action dated Jul. 28, 2008 (U.S. Appl. No. 11/712,958).
Korean Office Action dated Sep. 17, 2010 issued in Application No. 10-2008-0065806.
U.S. Office Action dated Nov. 3, 2010 issued in U.S. Appl. No. 12/710,585.
U.S. Final Office Action dated Nov. 8, 2010 issued in U.S. Appl. No. 12/406,803.
U.S. Office Action dated Nov. 12, 2010 issued in U.S. Application No. 12/704,933.
U.S. Office Action issued in U.S. Appl. No. 12/406,779 dated Feb. 3, 2011.

U.S. Office Action issued in U.S. Appl. No. 11/831,473 dated Feb. 4, 2011.
U.S. Office Action issued in U.S. Appl. No. 12/408,066 dated Feb. 10, 2011.
U.S. Office Action issued in U.S. Appl. No. 12/710,585 dated Feb. 10, 2011.
U.S. Office Action issued in U.S. Appl. No. 12/404,739 dated Feb. 18, 2011.
U.S. Office Action issued in U.S. Appl. No. 12/404,692 dated Mar. 9, 2011.
U.S. Office Action issued in U.S. Appl. No. 12/404,715 dated Mar. 9, 2011.
U.S. Notice of Allowance issued in U.S. Appl. No. 12/408,066 dated Mar. 21, 2011.
Japanese Office Action dated Jan. 4, 2011. (Application No. 2006-333685).
European Search Report dated Jan. 27, 2011. (Application No. 06125798.6-2316/1852048).
Russian Office Action dated Feb. 2, 2011 (Application No. 2009143355) (with translation).
Japanese Office Action dated Apr. 7, 2011. (2010-005365).
U.S. Office Action issued in U.S. Appl. No. 12/407,983 dated Jun. 21, 2011.

* cited by examiner

VACUUM CLEANER WITH REMOVABLE DUST COLLECTOR, AND METHODS OF OPERATING THE SAME

This application is a Continuation of U.S. patent application Ser. No. 11/565,241, filed Nov. 30, 2006 now U.S. Pat. No. 7,749,295, which claims priority to the filing dates of Korean Patent Application No. KR2005-0121279, filed Dec. 20, 2005, Korean Patent Application No. KR2005-0126270, filed Dec. 20, 2005, Korean Patent Application No. KR2005-0134094, filed Dec. 29, 2005, Korean Patent Application No. KR2006-0018119, filed Feb. 24, 2006, Korean Patent Application No. KR2006-0018120, filed Feb. 24, 2006, Korean Patent Application No. KR2006-0040106, filed May 3, 2006, Korean Patent Application No. KR2006-0045415, filed May 20, 2006, Korean Patent Application No. KR2006-0045416, filed May 20, 2006, KR2006-0046077, filed May 23, 2006, Korean Patent Application No. KR2006-0044359, filed May 17, 2006, Korean Patent Application No. KR2006-0044362, filed May 17, 2006, Korean Patent Application No. KR2006-0085919, filed Sep. 6, 2006, Korean Patent Application No. KR2006-0085921, filed Sep. 6, 2006, and Korean Patent Application No. KR2006-0098191, filed Oct. 10, 2006, and which is also a continuation-in-part of U.S. application Ser. No. 11/565,206, filed on Nov. 30, 2006 now U.S. Pat. No. 7,882,592. The contents of all of these documents are hereby incorporated by reference.

FIELD

The present invention relates to a removable dust collector of a vacuum cleaner. More particularly, the invention relates to mechanisms for increasing the dust collecting capacity of the dust collector, and methods of operating those mechanisms.

BACKGROUND

Conventional art vacuum cleaners can include a removable dust collector for storing collected dust. These types of removable dust collectors are particularly common on cyclone type vacuum cleaners. Such vacuums are configured such that the user can remove the dust collector, empty it of the collected dust, and then replace the dust collector on the vacuum cleaner.

A typical dust collector according to the related art, as shown in FIG. 1, includes a dust container 11 formed in a substantially cylindrical shape, a lid 12 for opening and closing the dust container 11, and a handle 13 disposed on the outer surface of the dust container 11. In this embodiment, an intake port 11*a* for suctioning outside air is formed on the upper outer surface of the dust container 11. An exhaust port 11*b* for exhausting air that has undergone the dust separating process is formed at the central portion of the lid 12.

The upper portion of the dust container 11 forms a cyclone that uses a difference in centrifugal force on the air and the dust (the cyclone principle) to separate the dust from the air. The lower portion of the dust container 11 forms a dust bin for storing dust that is separated from the air by the cyclone.

The intake port 11*a* is oriented in a tangential direction relative to the upper outer surface of the dust container 11. This ensures that the incoming air and dust moves in a spiraling direction along the inner wall of the dust container 11. The exhaust port 11*b* is coupled to an exhaust member 14 that is cylindrical in shape with a plurality of through-holes formed on the outer surface thereof. The air that is separated from the dust within the dust container 11 is exhausted through the through-holes of the exhaust member 14 and through the exhaust port 11*b*.

During operation of the vacuum cleaner incorporating this dust collector, the collected dust within the container tends to circulate around the bottom interior of the container 11. When operation of the vacuum cleaner stops, the collected dust settles on the floor of the dust container 11 and is stored therein at a low density.

Thus, in a dust collector according to the related art, when a predetermined amount of dust has been collected inside the container, during the operation of the dust collector, the dust circulates along the inner walls of the dust bin and rises. When the dust rises, it tends to blocks the cyclone formed in the upper space of the dust bin. This causes the separation effect of the cyclone to deteriorate, and not all the dust in the incoming airstream can be separated. As a result, the unseparated dust is exhausted with the air through the exhaust member and the exhaust port 11*b*.

Also, when the operation of the dust collector 10 ends, and the collected dust settles on the bottom of the dust bin, the collected dust has a very low density. In other words, a relatively small amount of dust inside the dust container 11 can takes up an excessive volume of the container 11. This means that the dust container must be emptied frequently in order to maintain an acceptably low level of dust within the container, which in turn ensures that the vacuum continues to operate in an efficient manner.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION

Reference will now be made in detail to preferred embodiments, examples of which are illustrated in the accompanying drawings. Wherever possible, the same reference numbers will be used throughout the drawings to refer to the same or like parts.

Figure 1:
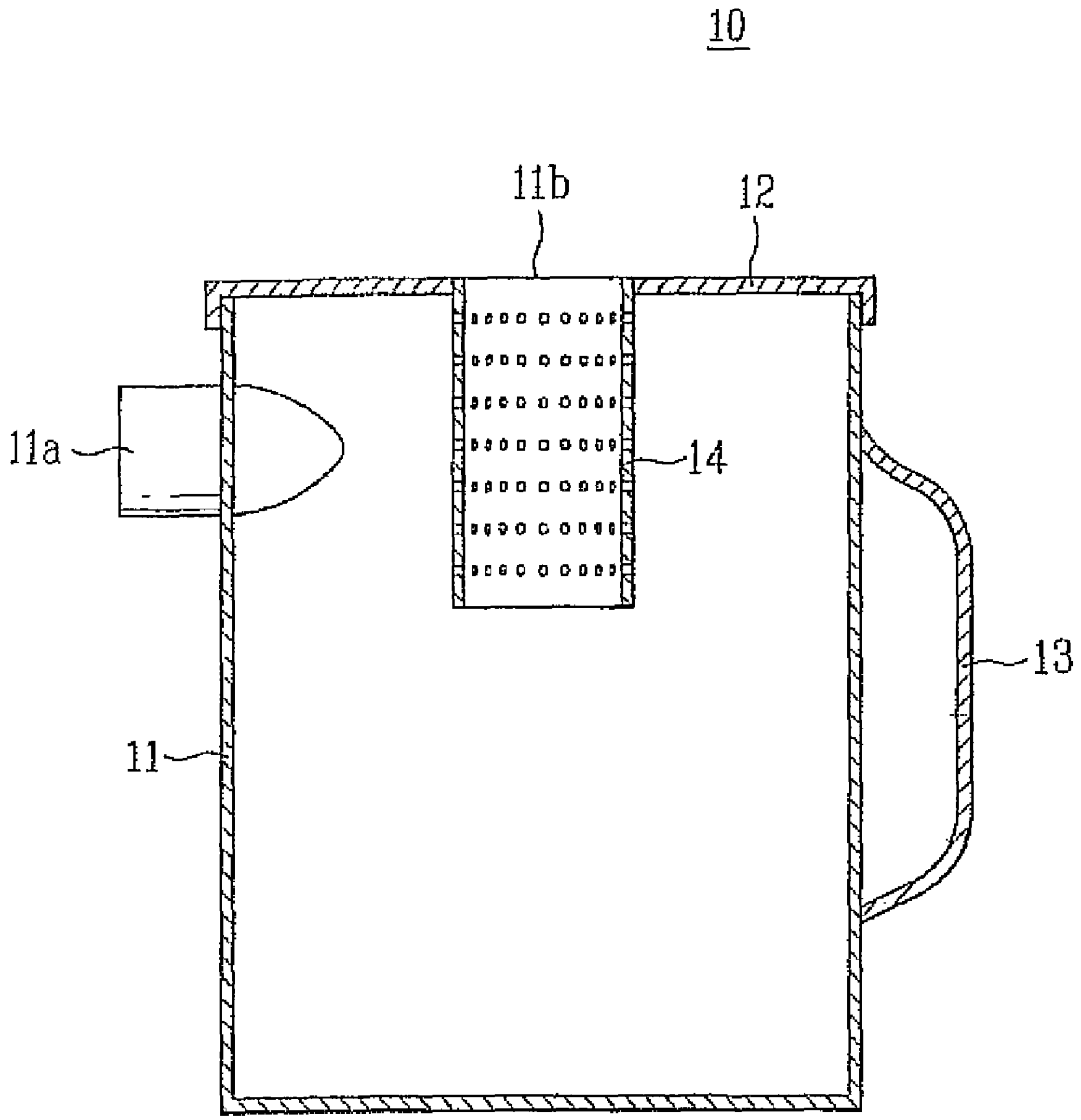
FIG. 1 is a schematic sectional view of a related art dust collector which can be used in a vacuum cleaner.
Figure 2:
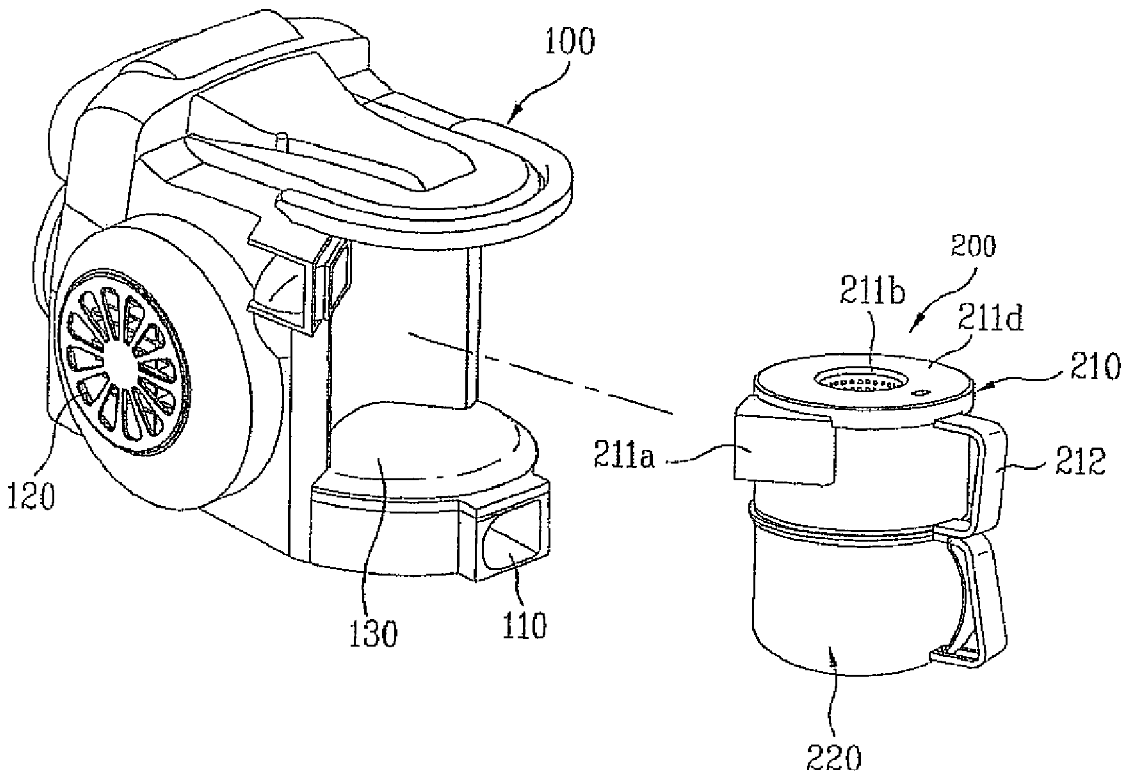
FIG. 2 is a perspective view of an embodiment with the dust collector separated from a main body of the vacuum cleaner.

Referring to FIG. 2, a basic structural description of a vacuum cleaner according to an embodiment of the present invention will be given. In this embodiment, a dust collector 200 for separating and collecting dust is removably mounted on a main body 100. An air suctioning device (not shown), for generating force to suction air, is disposed within the main body 100. The air suctioning device would typically include a fan-motor assembly provided in an air flow passage communicating with the dust collector 200.

The fan-motor assembly would generate a suctioning force to suction outside air through a suctioning hole formed on the bottom of a suctioning nozzle. A main body intake port 110 is provided at the front, lower portion of the main body 100 of the vacuum cleaner for communicating with the suctioning nozzle. A main body exhaust port 120 for exhausting air separated from the dust in the dust collector is disposed on a side of the main body 100.

The dust collector 200 of the vacuum cleaner according to the present invention functions to separate and store dust included in air that flows by means of the operation of the air suctioning device. The dust collector 200 includes a dust separator 210 for separating dust from flowing air, and a dust container 220 for storing the dust separated by the dust separator 210.

In this embodiment, the dust separator 210 includes a cyclone 211 for separating the dust contained in the air using the cyclone principle. The dust that is separated by the cyclone 211 is stored inside the dust container 220. Of course, in other embodiments, some other type of dust separation mechanism could be used to separate dust from the incoming airstream. A vacuum cleaner using any sort of dust separation mechanism would still fall within the scope of the invention.

The dust collector 200 in this embodiment of the present invention is a separable type dust collector whereby the dust separator 210 and the dust container 220 can be separated. However, in other embodiments the outer walls of the dust separator 210 and the dust container 220 may be integrally formed.

The dust collector 200 is removably held in a dust collector mounting portion 130. The dust collector mounting portion 130 may be disposed at the front or elsewhere on the main body 100 of the vacuum cleaner.

The dust separator 210 (or the cyclone 211) is provided on a side of the dust container 220. In the present embodiment, the cyclone 211 is provided at the top of the dust container 220.

Figure 3:
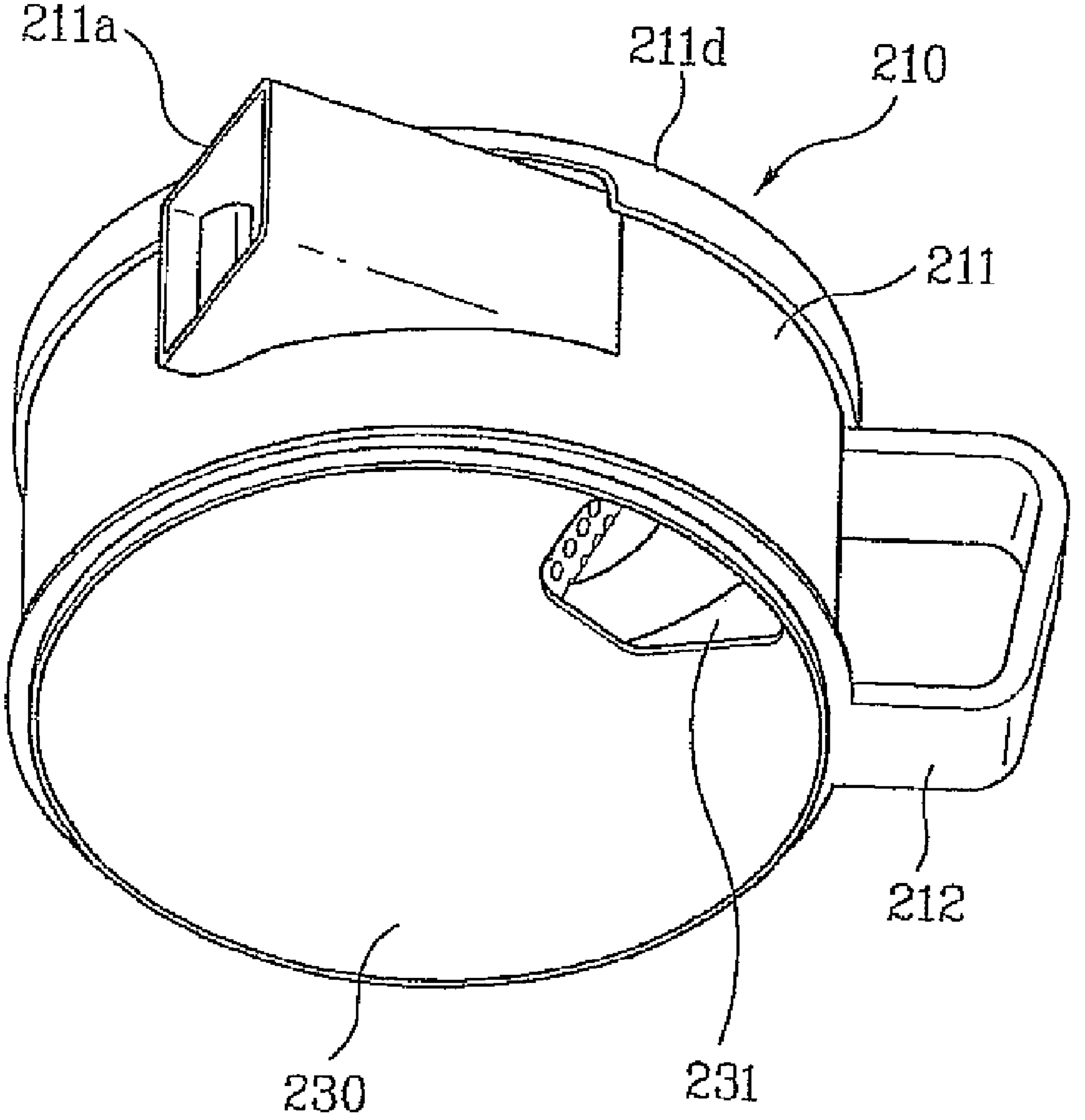
FIG. 3 is a perspective view the dust separator portion of the dust collector in FIG. 2.
Figure 4:
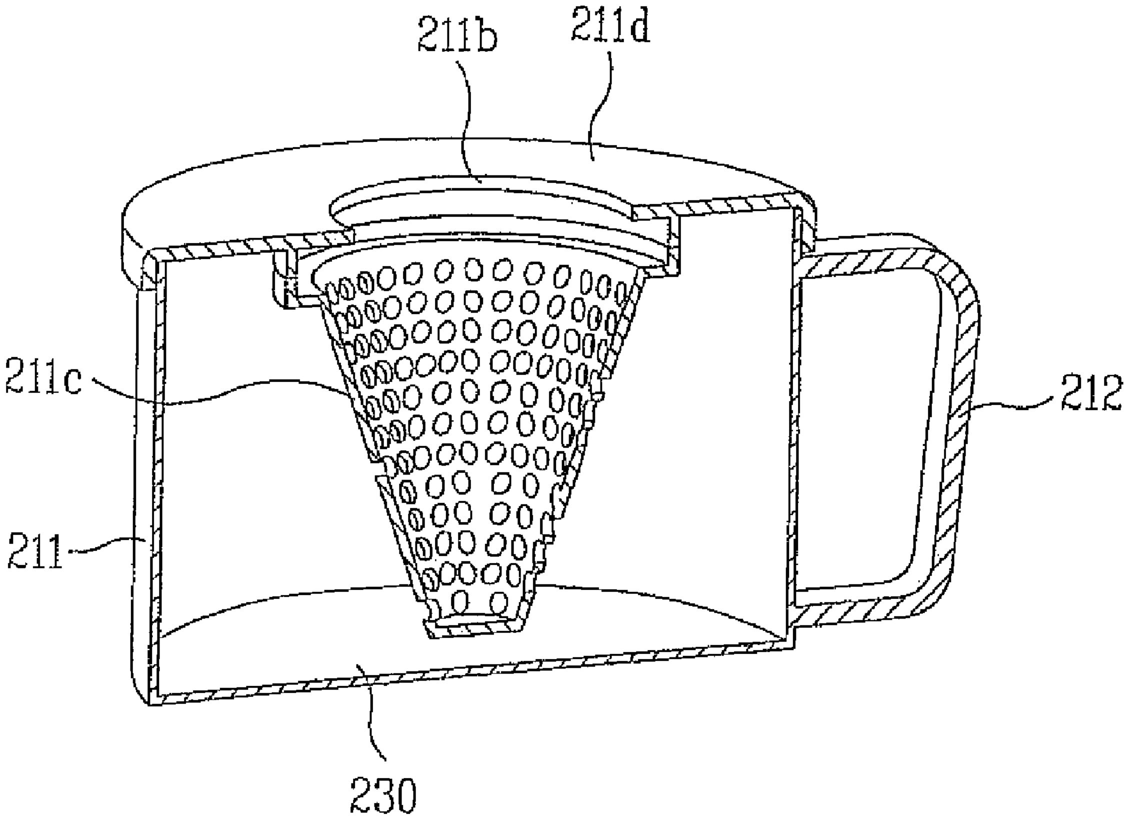
FIG. 4 is a cutaway perspective view of the dust separator of FIG. 3.

Referring to FIGS. 3 and 4, an intake port 211*a* for incoming air containing dust is provided at the top outer surface of the cyclone 211. An exhaust port 211*b* for exhausting air that has undergone a first dust separating process within the cyclone 211 is formed in the center of the ceiling of the cyclone 211.

The air and dust that enter the inside of the cyclone 211 through the intake port 211*a* are guided in a direction approximately tangential to the inner walls of the cyclone 211. To accomplish this, the intake port 211*a* is either provided on the outer surface of the cyclone 211 in an approximately tangential direction thereto, or there are guide ribs disposed on the inner walls of the intake port 211*a* or the cyclone 211, so that the air and dust flowing through the intake port 211*a* is guided in a direction approximately tangential to the inner walls of the cyclone 211.

Also, a hollow exhaust member 211*c* is coupled to the exhaust port 211*b*. A plurality of through-holes are formed in the exhaust member 211*c* for allowing air that has undergone a dust separating process to be exhausted therethrough.

The roof of the cyclone 211 is formed of a cover 211*d*, which is removably coupled around the upper perimeter of the cyclone 211. The cyclone 211 and the dust container 220 may be partitioned from each other by a dividing plate 230. Thus, in this embodiment, with the cyclone 211 installed in the upper portion of the dust container 220, the dividing plate 230 simultaneously forms the ceiling of the dust container 220 and the floor of the cyclone 211.

The dividing plate 230 has a dust entrance 231 formed at an edge portion thereof, so that dust separated in the cyclone 211 can enter a dust chamber 222 of the dust container 220. The dust entrance 231 is formed from an edge of the dividing plate 230 towards the center thereof. In some embodiments, there may be only one dust entrance 231. In other embodiments, there may be a plurality of dust entrance holes.

During operation of the vacuum cleaner, dust would spiral along the inner walls within the cyclone 211. Gravity would cause the dust to fall into the dust container 220 through the dust entrance 231. Also, the dividing plate 230 prevents dust within the dust container 220 from rising and entering the cyclone 211.

In this embodiment, both the dust container 220 and the cyclone 211 can be removed from the main body 100 of the vacuum cleaner. Also, in this configuration the dust container 220 is detachably provided below the cyclone 211. The dividing plate 230 is integrally formed at the bottom of the cyclone 211. More specifically, the dividing plate 230 is integrally connected around the lower circumference of the cyclone 211, with the exception of the portion forming the dust entrance 231.

An upper handle 212 and a lower handle 221 are respectively provided on the outer surface of the cyclone 211 and the outer surface of the dust container 220. Therefore, a user may separate only the dust container 220 from the main body to empty it. On the other hand, when cleaning of the cyclone's 211 interior is required, the user may separate the cyclone 211 from the main body 100 of the vacuum cleaner and open the cover 211*d* to easily clean the inside of the cyclone 211.

Although not shown, a fixing apparatus for fixing the cyclone 211 and the dust container 220 to the main body 100 of the vacuum cleaner may be provided.

In other embodiments, the cyclone may be more permanently mounted on the main body of the vacuum cleaner, and only the dust container would be removable. In still other embodiments, the cyclone and dust container may be integrally formed in a single body which is removably mounted on the main body.

A structure for maximizing the amount of dust that can be stored in a dust container will now be described with reference to FIGS. 5-7.

Figure 5:
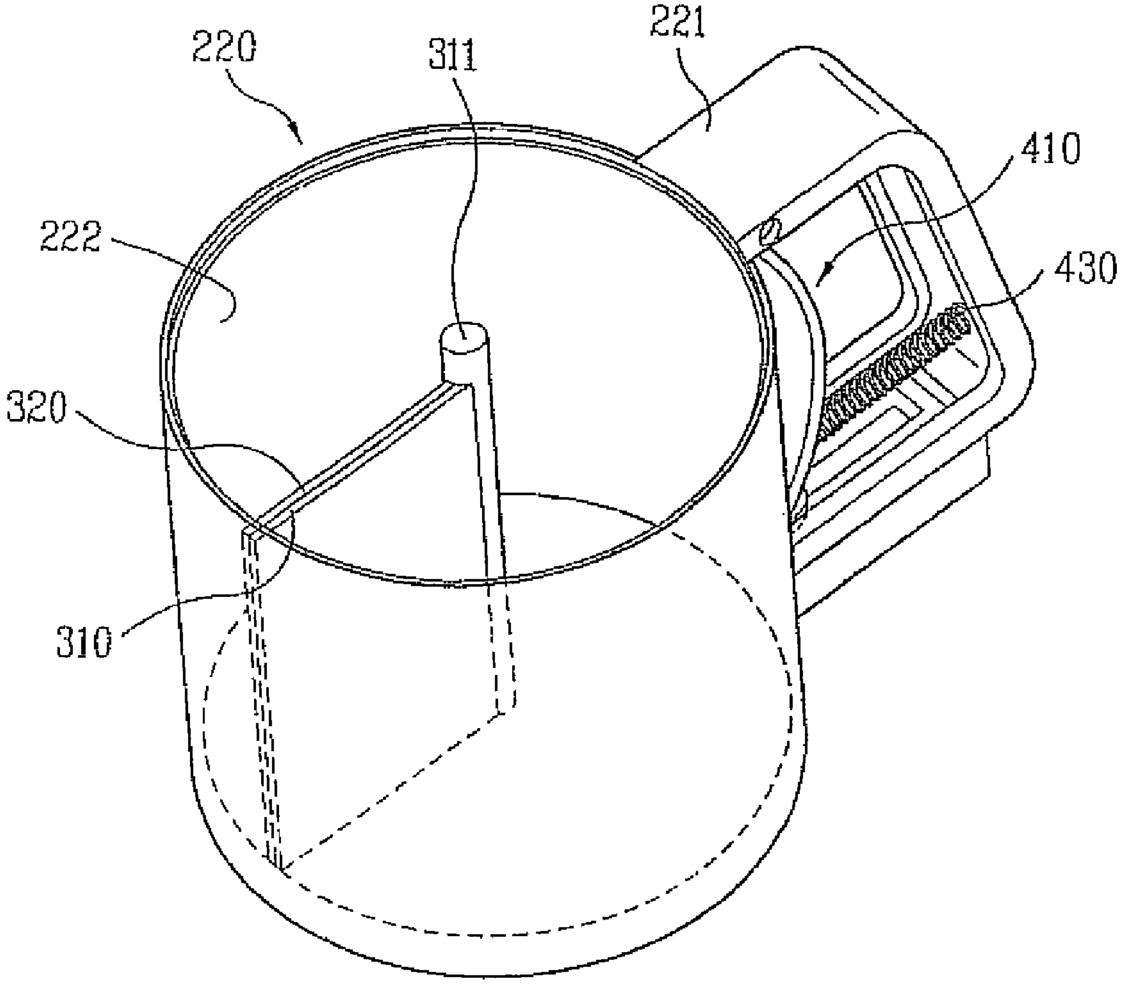
FIG. 5 is a phantom perspective view of a dust container portion of the dust collector in FIG. 2.
Figure 6:
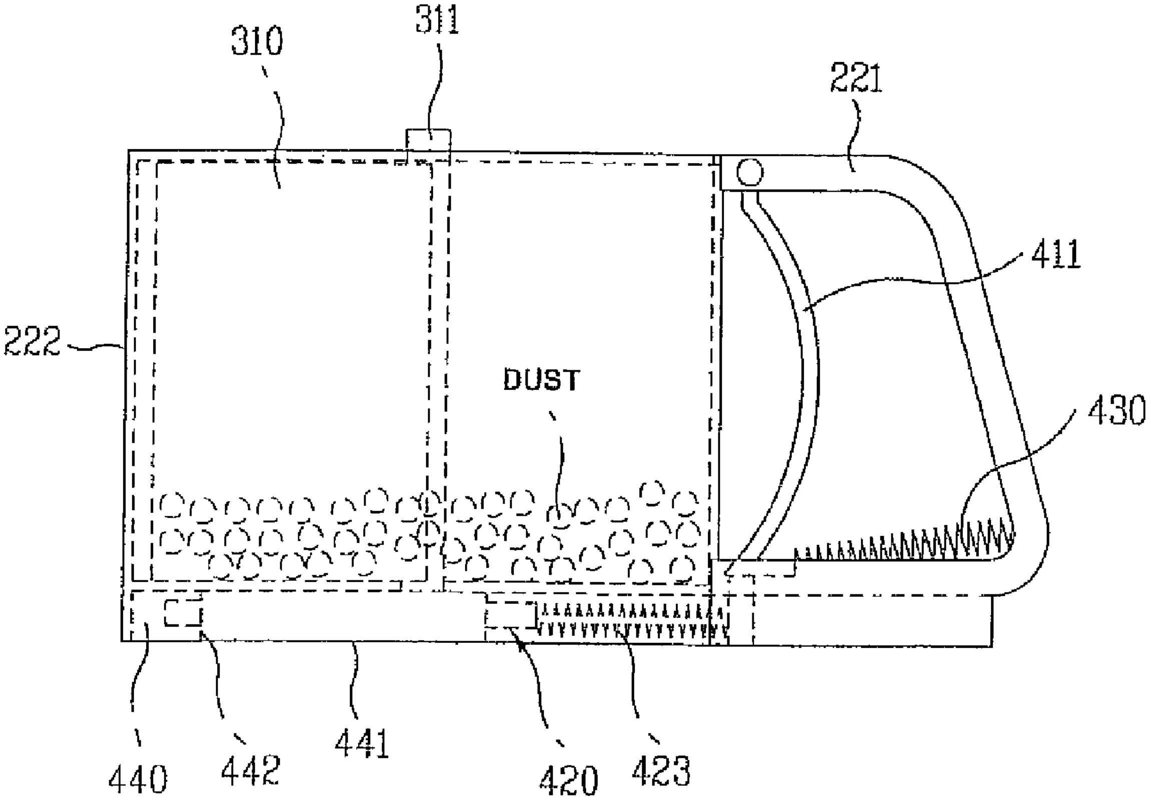
FIG. 6 is a sectional view of the dust container portion of FIG. 5.
Figure 7:
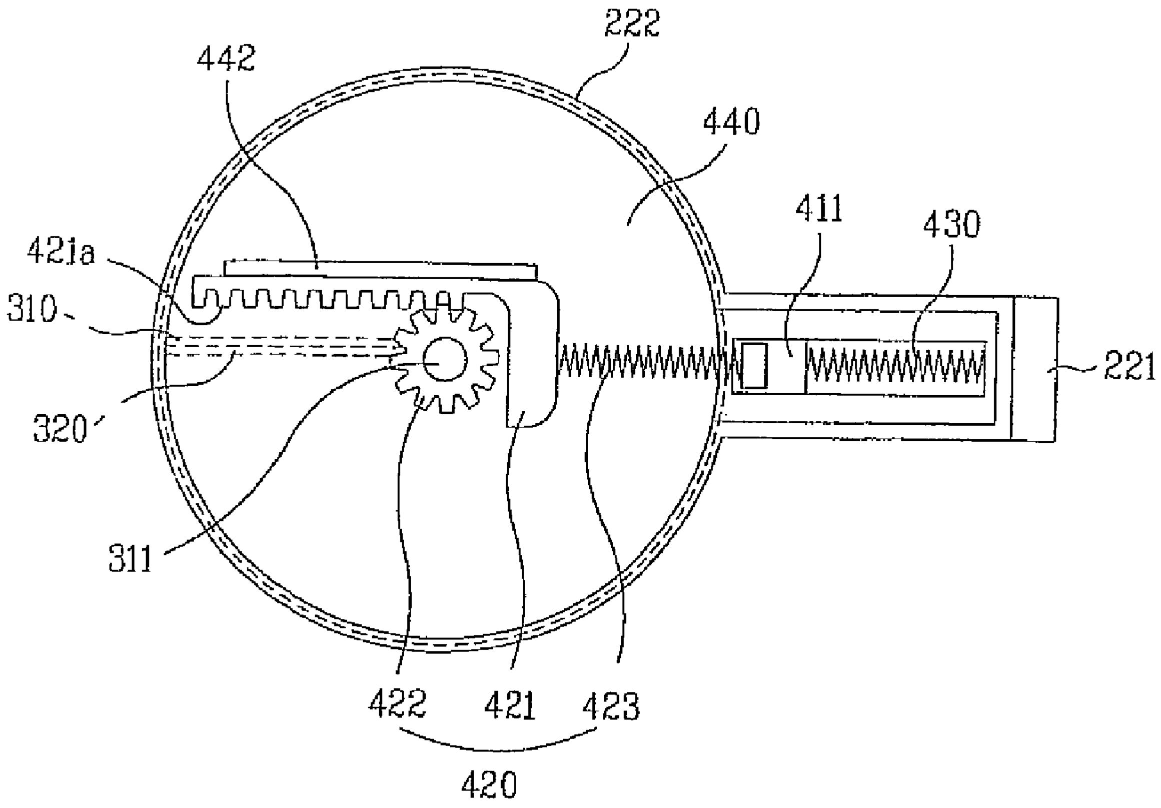
FIG. 7 is a sectional view of the dust container portion in FIG. 5 showing a driving mechanism formed on the floor thereof.

FIG. 5 is a phantom perspective view of a dust container of the dust collector in FIG. 2, FIG. 6 is a sectional view of the dust container in FIG. 5, and FIG. 7 is a sectional view of the dust collector in FIG. 5 showing a driving mechanism formed on the floor thereof.

Referring to FIGS. 5 through 7, the dust collector 200 has a pair of compressing plates 310 and 320 which can operate to compress dust stored in the container to reduce the volume of the dust. Reducing the volume in this fashion increases the total amount of dust that can be stored in the container before it needs to be emptied.

In this embodiment, at least one of the pair of compressing plates 310 and 320 is configured to move within the dust container 220, thereby compressing dust between the two compressing plates 310 and 320. The moving compressing plates may be rotatably installed within the dust container 220. In other words, one or both of the pair of compressing plates 310 and 320 may move to narrow the gap between the two compressing plates 310 and 320. This gathers dust between the pair of compressing plates 310 and 320 and compresses the dust into a highly dense state.

For purposes of the following description, one of the pair of compressing plates 310 and 320 will hereinafter be referred to as the first compressing plate 310, and the other will be referred to as the second compressing plate 320.

When both the first compressing plate 310 and the second compressing plate 320 are rotatably installed within the dust container 220, both the first and second compressing plates 310 and 320 are designed to rotate towards one another, so that the gap between one side of the first compressing plate 310 and the side of the second compressing plate 320 facing the first compressing plate 310 is reduced. This results in dust disposed between the first and second compressing plates 310 and 320 being compressed.

However, in this embodiment, only the first compressing plate 310 is rotatably provided inside the dust container 220. The second compressing plate is fixed.

The first compressing plate 310 rotates within the dust chamber 222 by means of a manual-type rotating mechanism. The free edge of the first compressing plate 310 follows a curve as the plate rotates. The inner wall of the dust chamber 222 encloses an imaginary curve formed by the free edge of the first compressing plate 310. Here, the dust chamber 222 forms a substantially cylindrical inner space.

Because the second compressing plate 320 is fixed at a predetermined position within the dust chamber 221, as the first compressing plate 310 rotates, the mutual interaction of the second compressing plate 320 and the first compressing plate 310 causes a volume of the dust stored inside the dust container 220 to be reduced. In other words, the first compressing plate 310 rotates by means of the manual-type rotating mechanism to push dust towards one of the two sides of the second compressing plate 320, thereby compressing the dust inside the dust container 220.

Here, the second compressing plate 320 may be provided in an approximate radial disposition between the inner surface of the dust chamber 222 and a rotating axis (the central point of rotation) of the first compressing plate 310. More specifically, the second compressing plate 320 has one end thereof integrally connected to the inner surface of the dust chamber 222 and the other end extending towards the center of the dust chamber 222. Therefore, the second compressing plate 320 entirely or partially seals a passage between the inner surface of the dust chamber 222 and the central axis of the dust chamber 222 such that the dust pushed by the first compressing plate 310 is compressed together with the second compressing plate 320.

In this embodiment, the floor of the dust container 220 forms one end of the seal for the dust chamber 222, and the cyclone is provided above the dust chamber 222. However, in other embodiments, the dust container could have different configurations. For instance, in another embodiment, the dust container 220 could be installed in a prone position on the main body 100 of the vacuum cleaner.

However, for the sake of descriptive convenience, the below description will be given based on the dust container 220 being installed in an upright position on the main body 100 of the vacuum cleaner. Therefore, one end of the dust chamber 222 becomes the bottom or floor of the dust chamber 222. Also, the top of the dust chamber 222 is opened, and its interior is formed in a cylindrical shape. Of course, the dust chamber could have any number of other shapes.

The bottom end of the second compressing plate 320 may either be integrally formed with the floor of the dust chamber 222 or located proximally thereto. The upper end of the second compressing plate 320 may be proximally disposed to the upper end of the dust chamber 222. More specifically, the upper end of the second compressing plate 320 may be formed to be proximal to the bottom surface of the dividing plate 230. This helps to minimize leakage of the dust that is pushed by the first compressing plate 310 through gaps formed at the edges of the second compressing plate 320.

The above-configured first and second compressing plates 310 and 320 may be formed as rectangular plates. However, depending on the interior shape of the dust chamber 222, the first and second compressing plates could have a variety of other shapes as well. Also, although this embodiment shows the first and second compressing plates with approximately the same overall shape, in other embodiments, the first and second compressing plates could have different shapes.

The manual-type rotating mechanism includes an operating part 410, and a driving mechanism 420 for transferring driving force from the operating part 410 to the movable first compressing plate 310. The operating part 410 is a structure for a user to operate in order to exert force to compress the dust stored in the dust container 220. In this embodiment, the operating part 410 is a structure that includes a lever 411. In more detail, the lever 411 is disposed on the dust container handle (or the lower handle) provided on the outer surface of the dust container, in order to increase operating convenience of the lever 411.

Below, for the sake of descriptive convenience, the lower handle 221 will be referred to as the dust container handle. The lever 411 is movably disposed within the handle 221. When a user pulls the lever 411, the first compressing plate 310 may be configured to rotate within the dust chamber 222 and compress the dust together with the second compressing plate 320.

One end of the lever 411 (in this embodiment, the upper end) is pivotably connected to the dust container handle 221. The opposite end of the lever 411 is connected to the driving mechanism 420. Accordingly, when a user pulls the lever towards the inner surface of the dust container handle 221 (that is, in a direction outward from the dust container 220), the pulling force of the user is transferred by the driving mechanism 420 to the first compressing plate 310, thereby causing the first compressing plate 310 to rotate.

The driving mechanism 420 includes a gear mechanism 421 and 422 for transferring the force exerted on the lever 411 to the first compressing plate 310 through engaged gears.

Of course, the driving mechanism 420 may not be a gear mechanism, but may alternately include components from a belt or chain-driven mechanism, or from a friction wheel system. However, a gear-type mechanism is an effective choice for transferring the driving force.

In this embodiment, the gear mechanism 421 and 422 changes linear movement into rotational movement, imparting rotational force to a rotating axis 311 at the rotational center of the first compressing plate 310. In the present embodiment, the gear mechanism 421 and 422 consists of a rack bar and a pinion gear. The rack bar 421 moves linearly by means of the operating part 410, or more specifically, the lever 411. The rack bar 421 includes a rack 421*a* with teeth that engage with teeth of the pinion gear 422, so that the pinion gear 422 is rotated by being engaged with the rack 421*a*.

In the present embodiment, the pinion gear 422 is directly coupled to the rotating axis 311 of the first compressing plate 310. In other words, the rotating axis 311 of the first compressing plate is inserted and fixed in the central portion of the pinion gear 422. The rotating axis 312 of the first compressing plate 310 shares the same axis with the axis line forming the center of the dust chamber 222.

The free outer end of the first compressing plate 310 may rotate while being disposed as close as possible to the inner surface of the dust chamber 222. The second compressing plate 320 seals a space between the rotating axis 311 of the first compressing plate and the dust chamber 222.

Although not shown, at least one gear may be further provided between the rack bar 421 and the pinion gear 422.

In the above structure, the gear mechanism is disposed on the floor of the dust container 220. Thus, a driving mechanism compartment 440, in which the gear mechanism 421 and 422 is installed, is formed at the lower end of the dust chamber 222.

Although not shown, the driving mechanism compartment 440 may include a floor cover 441 detachably coupled to the floor of the dust container 220, for opening and closing the bottom end of the driving mechanism compartment 440, in order to install the gear mechanism.

FIG. 7 is a view showing the dust container 220 from the bottom with the floor cover 441 removed. The pinion gear 422 is coupled to the lower end of the rotating axis 311 of the first compressing plate, and the rack bar 421 is installed to be engaged to the pinion gear 422. The lower end of the rotating axis 311 of the first compressing plate passes through the floor of the dust chamber 222 and protrudes downward from the ceiling of the driving mechanism compartment 440.

Also, a guide rib 442 for guiding the rack bar 421 in a linear movement may be disposed on the driving mechanism 440. Here, the guide rib 442 may be integrally formed with the ceiling of the drive mechanism compartment 440 to protrude downward therefrom, and the rack bar 421 is disposed between the pinion gear 422 and the guide rib 442.

The first compressing plate 310 may be configured so that it returns to its original position when an external force exerted on the lever 411 is removed. The original position of the first compressing plate 310 is a position in which the first compressing plate 310 contacts a surface of the second compressing plate 320, or a position proximal to one side surface of the second compressing plate 320. For this, the dust collector may include a returning unit connected to the manual-type rotating mechanism, for restoring the first compressing plate 310 to its original position.

In the present embodiment, the returning unit includes a return spring 430. The return spring 430 may be a compression spring installed between the lever and the handle 221. One end of the return spring 430 may be connected to the outer surface of the lever 411, and the other end may be connected to the inner surface of the dust container handle 221 facing the outer surface of the lever 411.

Therefore, when a user pulls the lever 411 outwards, the return spring 430 is compressed. When the pressure on the lever 411 is removed, the compressed return spring 430 expands to simultaneously return the rack bar 421 and the first compressing plate 310 to their original positions.

The driving mechanism 420 and the operating part 410 may be directly connected, or the driving mechanism 420 may be connected to the operating part 410 via a shock absorbing spring 423. In the embodiment shown in FIG. 7, the rack bar 421 is connected to the lever 411 through a shock absorbing spring 423. One end of the shock absorbing spring 423 is connected to the rack bar 421, and the other end is connected to the lower end of the lever 411.

The shock absorbing spring 423 prevents excessive force from being transferred to the first compressing plate 310. That is, as the first compressing plate 310 rotates to compress dust, when it reaches a point where it can no longer rotate, and force is continuously exerted on the lever 411, the shock absorbing spring 423 absorbs the external force, and prevents excessive force from being transferred to the first compressing plate 310 and/or the second compressing plate 320.

Also, in the process of manually manipulating the lever 411 as described above to compress dust, the dividing plate 230 prevents the dust being compressed between the pair of compressing plates 310 and 320 from rising up from the dividing plate 230.

Figure 8:
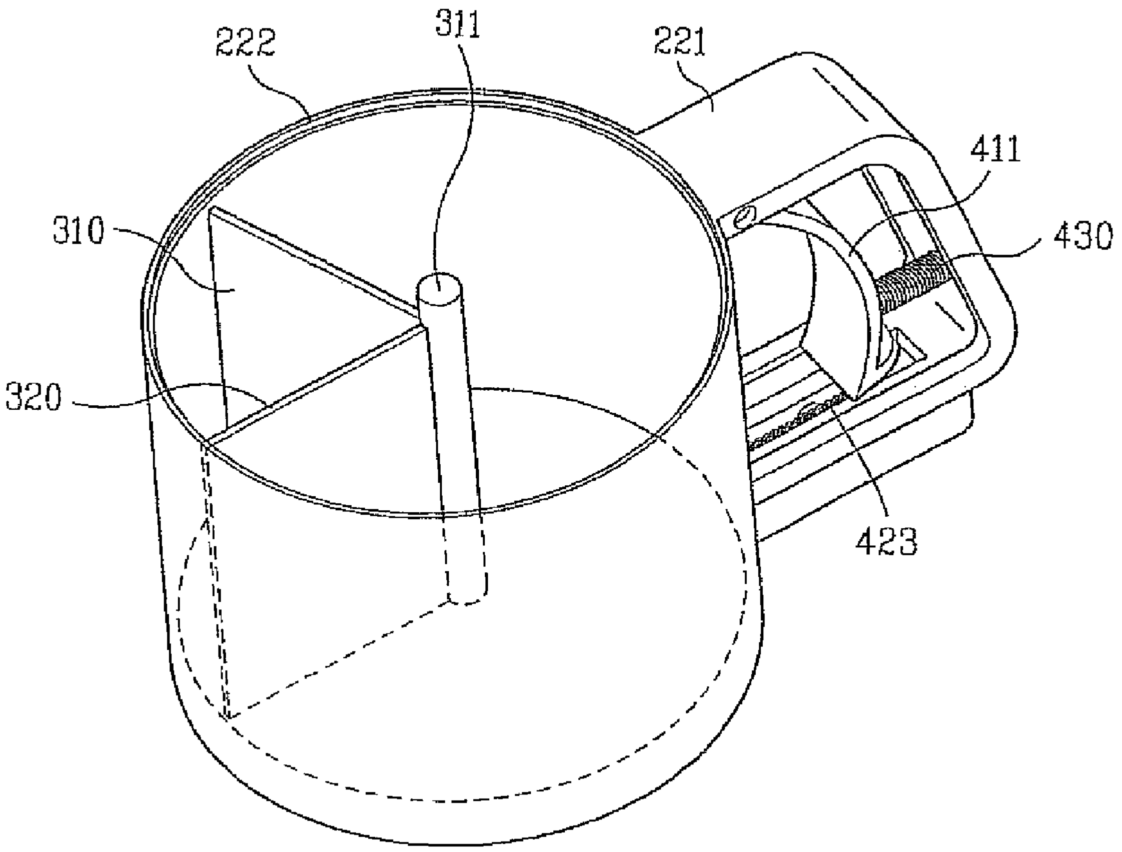
FIG. 8 is a phantom perspective view of the dust container portion of FIG. 5 with a first compressing plate that has rotated.
Figure 9:
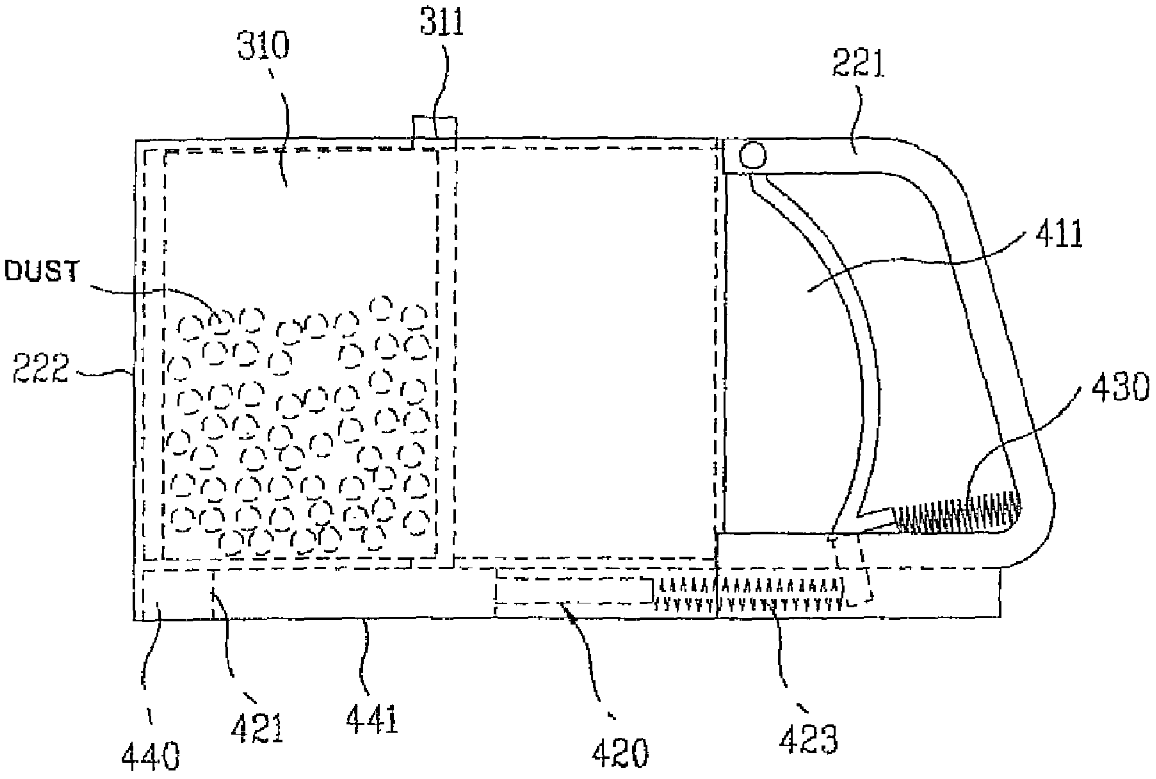
FIG. 9 is a sectional view of the dust container portion of FIG. 8.

A method of operating the above-described dust collector will now be described with reference to FIGS. 8-10. FIG. 8 is a phantom perspective view of a dust container with a first compressing plate that has rotated some amount. FIG. 9 is a sectional view of the dust container in FIG. 8, and FIG. 10 is a bottom plan view showing a driving mechanism formed on the floor of the dust container in FIG. 8.

Figure 10:
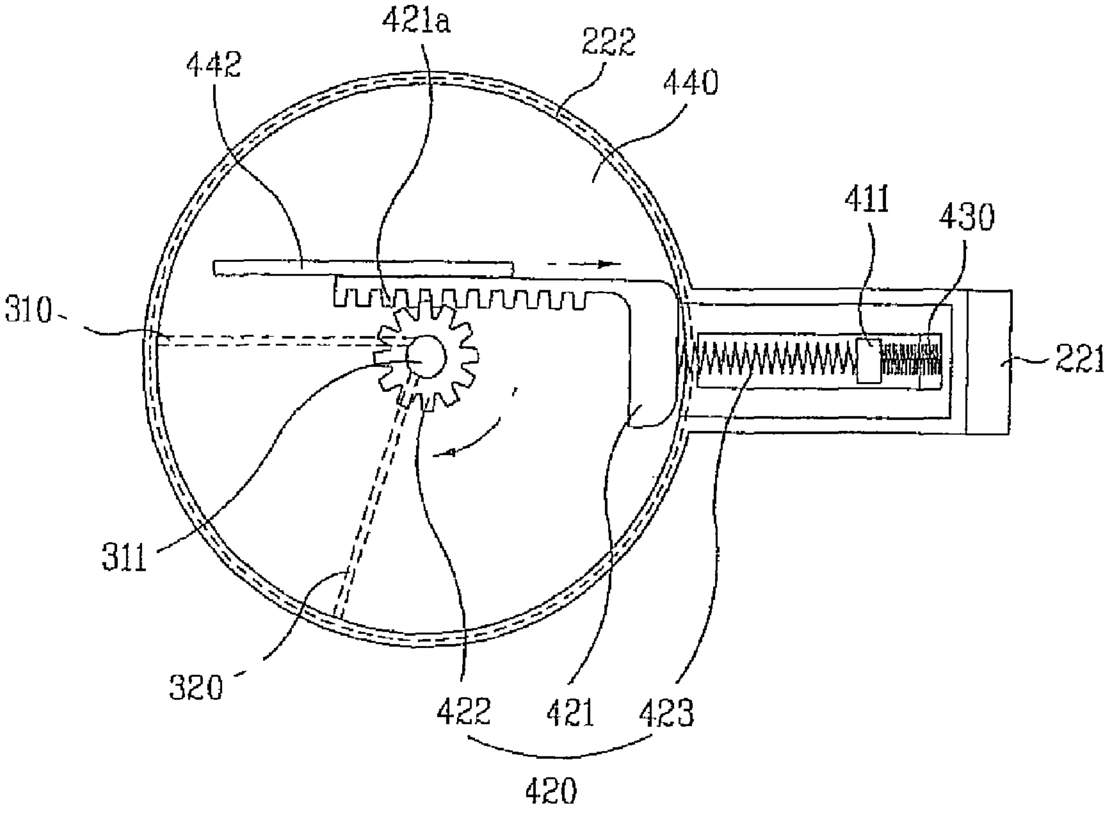
FIG. 10 is a bottom plan view showing a driving mechanism formed on the floor of the dust container portion of FIG. 8.

Referring to FIGS. 8 through 10, when a user first wishes to compress collected dust, the user pulls the lever 411 to rotate the first compressing plate 310 towards the other side of the second compressing plate 320. Dust that was spread out on the floor of the dust chamber 222 (as shown in FIG. 6) is swept towards the other side of the second compressing plate 320 FIG. 10 shows the movement of the gear mechanism (that is, the rack bar 421 and the pinion gear 422) as seen from below the dust container 220.

After the dust is compressed by the above manual operation, the user releases the lever 411, whereupon the return spring 430 returns the first compressing plate 310 to its original position, as shown in FIGS. 5 through 7.

Operations of a vacuum cleaner having the above-described configuration will now be described.

First, when power is supplied to the vacuum cleaner, the outside air that is suctioned through the suctioning nozzle passes though the main body intake port 110 and enters the intake port 211*a* of the cyclone. The air that enters through the cyclone's intake port 211*a* is guided in a tangential direction to the inner wall of the cyclone 211 to form a spiraling current. As a result, dust contained in the air is separated therefrom by means of centrifugal force, and the dust particles descend under the force of gravity.

The dust will moves in a circular or spiral flow along the inner walls of the cyclone 211 and ultimately passes though a dust entrance 231 of the dividing plate 230. The dust particles are then stored in the dust chamber 221.

The air that is separated from the dust by the cyclone 211 is first exhausted through an exhaust member 211*c* and the exhaust port 211*b*, and then passes the fan-motor assembly and is exhausted from the main body 100 of the vacuum cleaner via the main body exhaust port 120.

Figure 11A:
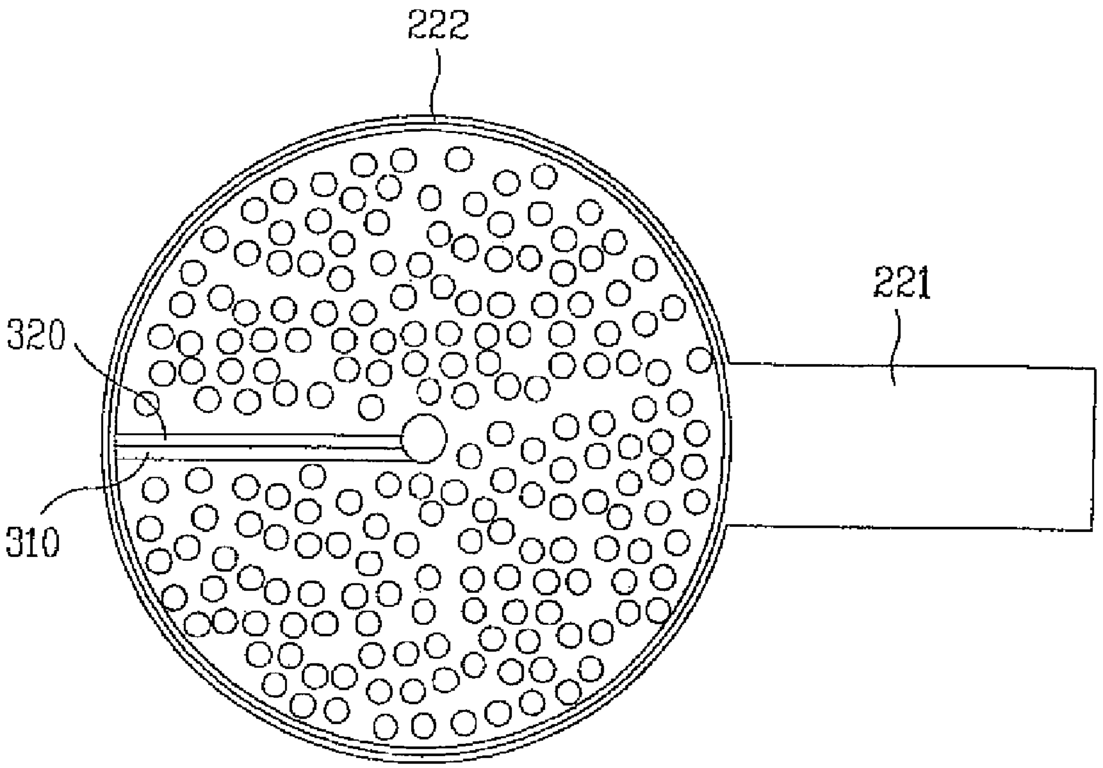
FIGS. 11*a* and 11*b* are plan views showing a process of compressing dust in a dust container portion of a dust collector.
Figure 11B:
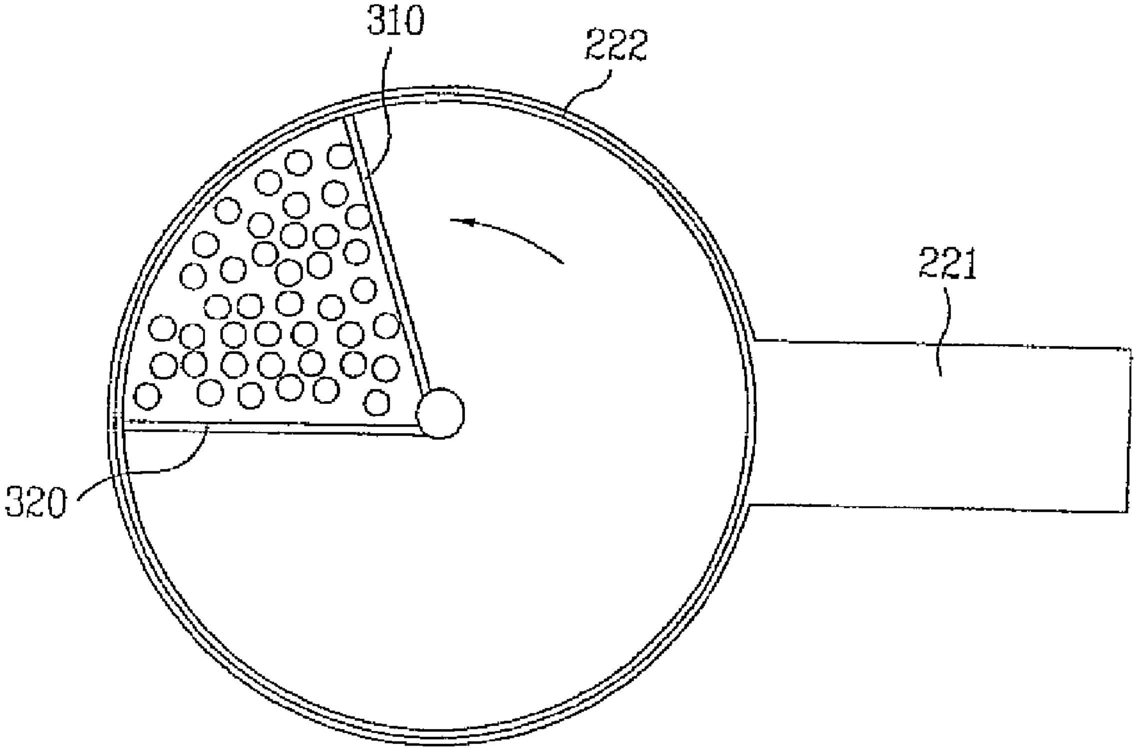

Referring to FIGS. 11*a* and 11*b*, the dust inside the dust chamber 221 is compressed between the first and second compressing plates 310 and 320 by means of the manually-operated lever 411, so that the volume of the dust is minimized and the storage capacity of dust in the dust chamber 221 increases. Since the operation of the first compressing plate 310 interacting with the second compressing plate 320 has already been described above, a repetition thereof will not be made.

The dust container 220 that stores the compressed dust may be detached from the main body 100 of the vacuum cleaner and emptied at appropriate times. In other words, when a user separates the dust container 220 from the main body 100 of the vacuum cleaner and flips the dust container upside-down, the compressed dust inside can be emptied to the outside.

Figure 12:
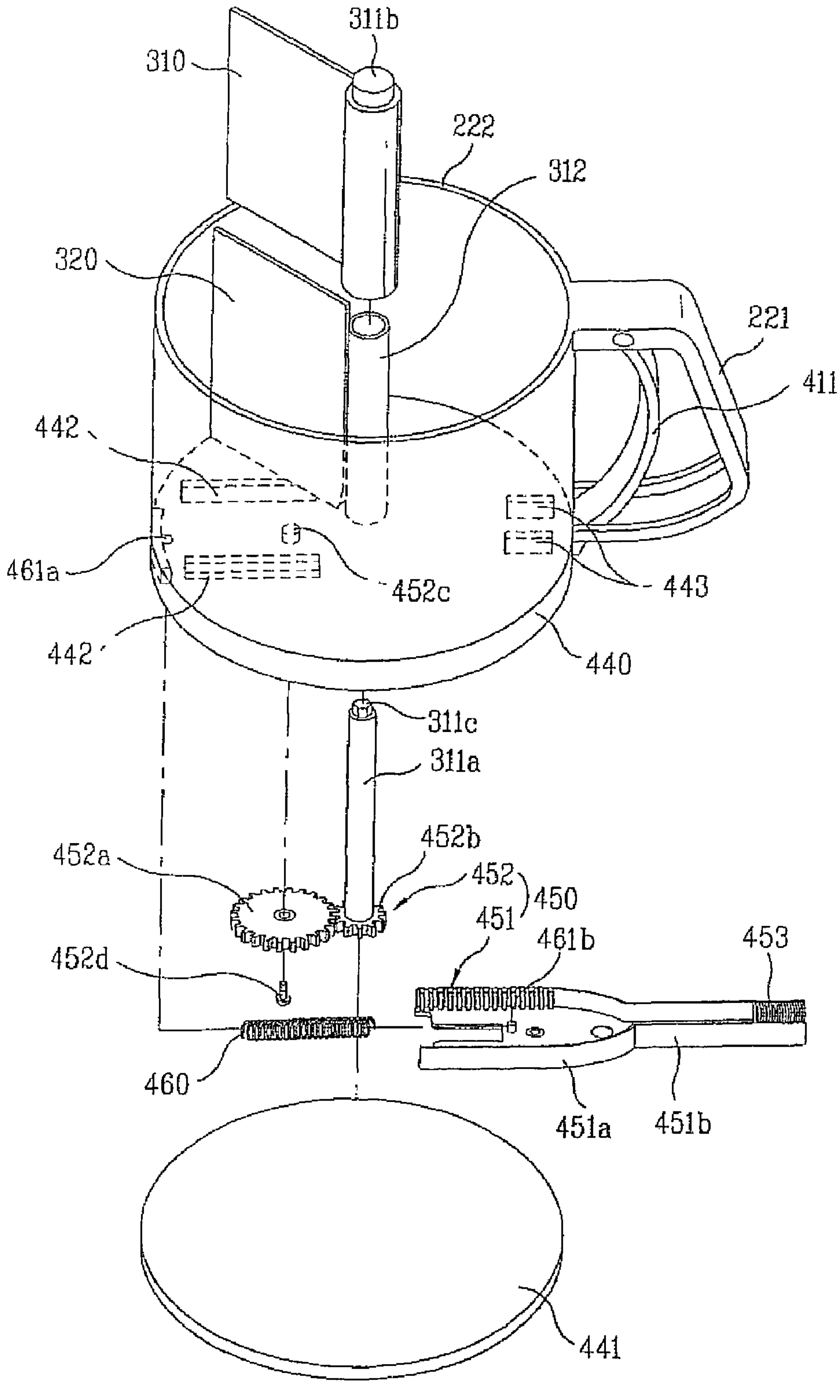
FIG. 12 is an exploded perspective view of a dust container portion having a manual-type rotating apparatus for compressing plates.
Figure 13:
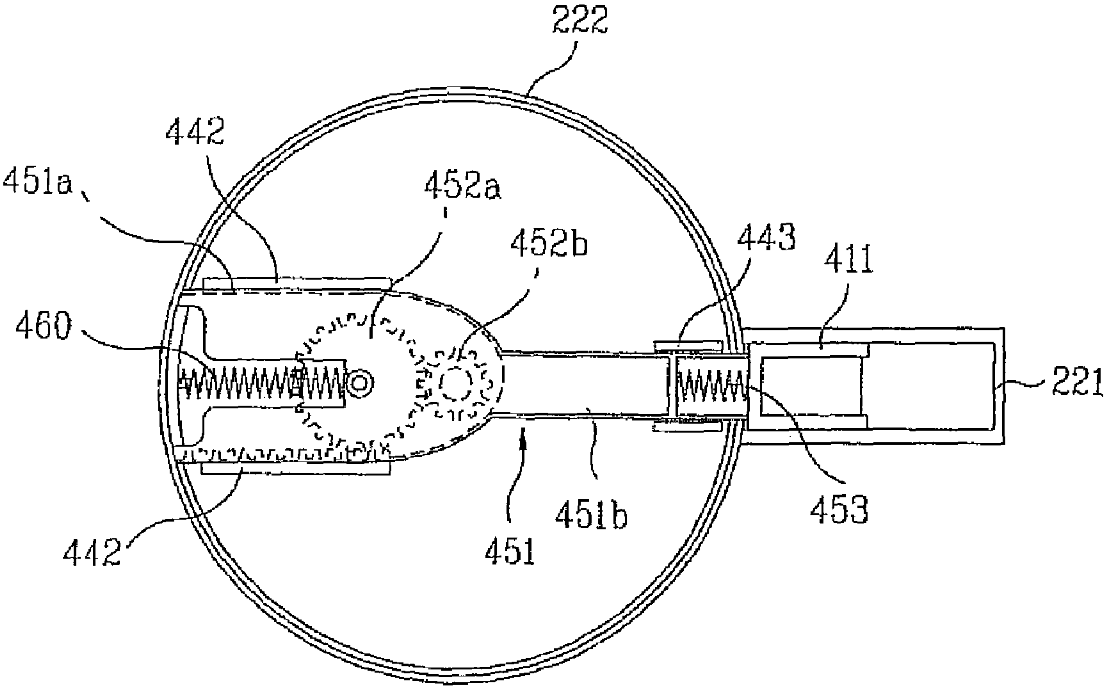
FIG. 13 is bottom plan view of the driving mechanism provided on the floor of the dust container portion of FIG. 12.

A second embodiment of a manually operated mechanism for compressing dust in a dust collector will now be described with reference to FIGS. 12 and 13. FIG. 12 is an exploded perspective view of a dust container and a manually operated rotating apparatus according to this second embodiment, and FIG. 13 is bottom plan view of the driving mechanism shown in FIG. 12.

In this embodiment, the manual-type rotating device has an operating part such as the lever 411 provided on the dust container handle as in the first embodiment. The force imparted on the lever 411 is transferred to the first compressing plate 310 through a driving mechanism 450. Because the coupling configuration of the lever is the same as in the description provided above, a repetitive description thereof will not be given.

The driving mechanism 450 includes a gear mechanism 451 and 452. In this embodiment, the gear mechanism 451 and 452 is composed of a rack bar 451, which is moved by means of the operating part (that is, the lever 411). A pinion gear 452*a* is rotated by the rack bar 451. A driven gear 452*b* is engaged with and driven by the pinion gear 452*a*. Here, as described in the first embodiment, the rack bar 451 includes a rack engaged with the pinion gear 452*a*. The driven gear 452*b* is directly connected to the rotating axis 311 of the first compressing plate.

In the above-described configuration, the gear mechanism 451 and 452 is provided on the floor of the dust container 220. The dust chamber 222 includes a driving mechanism compartment 440, for housing the driving mechanism formed on the bottom thereof. The driving mechanism compartment 440 may have a floor cover 441 that is detachably coupled to the floor of the dust container 220, to enable the installation of the gear mechanism, and for sealing the bottom of the dust container 220.

FIG. 13 shows the dust container 220 viewed from the bottom thereof with the floor cover 441 removed. The driven gear 452*b* is coupled to the rotating axis 311 of the first compressing plate, and the rack of the rack bar 451 is engaged with the pinion gear 452*a*.

In this embodiment, in order to install the rotating axis 311 of the first compressing plate, a hollow fixing shaft 312 disposed vertically along the central axis of the dust chamber 222 is fixed to the floor of the dust chamber 222. The rotating axis 311 of the first compressing plate includes an inner shaft and an outer shaft.

Here, the inner shaft 311*a* passes from the lower end of the dust container 220 through the floor of the dust chamber 222, and is inserted in the hollow cavity of the fixing shaft 312. Also, the bottom of the inner shaft 311*a* is installed in the central ceiling portion of the driving mechanism compartment 440, and is coupled to the driven gear 452*b*.

Additionally, a cavity is formed within the outer shaft 311*b*, so that the outer shaft 311*b* can be fitted over the inner shaft 312. The upper portion of the inner shaft 311*a* is coupled to the outer shaft 311*b*, and the outer and inner shafts 311*b* and 311*a* rotate simultaneously.

To enable the outer and inner shafts 311*b* and 311*a* to rotate simultaneously, the upper portion of the inner shaft 311*a* forms a multi-edged protrusion 311*c*, and a multi-edge receptacle (not shown) for receiving the multi-edged protrusion 311*c* inserted and coupled therein is formed in the upper end of the cavity of the outer shaft. Also, the outer surface of the outer shaft 311*b* is integrally formed with the first compressing plate 310.

Next, the pinion gear 452*a* is connected to a pinion shaft 452*c* protruding upward from the ceiling of the driving mechanism compartment 440, and is engaged with the driven gear 452*b*. Also, a stopper screw 452*d*, for preventing the disengagement of the pinion gear 452*a* from the pinion shaft 452*c*, is screwed to the pinion shaft 452 to support the bottom of the pinion gear 452*a*.

Guide ribs 442 and 443 for guiding a linear movement of the rack bar 451 may be disposed in the driving mechanism compartment 440.

In the present embodiment, the rack bar 451 has a body that is in a rough Y-shape. Here, the Y-shaped body may have a pair of branches 451*a* that are parallel. One of the branches 451*a* of the Y-shaped body forms the rack on its inner surface.

To more reliably guide the linear movement of the rack bar 451, the driving mechanism compartment 440 may have pair of first guide ribs 442 integrally formed on the ceiling and protruding in a downward direction. The pair of first guide ribs 442 run parallel to each other, and the pair of branches 451*a* of the Y-shaped body are disposed between the pair of first guide ribs 442 to slide therebetween. A pair of second guide ribs 443 may be integrally formed with the ceiling of the driving mechanism compartment 440 to run parallel to one another, so that the branches 451*b* of the Y-shaped body may slide therebetween. Therefore, the rack bar 451 has a secure passage for movement formed by the first and second guide ribs 442 and 443.

In order to increase rotating torque of the manual-type rotating device, the diameter of the driven gear 452*b* may be smaller than the diameter of the pinion gear 452*a*.

The first compressing plate 310, as described in the first embodiment, may be configured to return to its original position when the external force imparted on the lever 411 is removed. In this embodiment, a return unit that is connected to the manual-type rotating device may be further provided, to return the first compressing plate 310 to its original position. The return unit includes a return spring 460. The return spring 460 is an extension spring installed between the inner wall of the driving mechanism compartment 440 and the rack bar 451.

One end of the return spring 460 is connected to a first connecting part 461*a* provided on the inner wall of the driving mechanism compartment 440, and the other end of the return spring 460 is connected to a second connecting part 461*b* provided on the Y-shaped body of the lever 411 of the rack bar 451. The return spring 460 crosses the lower end of the pinion gear 452*a*, and is connected to the rack bar 451. When a user pulls the lever 411 outward, the return spring 460 is extended, When the external force on the lever 411 is removed, the extended return spring 460 contracts and returns the rack bar 451 and the first compressing plate 310 to their original positions.

The driving mechanism 450 and the lever 411 of the operating part may be directly connected. However, in this embodiment, the driving mechanism 450 is indirectly connected to the operating part 410 via a shock absorbing spring. The rack bar 451 is connected to the lever 411 through the shock absorbing spring 453. The shock absorbing spring 453 has one end connected to the rack bar 451 and the other end connected to the lower end of the lever 411.

The shock absorbing spring 453 prevents excessive force being transferred to the first compressing plate 310. That is, when the first compressing plate 310 reaches a point where it can no longer proceed while rotating to compress dust, and force is continuously exerted on the lever 411, the shock absorbing spring absorbs the external force, preventing the transfer of excessive force to the first and/or second compressing plates 310 and/or 320.

In the above-described embodiments, the dust collector with the compressing plates has been used in a canister-type vacuum cleaner. However, the present invention is not limited thereto, and may be applied to an upright-type, a robot-type, or other types of vacuum cleaners.

A vacuum cleaner using the above-described dust compressing plates has many advantages over related art vacuum cleaners. First, a dust collector as described above minimizes the volume of dust stored inside the dust container when a user manually compresses the dust. As a result, the dust container's dust storing capacity is maximized.

Second, the dust collector according to the present invention has compressing plates that compress dust through a rotational movement within the dust container to reduce the volume of the dust. This helps to prevent a scattering of collected dust upward into the cyclone, thereby improving the dust collecting capability of the dust collector.

Third, because the movable compressing plate automatically resumes its original position the compressed dust within the dust container can easily be emptied to the outside.

Figure 14:
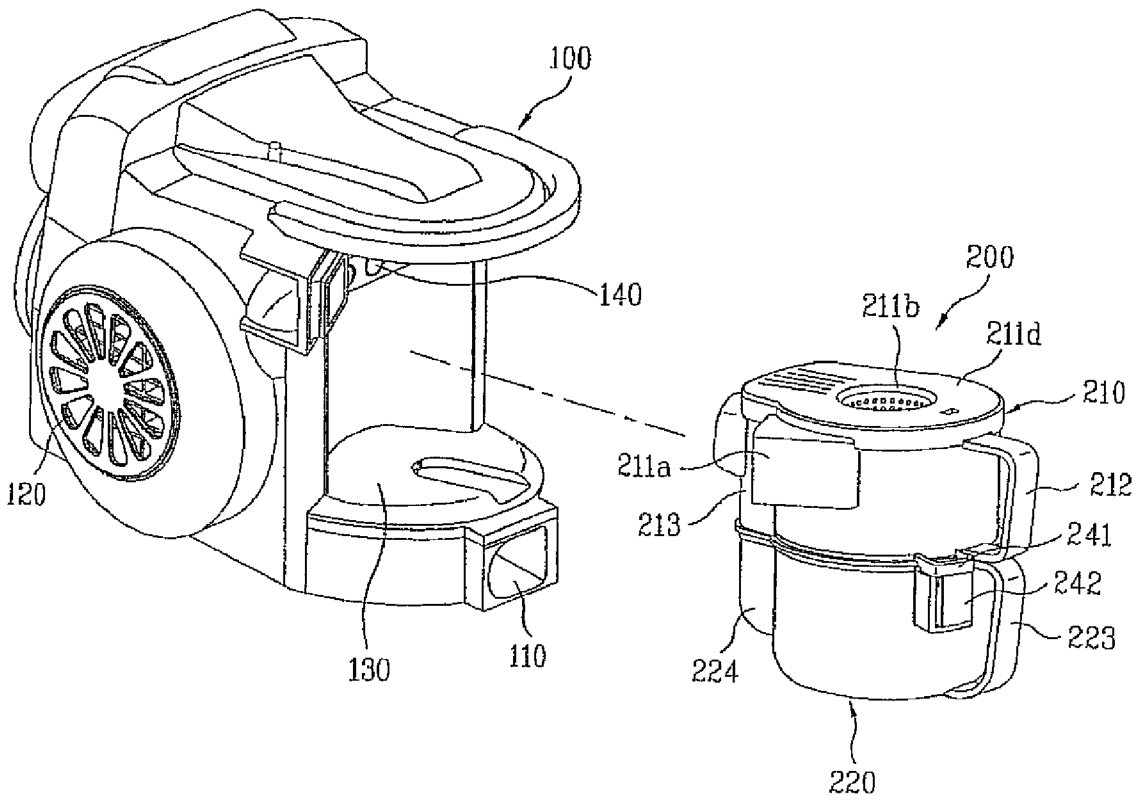
FIG. 14 is a perspective view of another embodiment where a dust collecting unit is removably mounted on a main body of a vacuum cleaner.

Another embodiment having an automatic motorized mechanism for compressing dust in the dust collection unit will now be described with reference to FIGS. 14-21. The vacuum cleaner in this embodiment, as shown in FIG. 14, includes a main body 100, and a dust collector 200. A main body intake port 110 is provided at the front, lower portion of the main body 100 of the vacuum cleaner, for communicating with a suctioning nozzle, and a main body exhaust port 120 for exhausting air separated from the dust in the dust collector 200 is disposed on a side of the main body 100.

As in the previous embodiment, the dust collecting unit includes a dust separator 210 for separating dust from flowing air, and a dust container 220 for storing the dust separated by the dust separator 210. The dust separator 210 includes a cyclone 211 which uses the cyclone principle. The dust that is separated by the cyclone 211 is stored inside the dust container 220.

Figure 15:
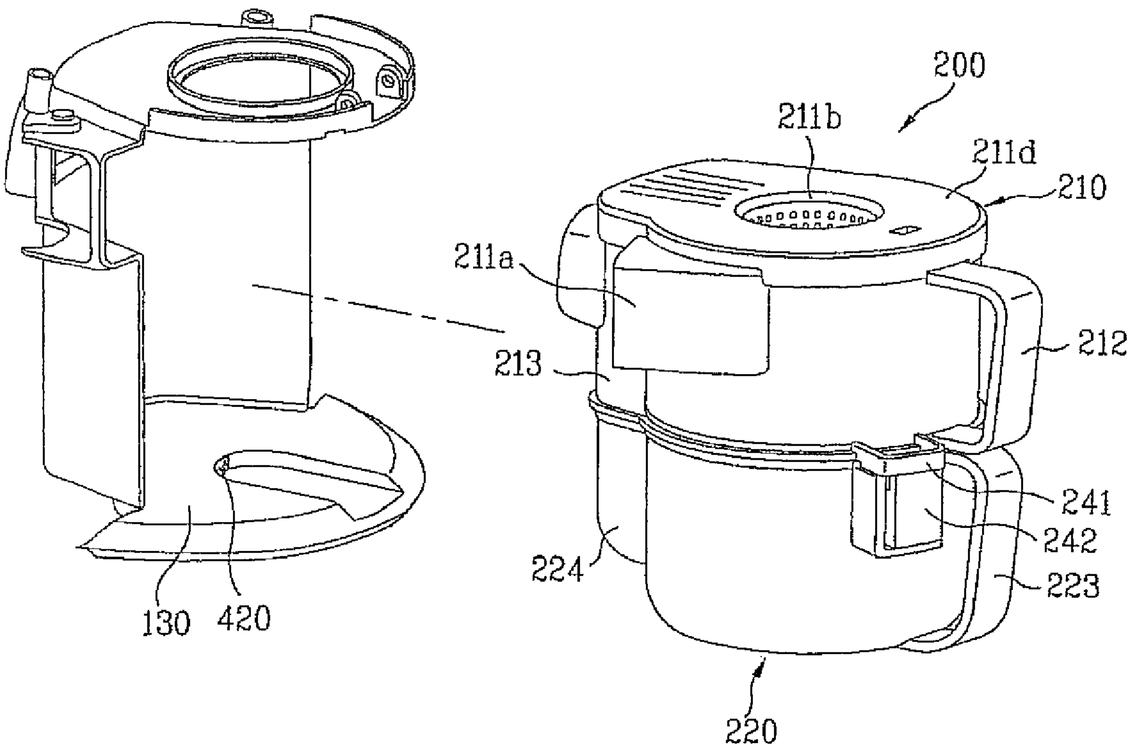
FIG. 15 is a perspective view showing the dust collecting unit in FIG. 14 separated from its receiving portion on the main body.
Figure 16:
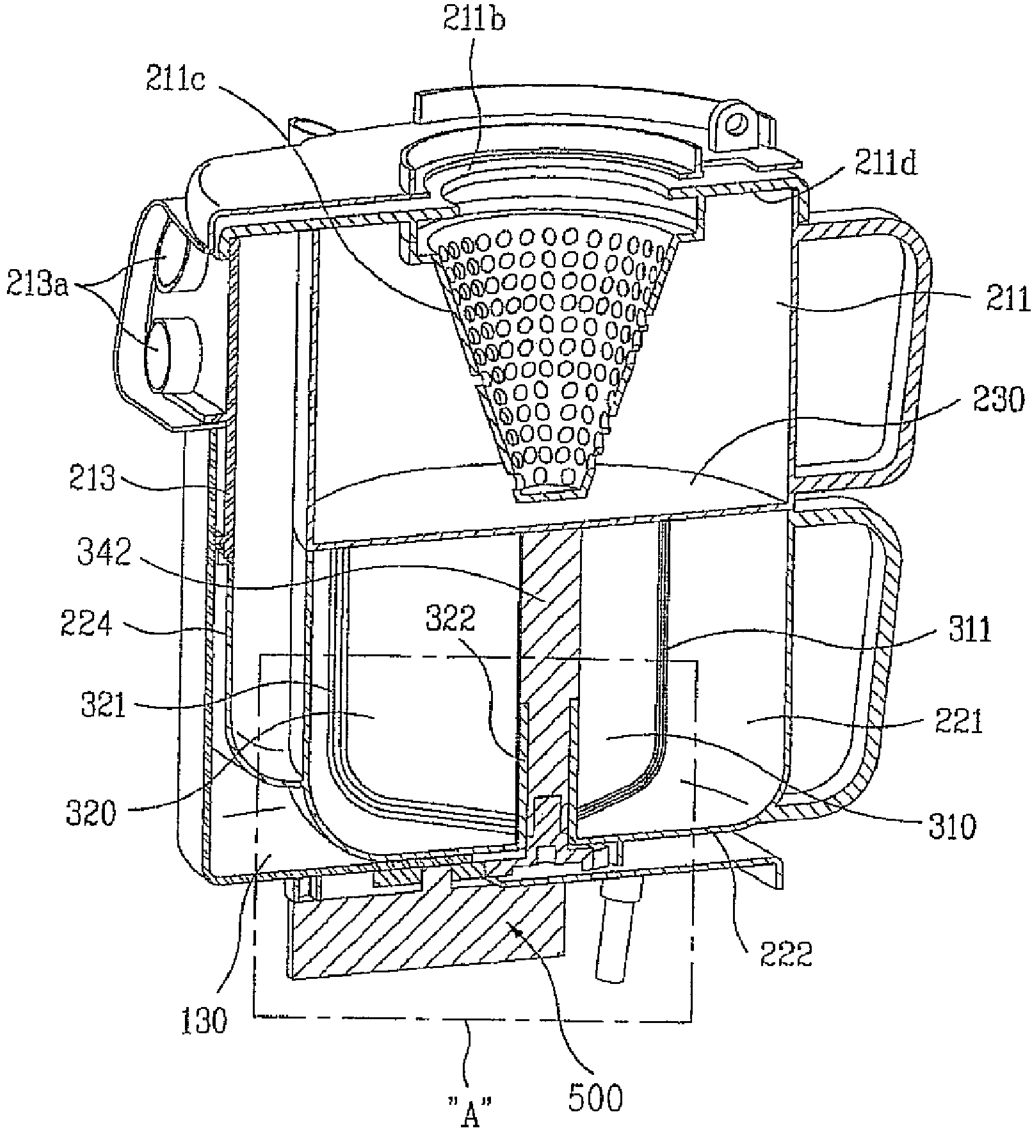
FIG. 16 is a cutaway perspective view of the dust collecting unit in FIG. 14.
Figure 17:
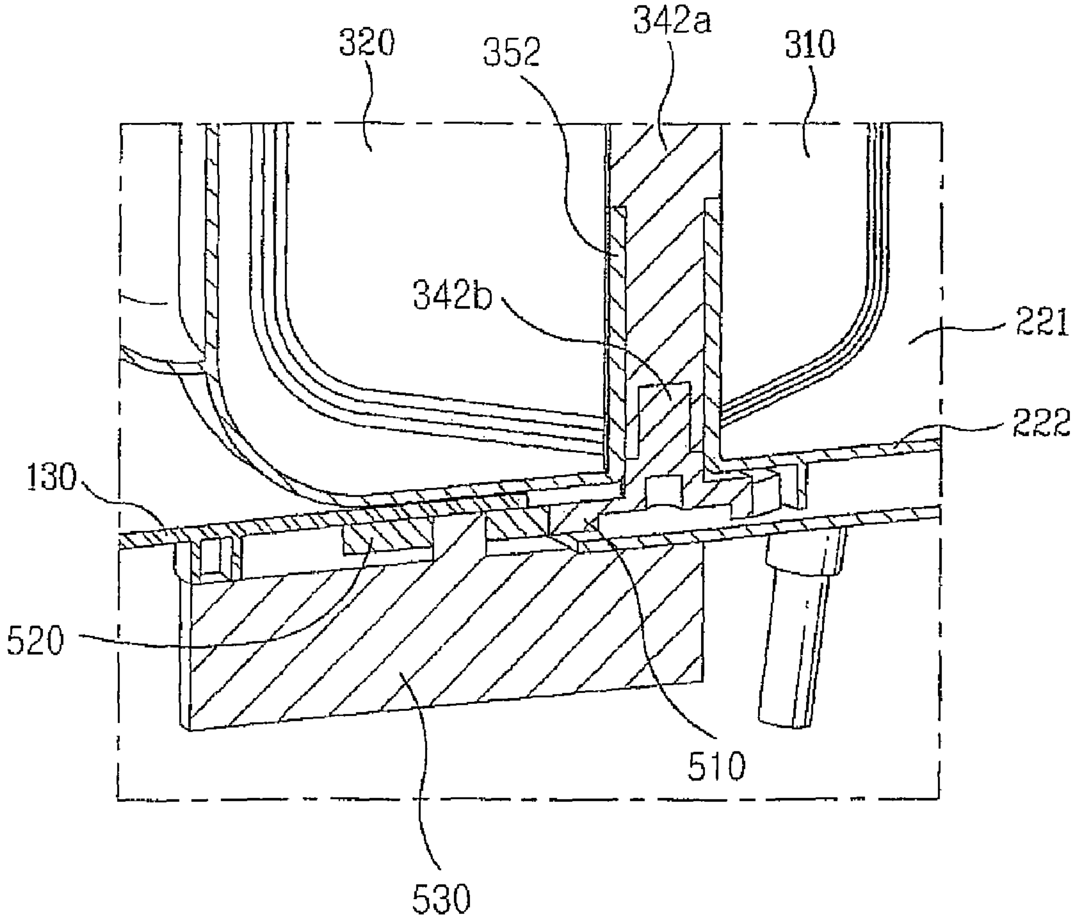
FIG. 17 is an enlarged view of section A in FIG. 16.
Figure 18:
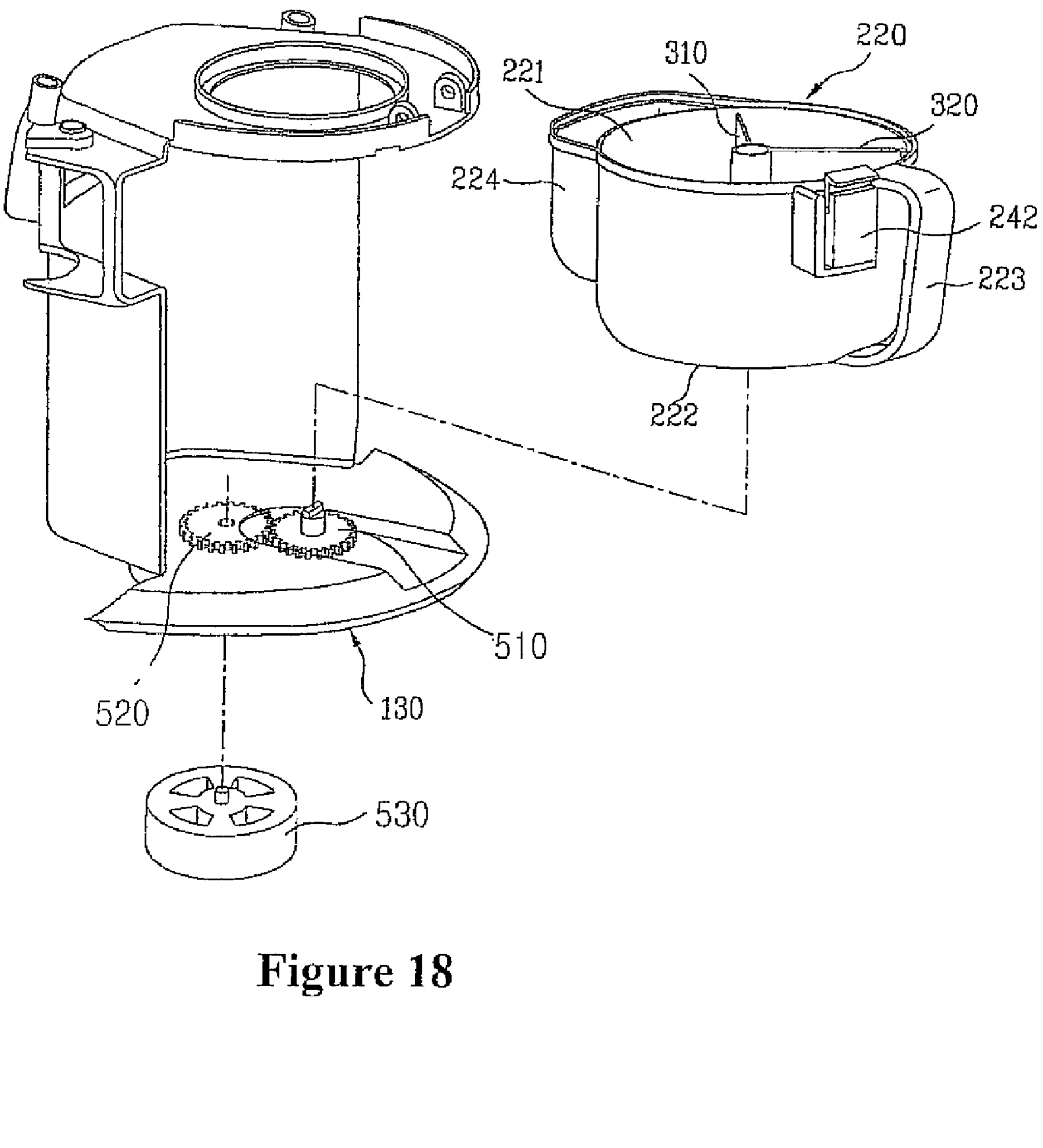
FIG. 18 is an exploded perspective view showing how a driving unit for compressing dust in the dust collecting unit is assembled.

Details of the dust collector will now be described with reference to FIGS. 15-18. FIG. 15 is a perspective view showing the dust collecting unit in FIG. 14 separated from its receiving portion on the main body. FIG. 16 is a cutaway perspective view of the dust collecting unit in FIG. 14. FIG. 17 is an enlarged view of section A in FIG. 16. FIG. 18 is an exploded perspective view showing how a driving unit for compressing dust in the dust collecting unit is assembled.

As shown in FIGS. 16-18, a pair of compressing plates 310 and 320 are provided in the dust collecting unit. The dust compressing plates act to reduce the volume of the dust stored in the dust container 220, thereby increasing the overall dust storage capacity of the dust collection unit.

Here, the pair of compressing plates 310 and 320 mutually interact to compress dust and reduce its volume, so that amount of dust stored per unit of volume (or the density) in the dust container 220 can be increased. In this embodiment, at least one of the pair of compressing plates 310 and 320 is movably provided within the dust container 220, and dust is compressed between the pair of compressing plates 310 and 320.

In embodiments where both the first and second compressing plates 310 and 320 are movably disposed within the dust container 220, the first and second compressing plates 310 and 320 both rotate toward one another, so that the space between one side of the first compressing plate 310 and the one side of the second compressing plate 320 facing the one side of the first compressing plate 310 becomes narrower. Thus dust that is disposed between the first and second compressing plates 310 and 320 is compressed.

However, in this embodiment, only the first compressing plate 310 is movably disposed within the dust container 220. The inner surface of the dust chamber 221 is opened to allow rotation of the first compressing plate 310. The inner surface of the dust chamber 221 forms a curve that is traced by the free edge of the first compressing plate 310 as it rotates within the dust chamber 221.

In the present embodiment, the second compressing plate 320 is fixed within the dust chamber 221. The second compressing plate 320 may be provided between the inner surface of the dust chamber 221 and the rotating center of the first compressing plate 310, which is defined by an axis of a rotating shaft 342. The second compressing plate 320 forms a wall that defines a plane between an axis of the rotating shaft 342 and the inner surface of the dust chamber 221. The second compressing plate 320 may entirely or partially seal a passage defined between the inner surface of the dust chamber 221 and the axis of the rotating shaft 342. When dust is pushed by the first compressing plate 310, the second compressing plate 320 can compress the dust together with the first compressing plate 310.

In some embodiments, one end 321 of the second compressing plate 320 may be integrally formed on the inner surface of the dust chamber 221, and the other end may be integrally formed with a fixing shaft 322 coaxially provided with the rotating shaft 342 of the first compressing plate 310. Of course, the one end of the second compressing plate 320 may be integrally formed with the inner surface of the dust chamber 221, or the other end only may be integrally formed with the fixing shaft 322. In other words, the second compressing plate 320 is fixed to at least one of the inner surface of the dust chamber 221 and the fixing shaft 322.

Even if the one end of the second compressing plate 320 is not integrally connected to the inner surface of the dust chamber 221, the end of the second compressing plate 320 may be disposed proximally to the inner surface of the dust chamber 221. Also, even if the other end of the second compressing plate 320 is not integrally fixed to the fixing shaft 322, the other end of the second compressing plate 320 may be proximally disposed to the fixing shaft 322. Also, the second compressing plate 320 may be either integrally connected with an end of the dust chamber 221 or is disposed proximately to an end of the dust chamber 221.

When the second compressing plate is configured as described above, dust that is pushed by the first compressing plate 310 is prevented from leaking through gaps formed at sides of the second compressing plate 320.

The first and second compressing plates 310 and 320 may be formed in rectangular shapes. However, depending on the interior shape of the dust chamber 221, the dust compressing plates may have other shapes.

The rotating shaft 342 of the first compressing plate may be disposed on the same axis as the center of the dust chamber 221. Also, the dust chamber 221 may have a cylindrical interior space.

Here, the free edge of the first compressing plate 310 (that is, the outer edge) may be disposed as close as possible to the inner surface of the dust chamber 221 while it rotates.

The fixing member 322 may protrude inward from one end of the dust chamber 221. In order to assemble the rotating shaft 342, the fixing shaft 322 may have a hollow cavity formed along the length of its interior, and a through-hole (not shown) may be formed at one end of the dust chamber 221 to communicate with the interior of the fixing shaft 322.

A vacuum cleaner according to this embodiment would also include a driving unit 500 connected to the rotating shaft of the first compressing plate 310, for rotating the first compressing plate 310. Referring to FIGS. 17 and 18, the driving unit 500 includes a driving mechanism 510 and 520 for transferring a driving force for rotating the first compressing plate 310 to the rotating shaft.

The driving mechanism 510 and 520 includes a driven gear 510 which cam be coupled to the rotating shaft 342 of the first compressing plate 310. A driving gear 520 transfers a driving force to the driven gear 510. The driving gear 520 is coupled to a rotating shaft of a driving motor 530 and is turned by the driving motor 530. Accordingly, the driving motor can be used to cause the first compressing plate 310 to rotate automatically to compress dust stored inside the dust container 220.

In this embodiment, one end portion of the dust container 220 forms the floor of the dust container 220 while it forms a side portion of the dust chamber 221 at the same time. The floor 222 of the dust container 220 is supported by the floor of the dust collecting unit mounting portion 130 on the main body 100.

The driving motor 530 is disposed below the dust collecting unit mounting portion 130. The driving gear 520 is coupled with the rotating shaft of the driving motor 530 and is disposed on the floor of the dust collecting unit mounting portion 130. A portion of the outer surface of the driving gear 520 is exposed in the floor of the dust collecting unit mounting portion 130.

The lower side of the floor of the dust collecting unit mounting portion 130 may form a motor compartment (not shown) so that the driving motor 430 can be installed therein. The approximate center of the dust collecting unit mounting portion 130 forms an opening for exposing a portion of the outer circumference of the driving gear 520.

When the rotating shaft 342 of the first compressing plate 310 is rotatably installed to pass through the floor of the dust chamber 221, and the cavity of the fixing shaft 322, the driven gear 510 is coupled to the lower end of the rotating shaft 342. To allow the rotating shaft 342 (to which the first compressing plate 310 is coupled) to be assembled to the dust container 220, the rotating shaft 342 includes an upper shaft **342*a* coupled to the first compressing plate 310 and a lower shaft 342*b* coupled to the driven gear 510. A stepped portion, supported by the upper end of the fixing shaft 322, is formed on the upper shaft 342*a*, and the lower end of the upper shaft 342*a* is coupled to the upper portion of the lower shaft 342*b*. The upper shaft 342*a* is inserted a predetermined depth from the upper end of the fixing shaft 322 into the cavity. The lower shaft 342*b* passes through a through-hole (not shown) formed in the floor of the dust container 220 or one end of the dust chamber 221, and is inserted in the cavity of the fixing shaft 322**.

The upper portion of the lower shaft **342*b* is coupled to the lower end of the upper shaft 342*a*, and rotates integrally with the upper shaft 342*a* and the lower shaft 342*b*. To allow the upper shaft 342*a* and the lower shaft 342*b* to integrally rotate, a coupling protrusion may be formed on an end of one of the upper shaft 342*a* and the lower shaft 342*b*, and a coupling receptacle may be formed on the other shaft. For instance, the lower surface of the upper shaft 342*a* may have a coupling protrusion formed in the shape of a "–" or a "+" sign, and the upper surface of the lower shaft 342*b*** may also be formed in a "–" or a "+" sign.

The lower portion of the lower shaft **342*b* is integrally coupled with the driven gear 510, and is installed below the floor of the dust container 220. When the dust collection unit is mounted on the main body, the portion of the outer surface of the driving gear that is exposed in the floor of the dust collecting unit mounting portion 130 is engaged with the driven gear 510 provided below the floor of the dust container 220**.

Figure 19A:
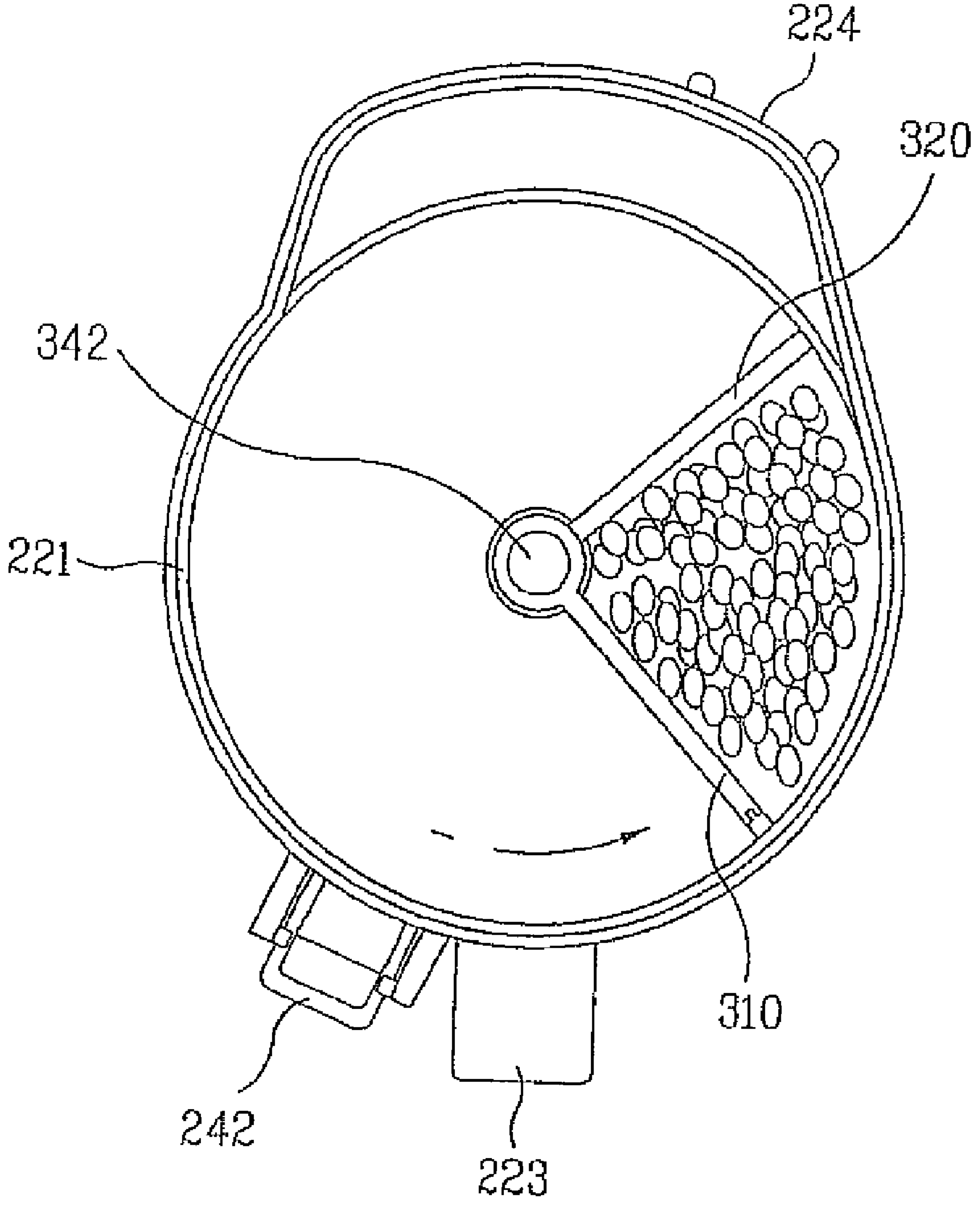
FIGS. 19*a* and 19*b* are plan views showing how a dust collecting unit of a vacuum cleaner compresses dust.
Figure 19B:
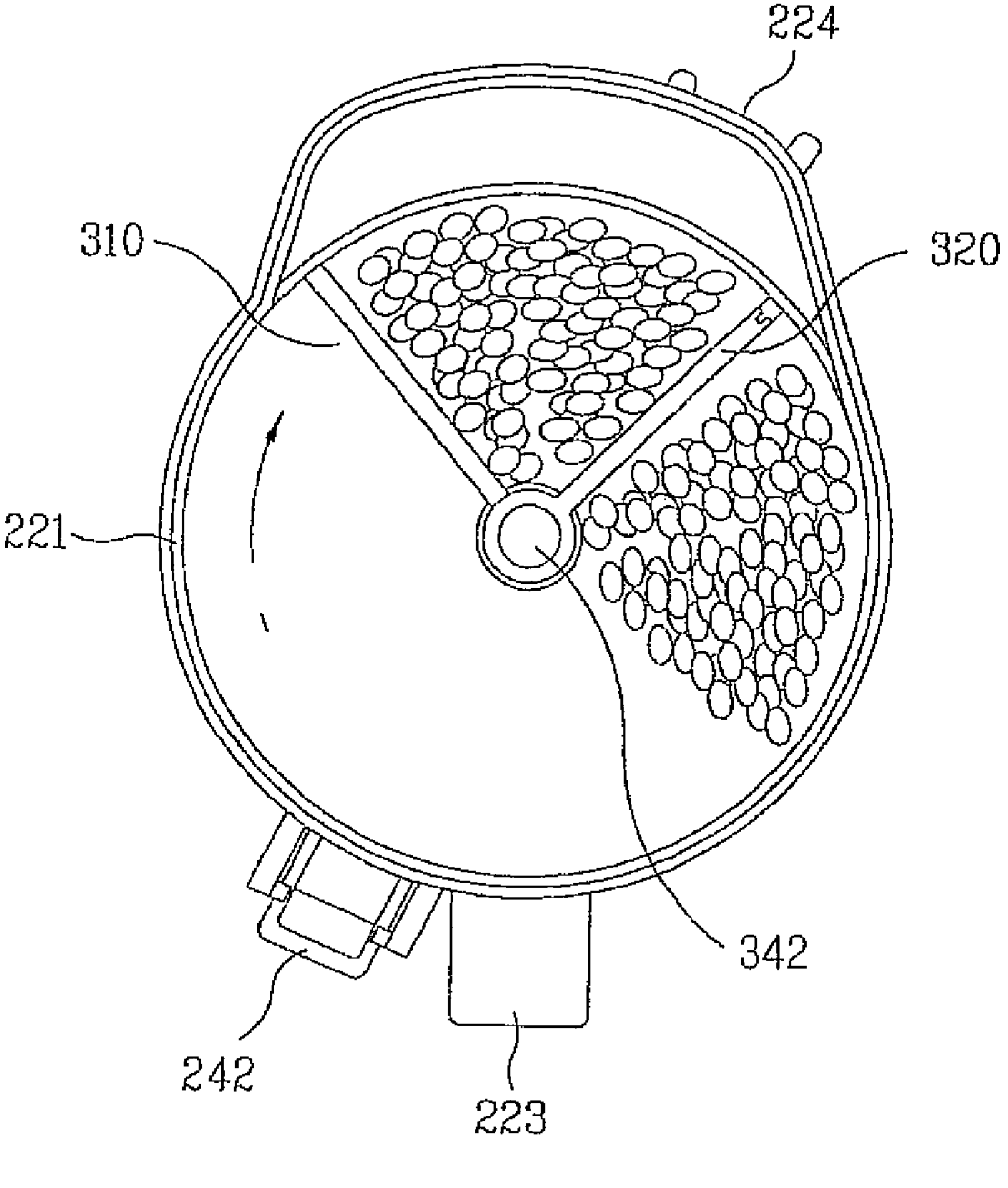

The driving motor 430 may be a motor capable of both forward and reverse operation. In other words, the driving motor 430 may be a motor capable of rotating in either direction. This would give the first compressing plate 310 the capability of both forward and reverse rotation. In this instance, dust could pushed against both sides of the second (fixed) pressing plate 320, by rotating the first compressing plate 310 in both directions, as shown in FIGS. 19*a* and 19*b*.

Also, even when the first compressing plate 310 reaches a point where it cannot move any further in the compressing directions after operating for a predetermined duration to compress the dust, the force from the driving motor that is relayed to the rotating shaft 312 may be continuously applied for another predetermined duration.

Also, the driving motor 430 may rotate the first compressing plate 310 at an equal angle and speed in both directions for a predetermined period of operation, in order to more easily compress stored dust.

The driving motor 430 may be a synchronous motor. Since a synchronous motor is well known to those skilled in the art, a description thereof will not be provided. It is worth stating, however, that a synchronous motor may be applied to the present invention from a technical perspective.

Figure 20:
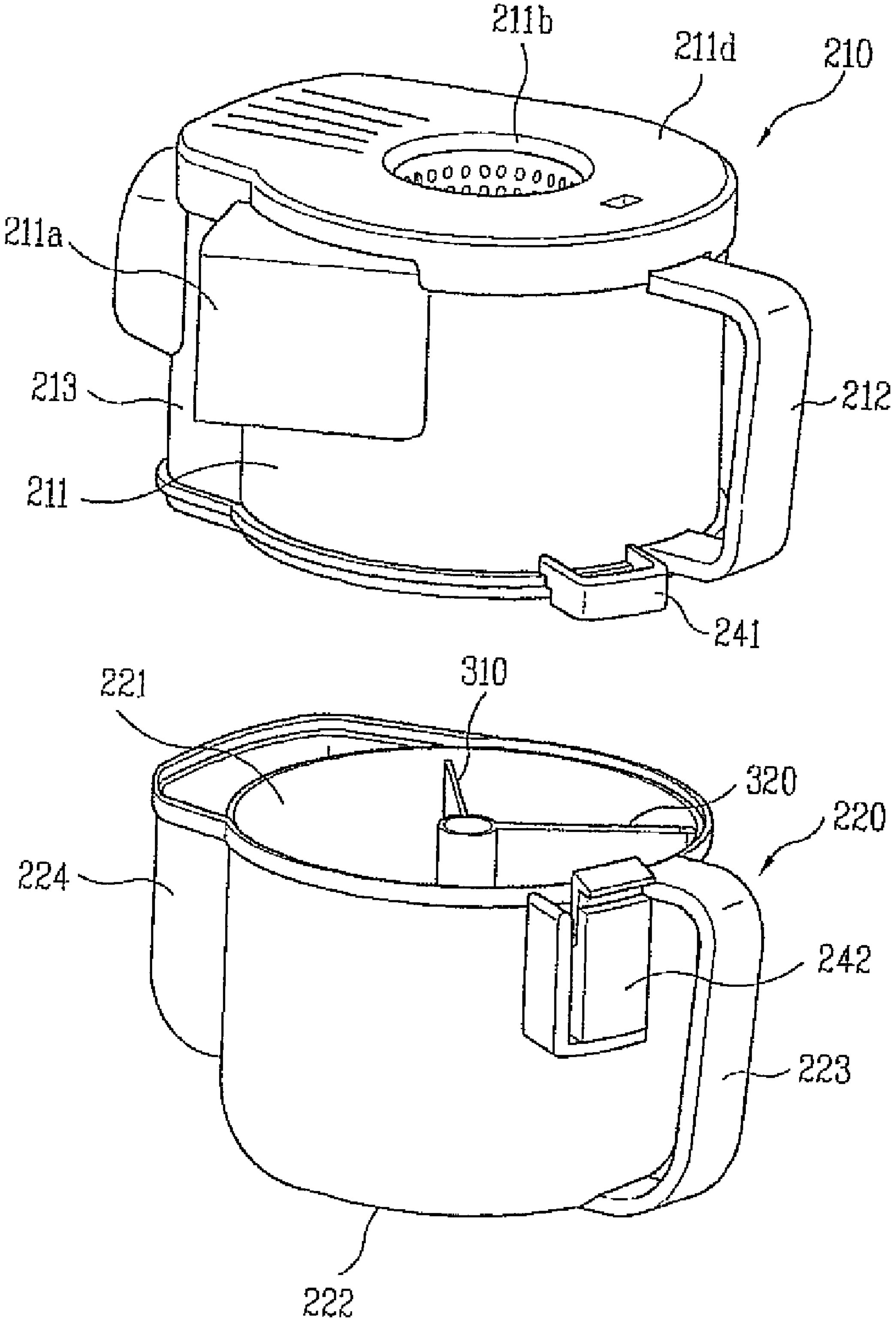
FIG. 20 is a disassembled view of a cyclone and a dust container from the dust collecting unit in FIG. 16.
Figure 21:
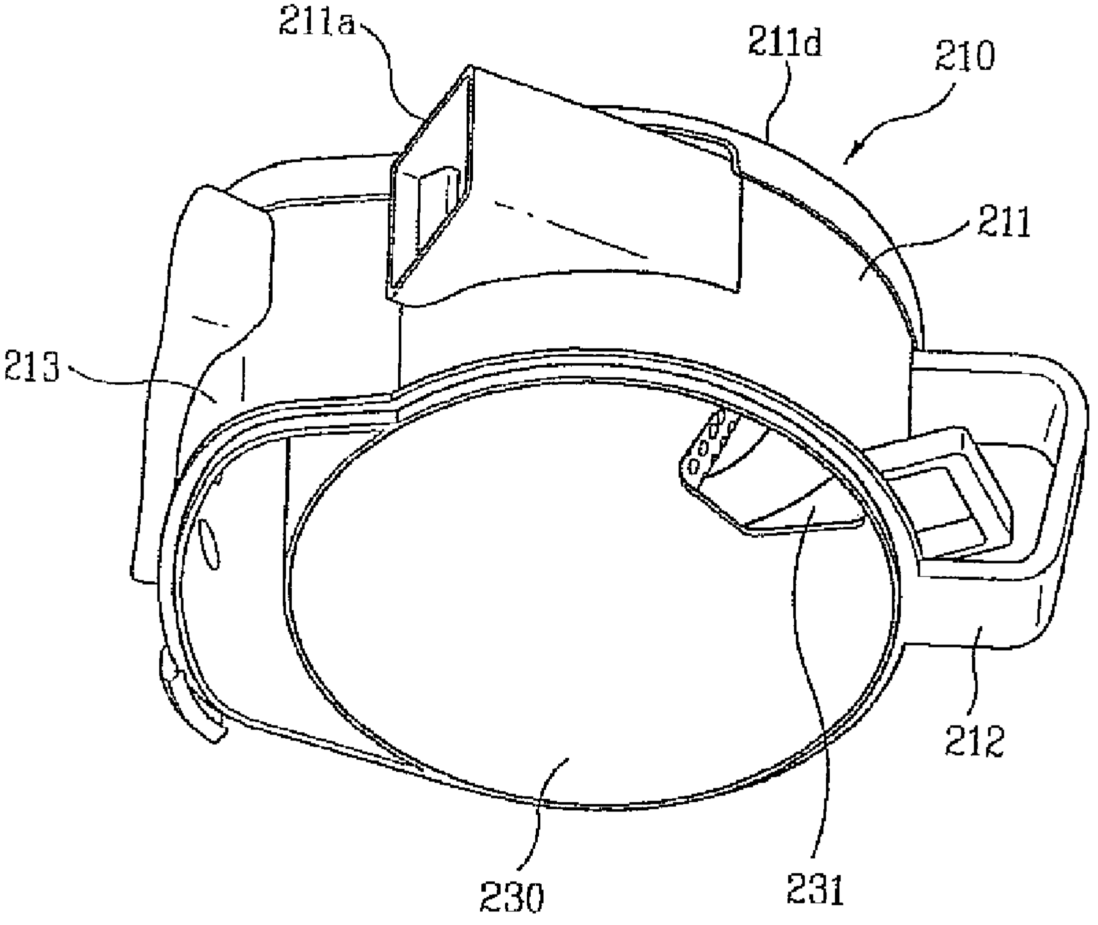
FIG. 21 is a perspective view of the cyclone in FIG. 20 as seen from underneath.

Referring to FIGS. 20 and 21, the dust separator 210, or the cyclone 211, may be disposed above the dust container 220. An intake port 211*a* may be disposed tangentially to the upper, outer surface of the cyclone 211, for admitting an incoming flow of dust laden air. An exhaust port 211*b* may be formed at the center of the cyclone's 211 ceiling for exhausting air that has been filtered in the first filtering stage within the cyclone 211.

A hollow exhaust member 211*c* may be coupled to the exhaust port 211*b*. The outer surface of the exhaust member 211*c* has a plurality of through-holes formed therein to exhaust air that has undergone a dust separating process of the cyclone 211. The ceiling of the cyclone 211 includes a cover 211*d* that is removably attached around the upper perimeter of the cyclone 211.

The cyclone 211 and the dust container 220 are separated by a dividing plate 230. The dividing plate 230 forms the ceiling of the dust chamber 221. Here, the upper portions of the first and second compressing plates 310 and 320 may be disposed close to the bottom of the dividing plate 230.

A dust intake 231 is disposed on an edge of the dividing plate 230, so that the dust separated by the cyclone 211 can enter the dust chamber 221. The dust intake 231 is formed at an out edge of the dividing plate 230.

In some embodiments, the dust intake 231 may be located at a side of the dust chamber 221 that is opposite to the location of the fixed second compressing plate 320. This arrangement allows for the quantity of the dust compressed on either side of the second compressing plate 320 to be maximized. In addition, if the dust in the dust chamber 221 is swept by the movable first compressing plate away from the dust intake 231, the dust will be less likely to scatter back up to the cyclone 211 when the vacuum cleaner is being operated.

In this embodiment, the dust container 220 is separated from the cyclone 211 in the main body 100 of the vacuum cleaner. The dust container 220 is removably provided at the lower portion of the cyclone 211. Also, the dividing plate 230 is integrally formed with the cyclone 211, forming the floor of the cyclone 211.

With the exception of a portion of the edge of the dividing plate 230 that forms the dust intake 231, the dividing plate is integrally connected to the lower perimeter of the cyclone 211. This prevents dust from rising into the cyclone during the compressing process, and also prevents dust from scattering from the dust container 220 due to the flow of air inside the cyclone 211.

In some embodiments, a user may separate only the dust container 220 to empty it. On the other hand, when cleaning of the cyclone's 211 interior is required, the user may separate the cyclone 211 from the main body 100 of the vacuum cleaner and open the cover 211*d* to easily clean the inside of the cyclone 211.

To remove and attach the dust container 220 and the cyclone 211 as above, an upper handle 212 and a lower handle 223 are respectively formed on the outer surfaces of the cyclone 211 and the dust container 220.

Also, in order to couple the dust container 220 and the cyclone 211, the dust collector has a hook fastener. The outer, lower surface of the cyclone 211 has a hook receptacle 241 formed thereon. The upper, outer surface of the dust container 220 has a hook 242 formed thereon, so that the hook 242 may selectively be coupled to the hook receptacle 241, in order to fix the dust container 220 beneath the cyclone 211.

In embodiments where the first compressing plate 310 is a rotating plate and the second compressing plate 320 is a fixed plate, the first compressing plate 310 should be positioned apart from the compressed dust when the vacuum cleaner is turned off so that dust can be easily emptied from the dust chamber.

Also, when a quantity of dust exceeding a predetermined amount is collected inside the dust chamber 221, a signal may be given to a user that it is time to empty the dust container 220. This would help to prevent a drop in vacuuming ability and an overloaded driving motor. For this purpose, an alarm indicator (not shown) may be installed on the main body 100 of the vacuum cleaner or on the dust collecting unit, so that when the range of movement of the first compressing plate 310 falls below a predetermined range, due to a large quantity of dust having been collected in the dust chamber 221, the alarm indicator may notify the user that it is time to empty the dust container 220.

In some embodiments the vacuum cleaner may include both a main cyclone and a secondary cyclone. For instance, the above-described cyclone 211 could be called the main cyclone, and the dust chamber 221 could be called the main chamber. In some embodiments, the vacuum cleaner may further include a secondary cyclone unit that is mounted on the main body. Also, an auxiliary dust chamber 224 may be provided on the dust collecting unit to store dust separated in the secondary cyclone unit.

In the embodiment shown in FIG. 20, an auxiliary dust chamber 224 is provided on the outer surface of the dust collecting unit with its upper end open. An auxiliary dust entrance 213 on the outer surface of the main cyclone 211 communicates with the auxiliary dust chamber 224. The outer wall of the auxiliary dust entrance 213 has an auxiliary dust entrance hole 213*a* that may be formed to selectively communicate with a dust exhaust of the secondary cyclone. The floor of the auxiliary dust entrance 213 may be opened and connected to the top end of the auxiliary dust chamber 224 so that dust separated in the secondary cyclone can fall into and be stored in the auxiliary dust chamber 224.

In embodiments with motor driven compressing plates, no action on the part of the user is required to compress the dust in the dust collection unit. Also, if movements of the compressing plates are used to determine when the dust collection unit is full, the vacuum cleaner can provide the user with an indication that it is time to empty the dust collection unit.

A method for operating a dust compressing collector will now be described with reference to FIGS. 22 and 23. This method could be performed by a vacuum cleaner with a motorized set of compression plates, as in the embodiment described immediately above. This method could also be performed in an embodiment where two or more compression plates move towards one another to compress dust.

Figure 22:
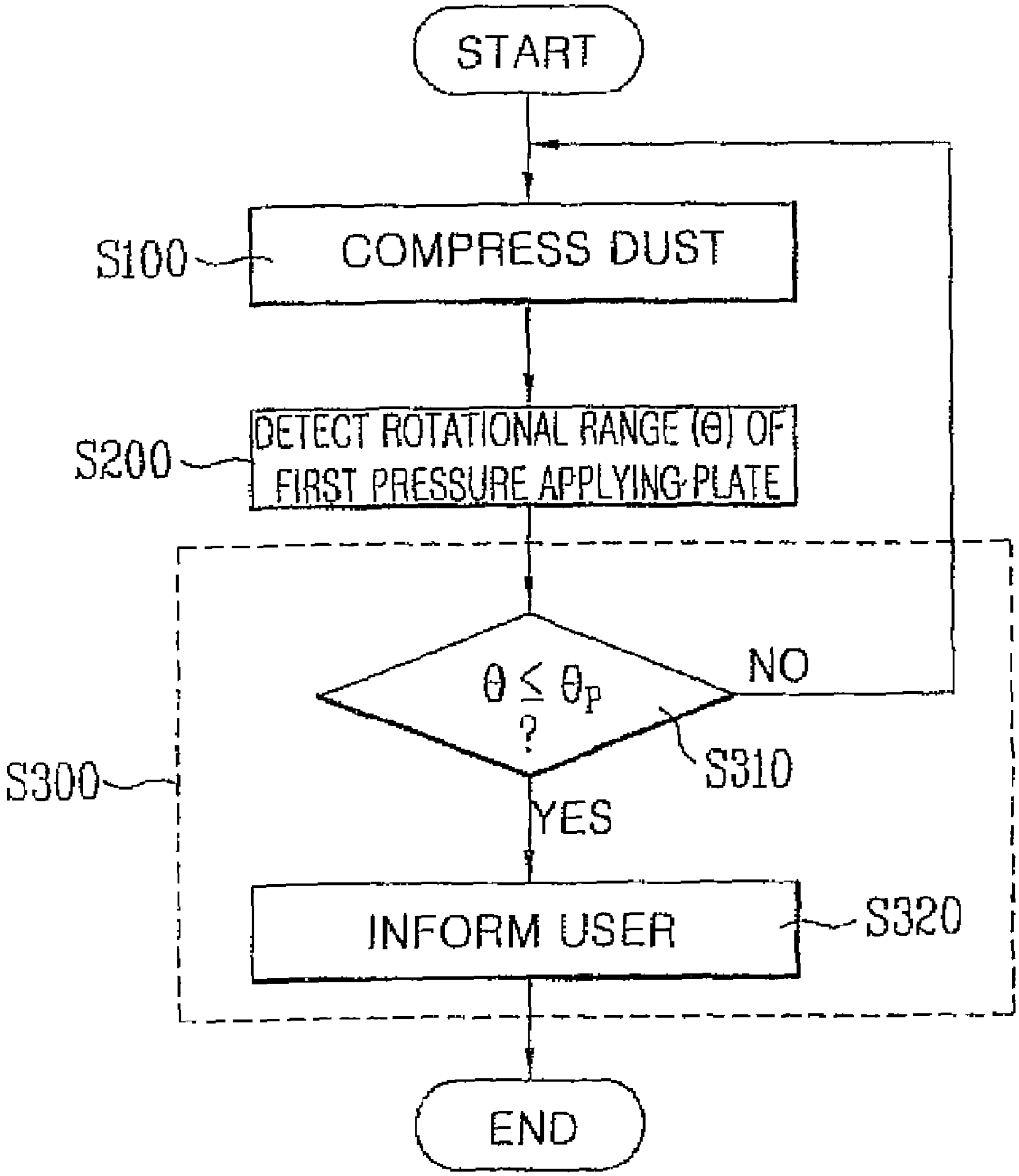
FIG. 22 is a flowchart of a method for operating a dust compressing collector.

With reference to FIG. 22, during a first step S100 of the method, the dust compressing collector compresses dust stored in a dust container by the interaction of a pair of compressing plates to reduce the volume of the dust. This compressing step could involve one compressing plate moving in a single direction to compress dust against one side of a fixed compressing plate. Alternatively, one movable compressing plate could move in two opposite directions to compress dust against opposite sides of a fixed compressing plate. In still other embodiments, two or more movable compressing plates could be moved towards each other to compress dust between the plates.

In a second step S200, a rotation range θ of a first compressing plate is detected. In other words, a detector would monitor the movement of at least one compressing plate during the compressing operation step S100, and the detector would determine the rotation angle traversed by the compressing plate during the compressing operation.

The method would then proceed to step S310 where the detected rotation angle traversed by the compressing plate would be compared to a predetermined rotation angle θp. If the angle traversed by the compression plate was greater than the predetermined angle θp, the method would loop back to step S100. If the angle traversed by the compression plate was less than or equal to the predetermined angle θp, the method would proceed on to a warning step S320.

In step S320, the vacuum cleaner would provide an indication to the user that the dust collection unit was full and needed to be emptied. The warning step S320 could include sounding an audible warning tone, illuminating a warning light, or by various other methods.

Figure 23:
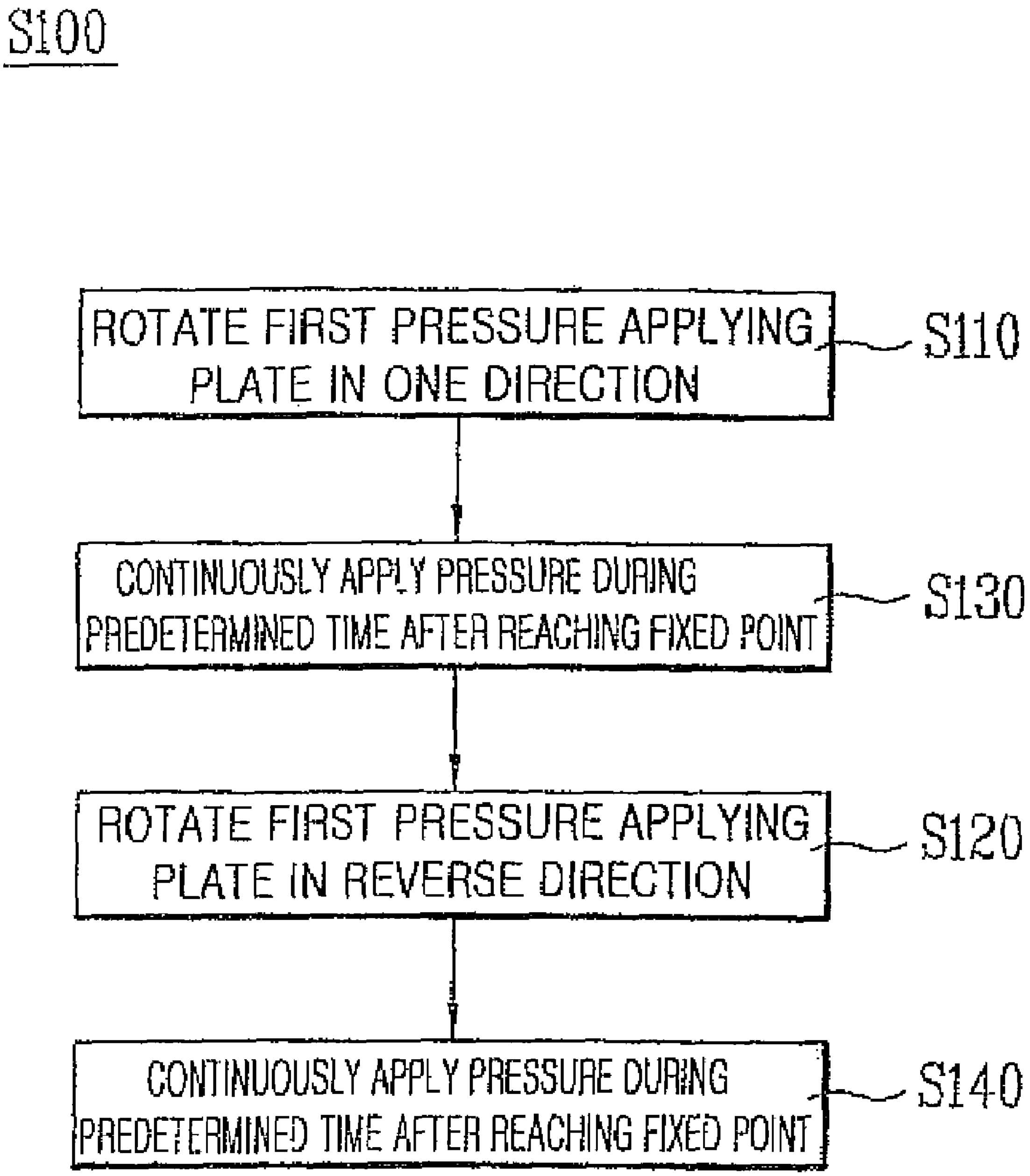
FIG. 23 is a flowchart of one embodiment of step S100 in the method illustrated in FIG. 22.

FIG. 23 illustrates details of the operations that may be performed in one embodiment of the compression step S100 of the method shown in FIG. 22. In step S110, a first compressing plate would be moved in a first direction to compress dust against one side of a fixed compressing plate. When the first compressing plate has stopped moving, in step S130, the first compressing plate would apply continuous pressure against the dust for a first predetermined period of time.

Next, in step S120, the first pressing plate would be rotated in the opposite direction to compress dust against the other side of the second, fixed compression plate. In step S140, once the first compressing plate has stopped moving in the second direction, the first compressing plate would apply continuous pressure against the dust for a second predetermined period of time.

Here, the first pressure applying plate 310 repeatedly rotates in forward and reverse directions with a predetermined angular velocity.

The dust compressing method illustrated in FIG. 23 will now be further described with reference to FIGS. 24*a* to 24*e*.

Figure 24A:
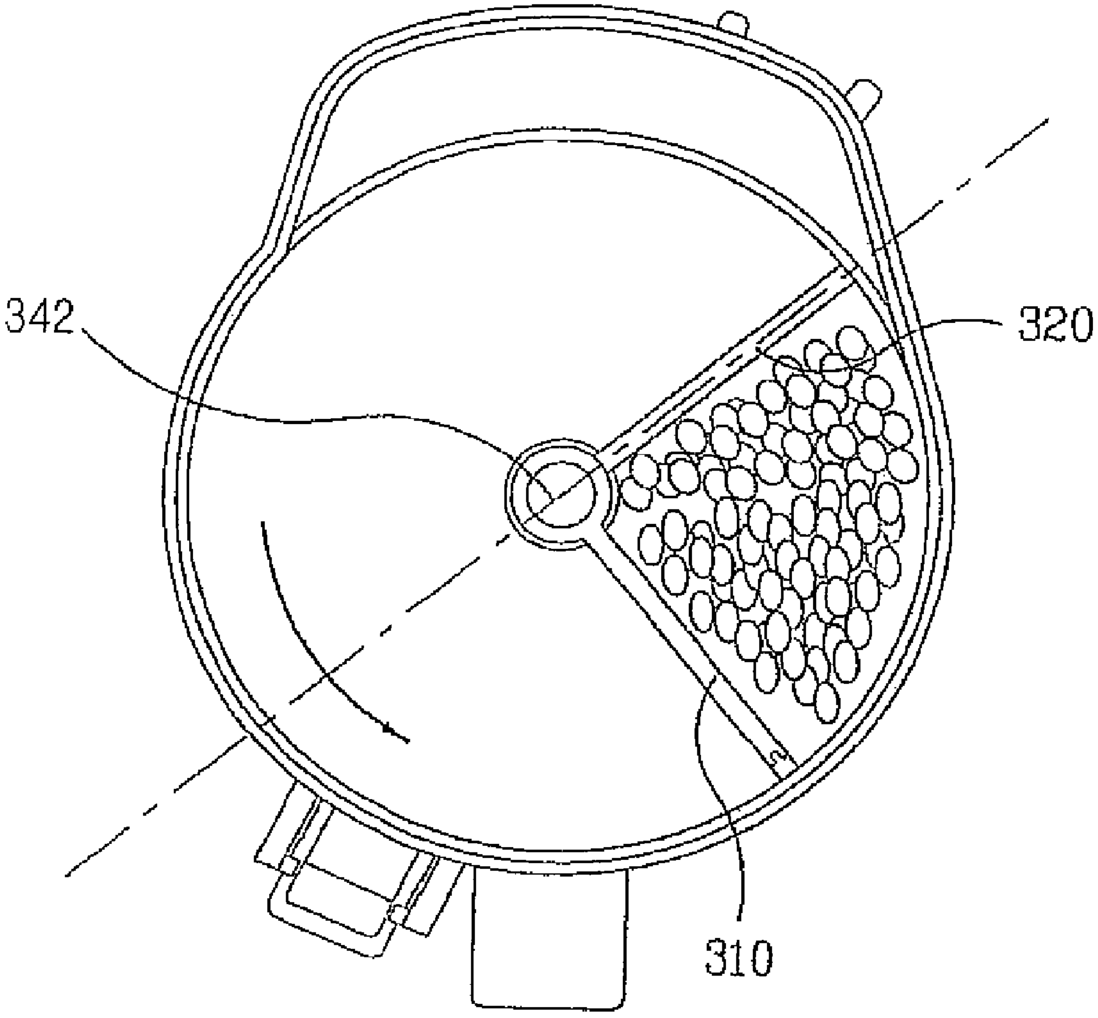
FIGS. 24*a* to 24*e* are plan views illustrating dust compressing processes in a dust container of a dust collecting unit.
Figure 24B:
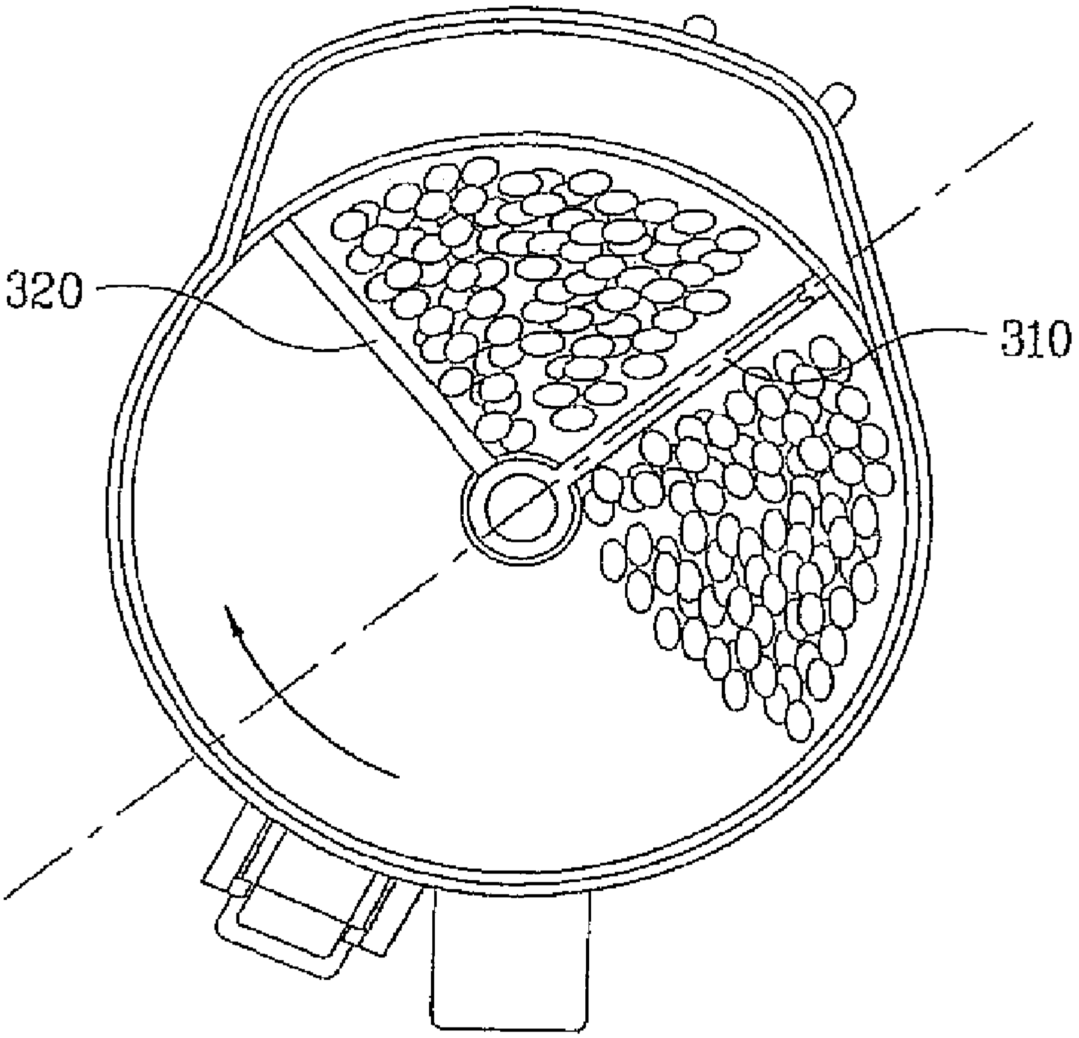
Figure 24C:
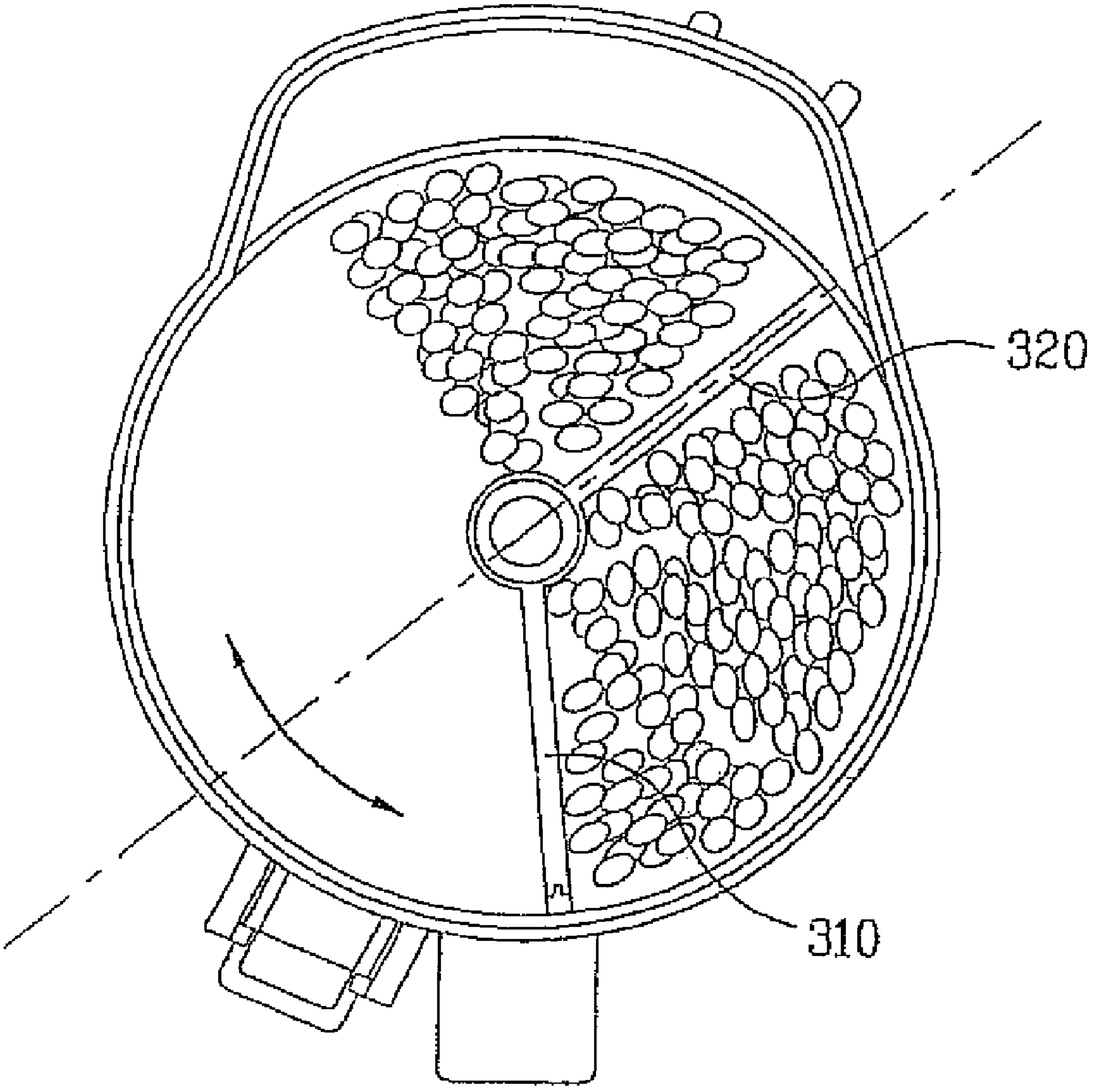
Figure 24D:
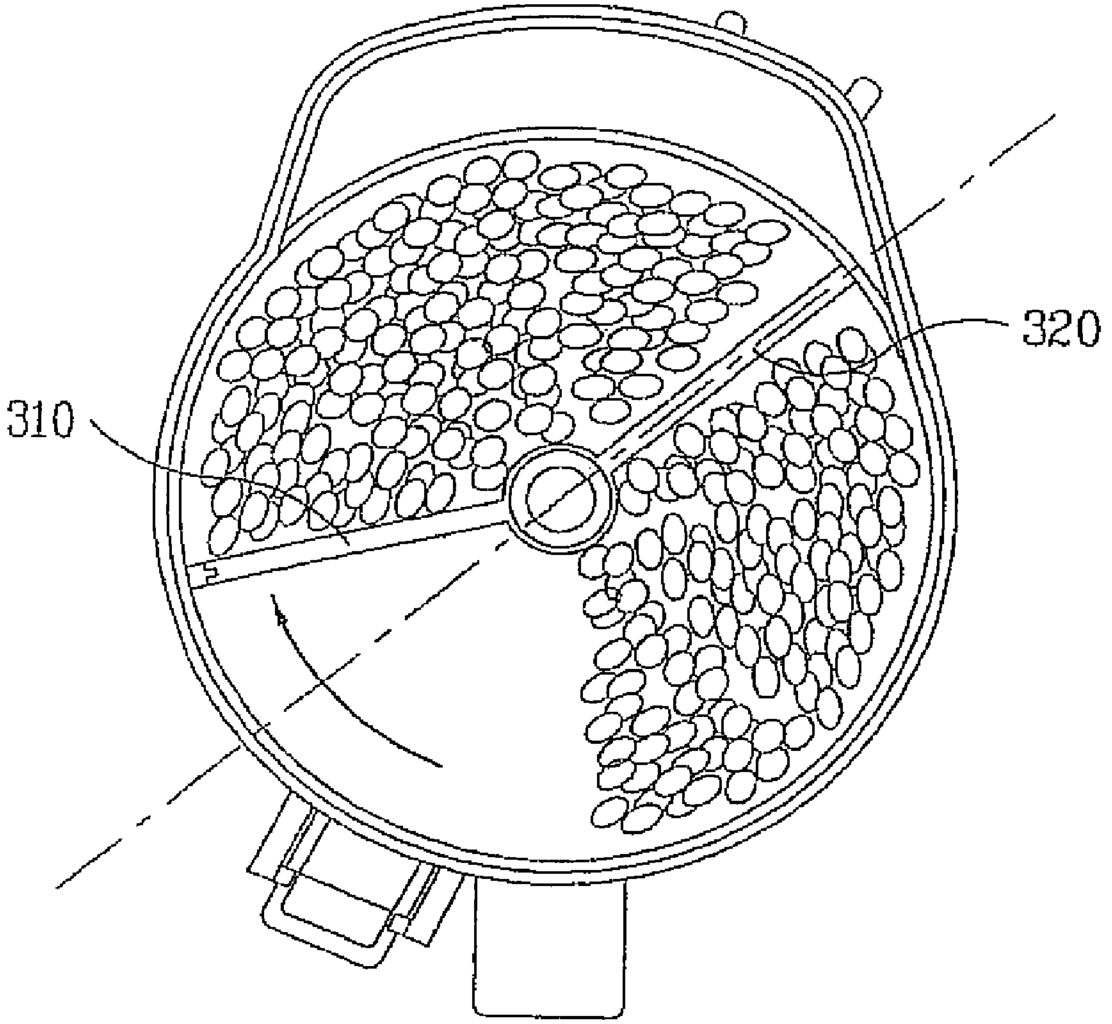

More specifically, as illustrated in FIG. 24*a*, the first pressing plate 310 would rotate in a first direction towards one side of the second (fixed) pressing plate 320. Therefore, the volume of dust in the main chamber 221 of the dust collection unit would be reduced. When the first pressing plate 310 cannot move any further towards the second pressing plate 320, the first pressing plate 310 would continuously compress dust against the first side of the second pressing plate 320 for a predetermined period of time, for instance, 3-5 seconds.

Next, as illustrated in FIG. 11B, the first pressing plate 310 would be rotated in the opposite direction towards the second side of the second pressing plate 320. Therefore, the volume of dust would be further reduced. When the first pressing plate 310 cannot move any further, the first pressing plate 310 would continuously compresses dust against the second pressing plate 320 for a second predetermined period of time, for instance 3-5 sec.

The above processes would be repeated during a vacuum cleaner operation, as illustrated in FIGS. 24*a* to 24*d*. As the operations continue, the rotational range of the first pressing plate 310 would be continuously or periodically input to a controller of the vacuum cleaner. By tracking the amount of rotation of the first pressing plate, the controller would be able to determine an amount of dust that has been collected in the dust container 220. The smaller the rotation of the first pressing plate, the greater the amount of collected dust.

Figure 24E:
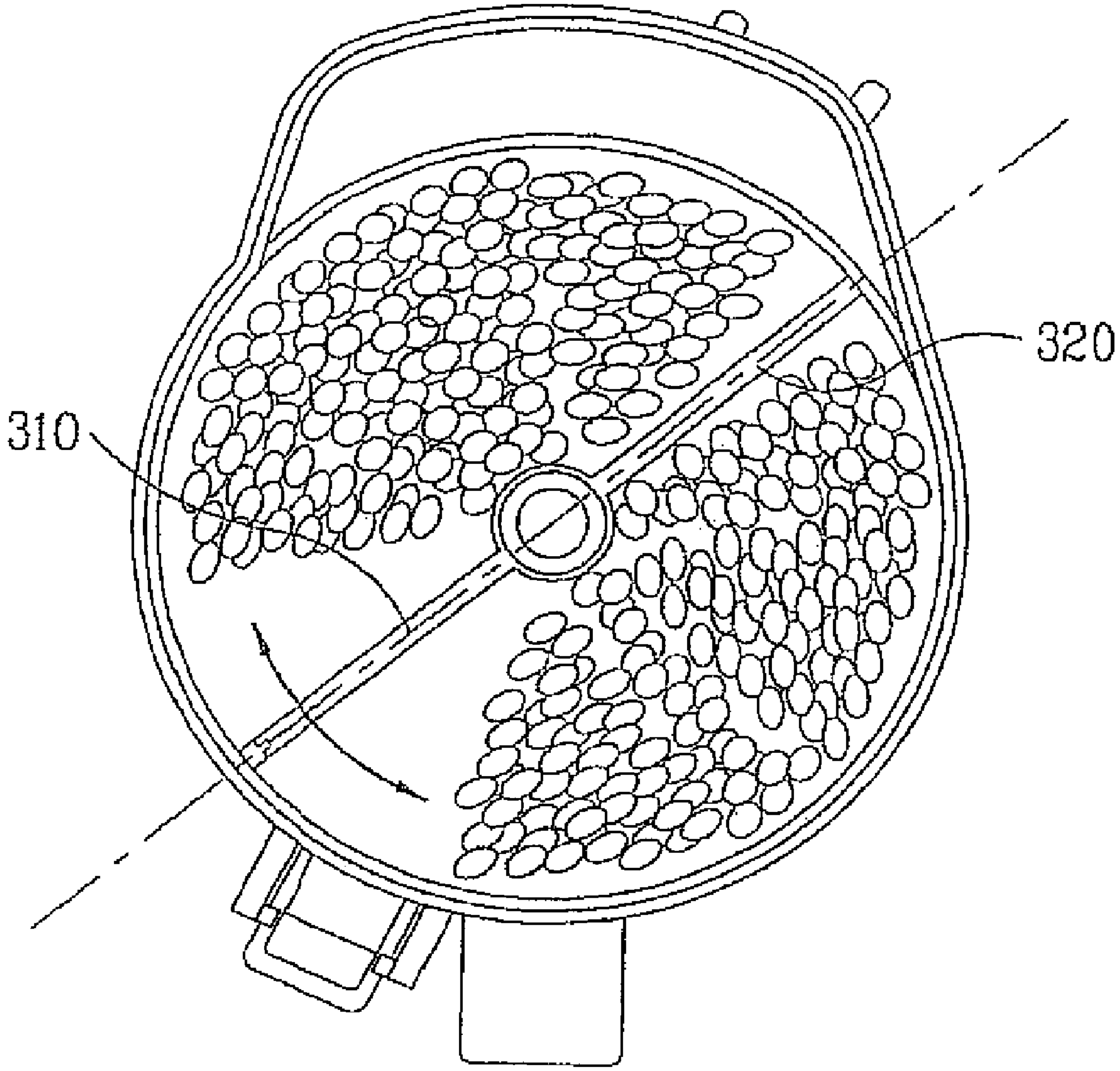

As illustrated in FIG. 24*e*, when the rotation range of the first pressure applying plate 310 is less than a predetermined angle, the controller would notify the user that the dust collection unit needs to be emptied.

Figure 25:
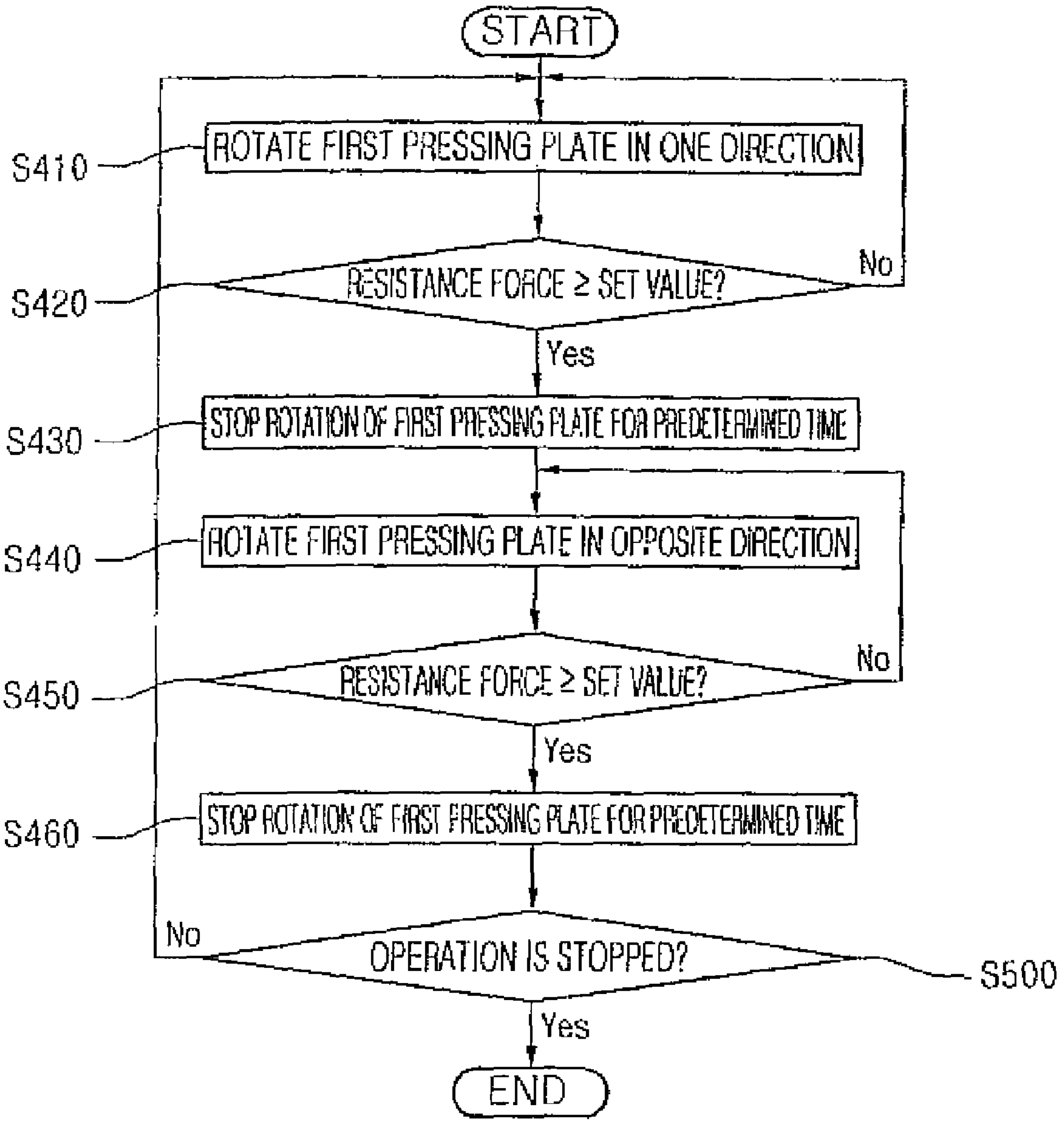
FIG. 25 illustrates another method of compressing dust in a dust collection unit.

FIG. 25 is a flow chart showing another method of compressing foreign substances within the dust collector. This method senses the pressure being applied by the first movable compressing plate during the compression operation.

First, in step S410, a first pressing plate 310 is rotated in a first direction to compress dust against a first side of a fixed second pressing plate. In step S420, the resistance force generated during the pressing process is sensed. If the resistance force is less than a predetermined value, the method loops back to step S41, and rotation of the first pressing plate continues. These steps are repeated until the resisting sensing step determines that the value of the resistance force generated during the pressing process is equal to or greater than the predetermined value. At that point, the method proceeds to step S 430, where rotation of the first pressing plate 310 is stopped. In other words, the power being applied to the drive motor 430 is cut off, and thus the first pressing plate 310 is stopped, while still compressing the dust between the pressing plates.

In step S430, the method waits for a predetermined period of time to elapse, and then the method proceeds to step S440, the first pressing plate is rotated in the opposite direction to compress dust against the second side of the second pressing plate. The method then proceeds to step S450 where the resistance force being generated by the pressing operation is again checked. If the resistance force is less than a predetermined value, the method loops back to step S440, and the first pressing plate is allowed to continue rotating in the second direction. Steps S440 and S450 are repeated until the checking step S450 indicates that the resistance force being generated by the pressing operation is equal to or greater than a predetermined value. When this determination is made, the method proceeds to step S460, where further rotation of the first pressing plate is halted. The method waits for a predetermined period of time, and then proceeds to step S500.

In step S500, the vacuum cleaner determines if the pressing operation should be continued. If so, the method returns to step S410. If not, the method ends.

Typically, the above-described methods would be continued until an angle to which the first pressing plate 310 is rotated becomes smaller than a predetermined angle. If that occurs, the vacuum cleaner would determine that the dust collection unit is full and needs to be emptied. Alternatively, the process would end when the vacuum cleaner is shut off.

Figure 26:
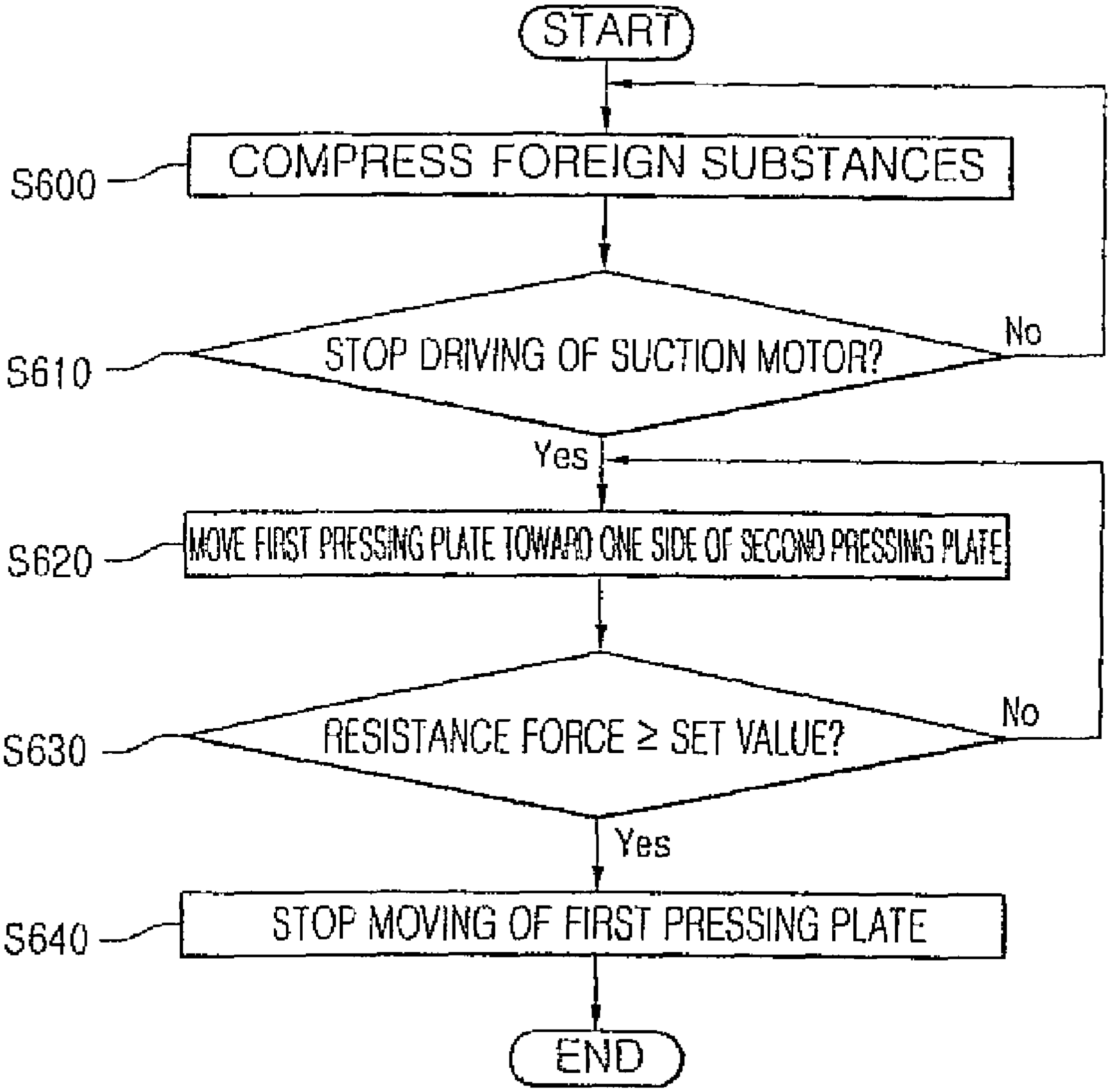
FIG. 26 illustrates another method of compressing dust in a dust collection unit.

FIG. 26 is a flow chart showing a method of controlling the pressing plates when the operation of the cleaner is to be stopped. As noted above, when the vacuum cleaner is operating, the pressing plates would be in continuous operation, compressing the dust being collected in the dust collection unit. This could mean rotating a first pressing plate in a single direction to compress dust against a single side of a fixed pressing plate. It could also mean moving a pressing plate in two opposing directions to compress dust against two opposite sides of a fixed pressing plate. It could also mean moving multiple pressing plates with respect to each other to compress dust between the two moving pressing plates. Regardless, then the user decides to turn the vacuum cleaner off, the pressing plates will be at some random point in the pressing cycle.

The method illustrated in FIG. 26 begins with the vacuum cleaner in operation, and a normal pressing operating occurring in step S600. In step S610 a check is performed to determine if the user has decided to stop the suction motor. If not, then the process return to step S600. If the checking step S610 determines that the user has elected to shut off the vacuum cleaner, then the method proceeds to step S620.

In step S620, a first pressing plate is moved towards another pressing plate to accomplish a compressing operation. The method then moves on to step S630 where is check is performed to determine if the pressing force has met or exceeded a predetermined value. If not, the method returns to step S620, where the pressing operation is continued. If the checking step S630 determines that the pressing force has met or exceeded a predetermined value, then the method proceeds to step S640, where further movement of the pressing plate is halted. The method then ends.

In the above-described method, the operations of the pressing plates are not stopped right after the operation of the suction motor is stopped. Instead, at least one movable pressing plate continues to move and only stops after the moving pressing plate compresses any dust against another pressing plate with a certain amount of force. Because the first pressing plate 310 is stopped only after it has moved to a location where it keeps pressing the dust, the compression of the dust is maintained even though the vacuum cleaner is not operated. This, in turn, facilitates the process of emptying the dust collector 200 after stopping the vacuum cleaner.

Also, because the pair of pressing plates 310 and 320 continue to press the dust even when the operation of the vacuum cleaner is stopped, compression during the subsequent operation of the vacuum cleaner is facilitated.

In the above method, dust is compressed by the pair of pressing plates 310 and 320 during operation of the vacuum cleaner, and the compression of the foreign substances is maintained after operation of the vacuum cleaner is stopped. In an alternate embodiment, the pair of pressing plates 310 and 320 may perform the compression when the vacuum cleaner is stopped, without performing compression when the vacuum cleaner is in operation. That is, the vacuum cleaner may be configured such that none of the pressing plates move when the cleaner is in operation. Then, when the vacuum cleaner is to be stopped, a compressing operation could be performed as described above.

Figure 27:
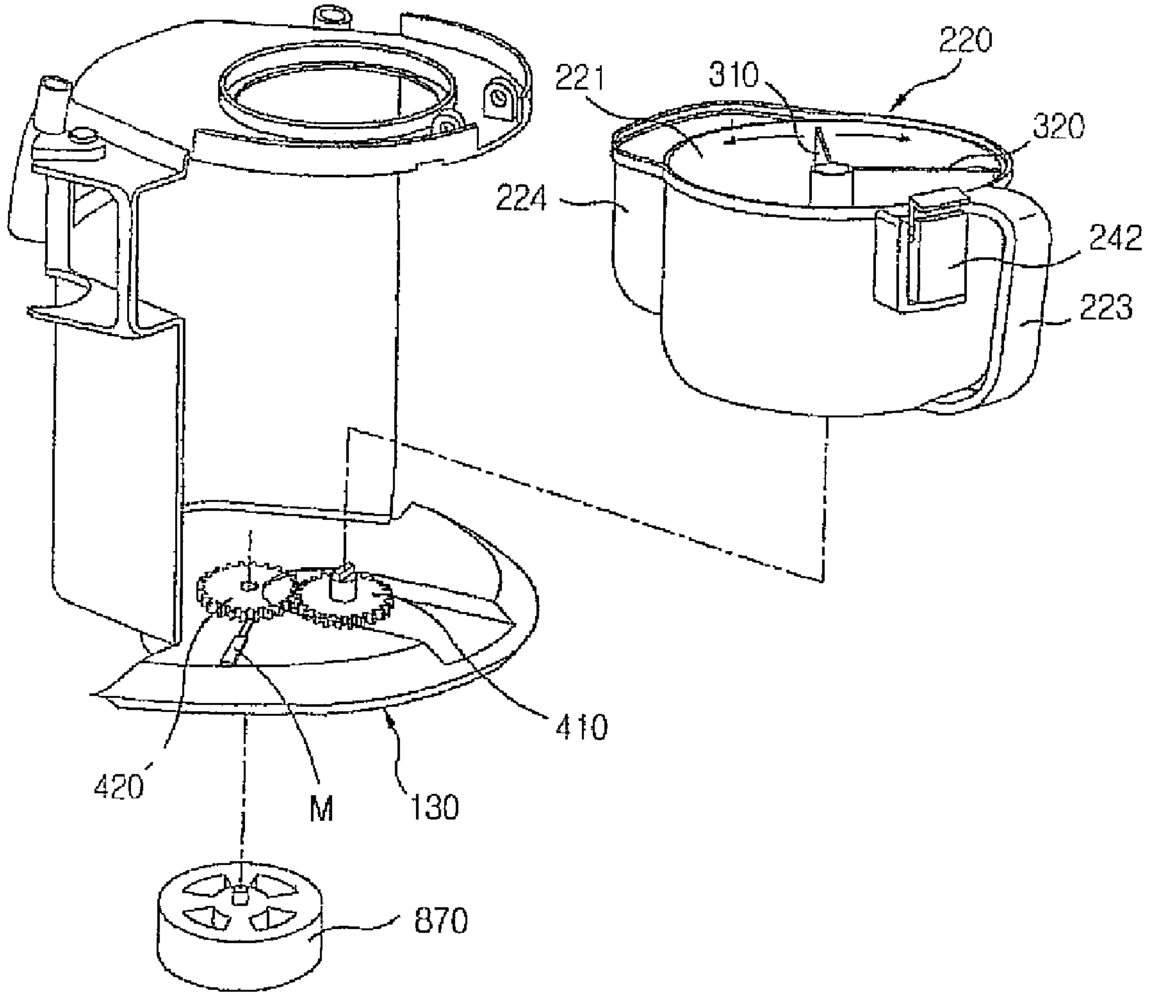
FIG. 27 illustrates an alternate embodiment of a vacuum cleaner with a removable dust collection unit.

An alternate embodiment of a vacuum cleaner will now be described with reference to FIG. 27. In this embodiment, a microswitch M is mounted on the main body of the vacuum cleaner adjacent the gear 420 driven by the motor 870. A terminal extending from a side of the microswitch M bears against the teeth of the gear 420. When the motor rotates the gear 420, the teeth of the gear 420 push the terminal into the microswitch. Thus, as the gear 420 rotates, the microswitch is turned on and off.

The on-off signal of the microswitch M is applied to a counter which outputs a high level pulse signal when the microswitch M is turned on and a low level pulse signal when the microswitch M is turned off. Therefore, by measuring the number of pulses (i.e., a switch on-off period), the degree of the rotation of the driving gear 420 can be measured.

The output of the counter can also be used to determine when to stop driving the compressing plate. Specifically, a controller can monitor the output of the pulses generated by the counter. When the motor is driving the compressing plate, and the compressing plate is rotating, the counter will periodically output pulses. However, when the compressing plate can no longer rotate, because the compressing plate has compressed the dirt in the dust collection unit as much as possible, the counter will stop outputting pulses. Then, as in the methods described above, the motor can reverse direction so that the compressing plate is driven in an opposite direction.

As also explained above, in some methods, after a pressing plate 310 has reached a point where it cannot rotate further, it is preferable that the pressing plate 310 remains stationary, thereby compressing any trapped dust, for a predetermined period of time. Thus, when the rotation of a pressing plate 310 in a first direction stops, the power applied to the compression motor 870 is cut off for a predetermined period of time so that the pressing plate 310 remains stationary. After the predetermined time period has elapsed, power is applied to the compression motor 870 so that the first pressing plate 310 can rotate in an opposite direction.

As also mentioned above, when a predetermined amount of dust has been collected in the dust collection unit, it is desirable to provide an indication to the user instructing the user to empty the dust collection unit. This indication can take the form of an illuminated indicator light on the vacuum cleaner.

Figure 28:
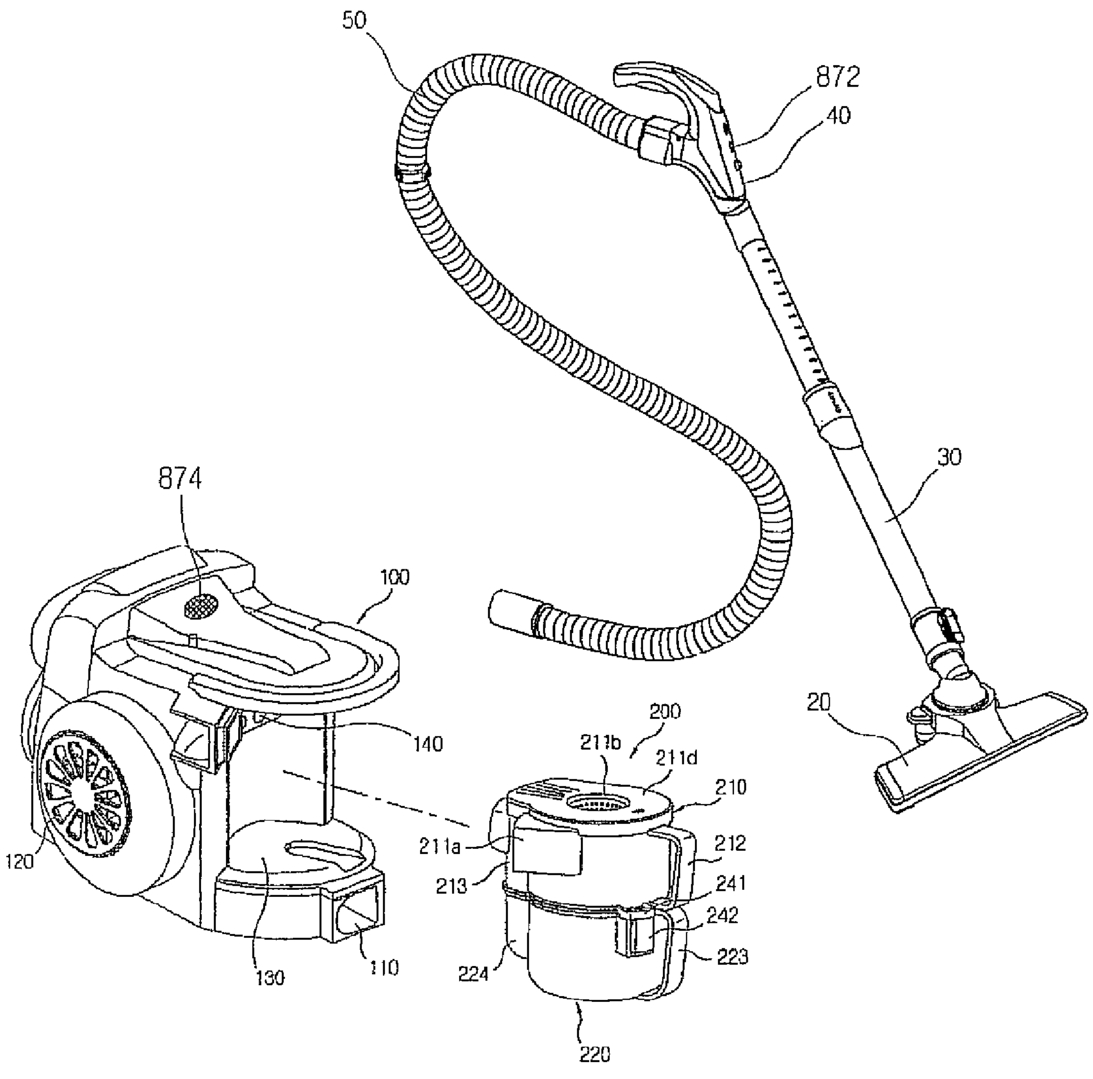
FIG. 28 illustrates an embodiment of a vacuum cleaner that includes indicator to inform a user when a dust collection unit needs to be emptied.

FIG. 28 shows an embodiment where an indicator 872 is provided on the handle 40. Also, in this embodiment, an indicator 874 is provided on the main body 100. When the predetermined amount or more of dust is collected in the dust collection unit, and thus the rotational range of a pressing plate is restricted to a predetermined amount, or less, one or both of the indicators 872 and 874 can be activated. A particular embodiment may have only an indicator 872 on the handle, or only an indicator 874 on the main body, or have indicators at both locations.

The indicators 872 and 874 may be LEDs for visually letting the user know that it is time to empty the dust collection unit. Alternatively, the indicators may be speakers aurally letting the user know when it is time to empty the dust collection unit. In still other embodiments, the indicators could take other forms, such as display screens or other devices.

In some embodiments, both a speaker and an LED may be provided. For instance, in the embodiment shown in FIG. 28, the indicator 872 on the handle many be a LED, and the indicator 874 on the main body may be a speaker. In this instance, both indicators may be activated at the same time. Also, the speaker may be activated for only a predetermined period of time, and then only the LED might remain activated until the user empties the dust collection unit. In still other embodiments, the speaker may generate a tone for a short period of time, but the tone might be periodically repeated until the user empties the dust collection unit.

Figure 29:
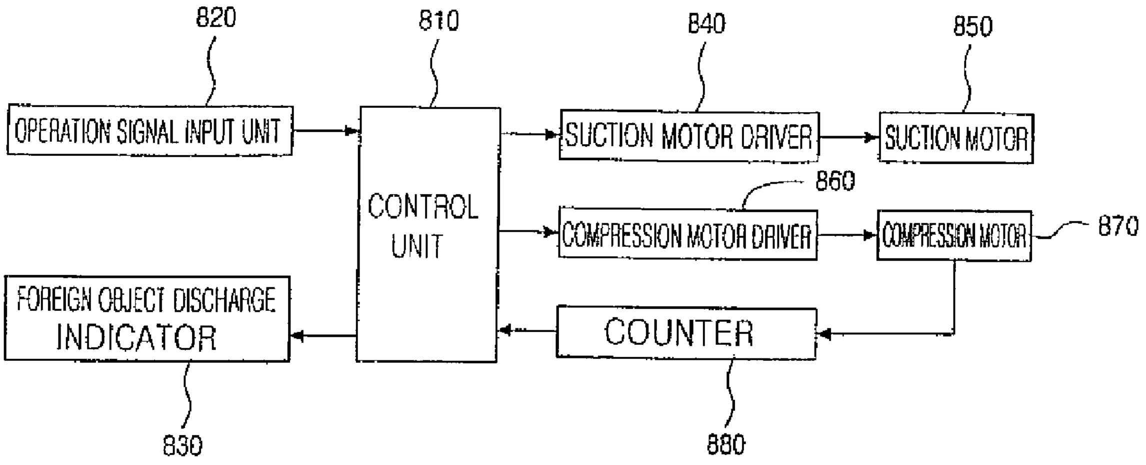
FIG. 29 is a block diagram of elements of an a vacuum cleaner.

FIG. 29 a block diagram illustrating elements of an embodiment of a vacuum cleaner. The vacuum cleaner of this embodiment includes a control unit 810 formed of a microcomputer, an operation signal input unit 820 for selecting a suction power (e.g., high, middle, low power modes), and a dust discharge indicator 830. The vacuum cleaner also includes a suction motor driver 840 for operating the suction motor 850 that is a driving motor for sucking air into the vacuum cleaner. A compression motor driver 860 is used to operate the compression motor 870 which drives compressing plates to compress dust collected in the dust collection unit. Finally, this embodiment includes a counter unit 880 for detecting a degree of the rotation of the compression motor 870.

When the user selects one of the high, middle and low modes representing the suction power using the operation signal input unit 820, the control unit 810 controls the suction motor driver 840 so that the suction motor 850 can be operated with the suction power corresponding to the selected power mode. That is, the suction motor driver 840 operates the suction motor 850 with the suction power according to a signal transmitted from the control unit 810.

As explained above, the control unit 810 also operates the compression motor 870 simultaneously with and/or right after the operation of the suction motor is halted. If the compression plates are to be driven while the suction motor is being operated, dust collected in the dust collection unit would be compressed by one or more compressing plates which are rotated by the compression motor 870.

As also explained above, the counter unit 880 would measure movements of the compressing plate by sensing rotations of one of the gears coupled to the compression motor and the movable compressing plate(s). The counter unit 880 would send a signal to the control unit 810 indicative of these movements.

As an amount of dust being compressed in the dust collection unit increases, the reciprocal rotation the compression motor would become reduced. In other words, as more and more dust is stored in the dust collection unit, the movable compressing plate(s) will be able to move through smaller and smaller amounts of rotation before they must stop and reverse direction. When the amount of dust reaches a predetermined level and thus the reciprocal motion of the movable compressing plate(s) is less than a predetermined rotational amount, the control unit 810 activates the indicator 830 to signal the user that it is time to empty the dust collection unit.

Figure 30:
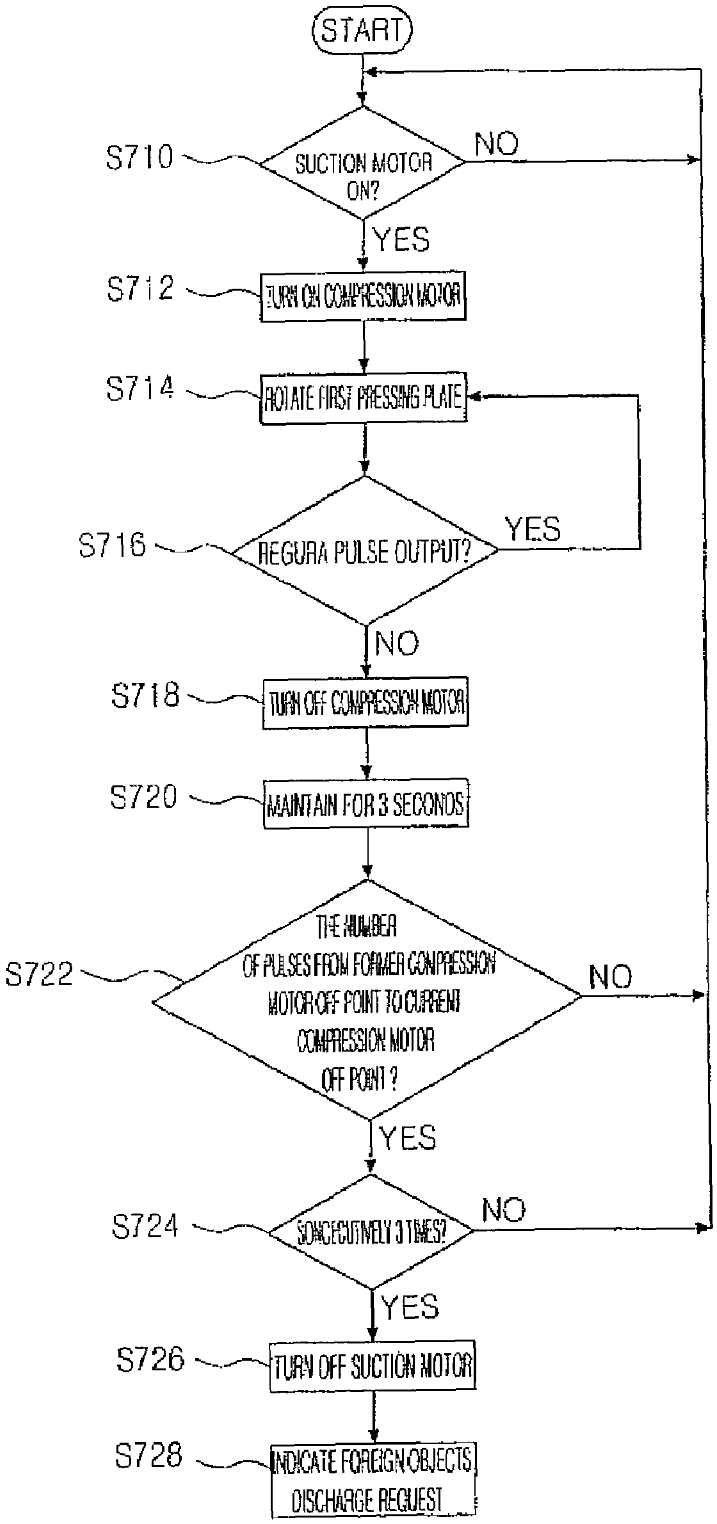
FIG. 30 illustrates another method of compressing dust in a dust collection unit and of providing an indication that a dust collection unit is full.
Figure 31:
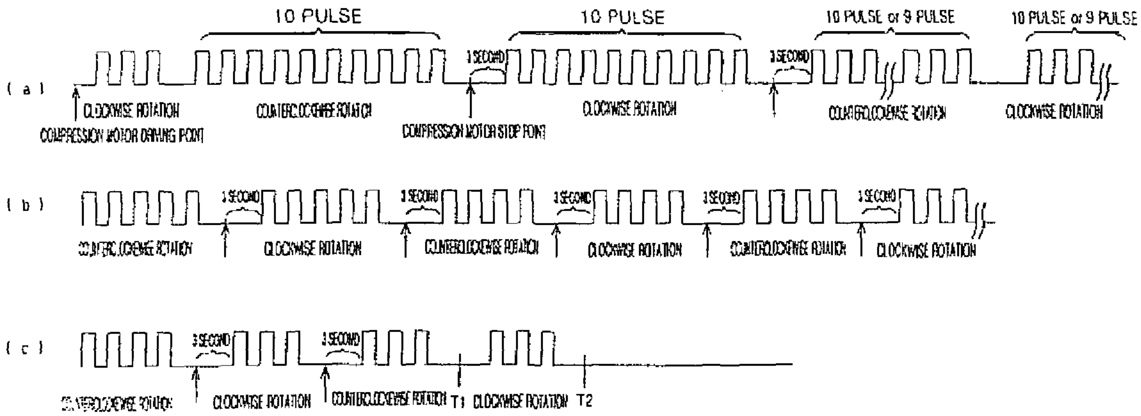
FIG. 31 illustrates a pulse train emitted by a counter of a vacuum cleaner.

FIG. 30 is a flowchart illustrating a method of operating a vacuum cleaner as illustrated in FIG. 29. FIG. 31 illustrates a waveform of a pulse signal which could be output by a counter unit 880 as shown in FIG. 29. A method of operating a vacuum cleaner will now be explained with reference to FIGS. 29-31.

In step S710, a check is performed to determine if the suction motor is being operated. If not, the method loops back to the beginning of the method. A user would begin operating the vacuum cleaner by selecting one of the high, middle and low modes of the operation signal input unit 820. The control unit 810 would then control the suction motor driver 840 so that the suction motor 850 operates with the suction power corresponding to the selected power mode. When the suction motor 850 is operating, the result of the checking step S710 would be positive, and the method would proceed to step S712.

In step S712, the control unit 810 would drive the compression motor 870 to compress dust stored in the dust collection unit. This would cause at least one pressing plate to rotate in step S714. Then, in step S716, a check would be performed to determine if the counter is generating pulse output on a regular basis. If so, that would indicate that the compressing plate is still able to move, and the method would loop back to step S714. If the result of the checking step S716 indicates that pulses are no longer being generated by the counter, that would indicate that the compressing plate can no longer move any further to compress dust. In that event, the method would proceed to step S718.

In step S718, the controller would turn off the compression motor. In step S720, three seconds would be allowed to elapse with the compression motor turned off. Although three seconds is used in this embodiment, different delay periods could be used in step S720. In still other embodiments, the delay step S720 might be completely skipped so that no delay occurs.

In step S722, a check is performed to determine if the dust collection unit is full. This can be done in a number of ways. Primarily, this is determined by checking to see if the compressing plate is incapable of moving more than a predetermined angular amount in either direction.

FIG. 31 illustrates a pulse train that will be output by the counter as the compressing plate(s) are moved back and forth to compress dust in the dust collecting unit. When the dust collection unit is empty, the compressing plate moves a considerable distance in each direction. Then, as the dust collection unit becomes full, the compressing plate(s) can move through smaller and smaller angular amounts. Thus, the number of pulses output by the counter gradually decrease.

When the number of pulses that are output by the counter between the time the compressing plate begins moving in a particular direction and the time that is stop is less than or equal to a predetermined number, the controller will determine, in step S722, that the dust collection unit is full. At that point, the method would move on to step S724.

In an alternate embodiment, the pulses could simply be used to determine when the compressing plate stops moving. In other words, when the pulses are no longer being output by the counter, then the compressing plate has stopped moving. In this alternate embodiment, the controller would track the amount of time that elapses between the point in time that the compressing plate begins moving in a certain direction, and the point in time when the compressing plate stops moving. Then, the controller could compare the elapsed time to a predetermined period of time. If the elapsed moving time is less than or equal to the predetermined period of time, the controller would determined, in step S722, that the dust collection unit is full, and the method would move on to step S724.

In some embodiments, the check performed in step S722 would be followed by another check, in step S724, where the controller would determine if the number of pulses, or the elapsed movement time is equal to or less than the predetermined number for three consecutive times that the compressing plate is moved. If not, the method would return to step S710. If so, the method would move on to step S726. In other embodiments, the check performed in step S724 might be skipped.

When the method moves on to step S726, the controller would turn off the suction motor. The method would then proceed to step S728, where the indicator would be activated to inform the user that the dust collection unit is full and needs to be empties.

In alternate embodiments, step S726 might be skipped. This would allow the vacuum cleaner to continue to operate, however, the indicator would still be activated.

Figure 33A:
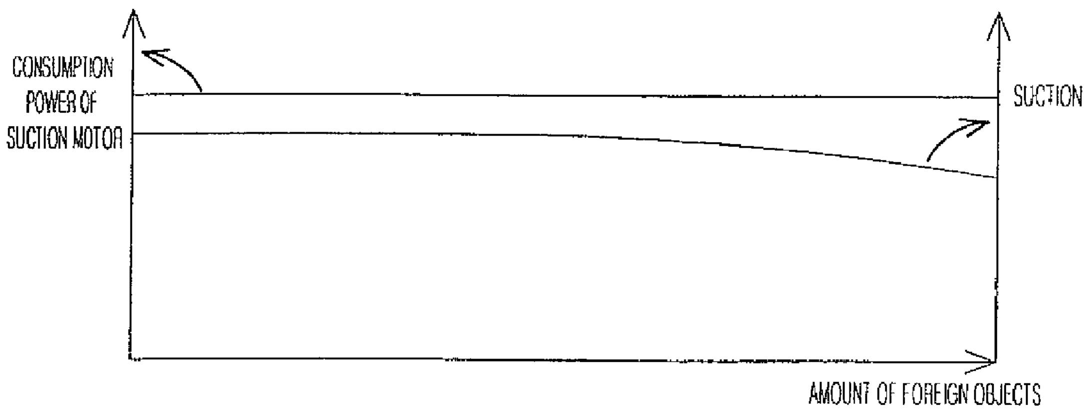
FIGS. 33*a* and 33*b* illustrate the power applied to a suction motor of a vacuum cleaner and the suction achieved as a dust collection unit of the vacuum cleaner becomes more full.

FIG. 33*a* shows how a vacuum cleaner would operate when a substantially constant power is applied to the suction motor as the dust collection unit becomes full. As can be noted in FIG. 33*a*, as the dust collection unit gets more full, the suction power of the vacuum cleaner deteriorates.

Figure 33B:
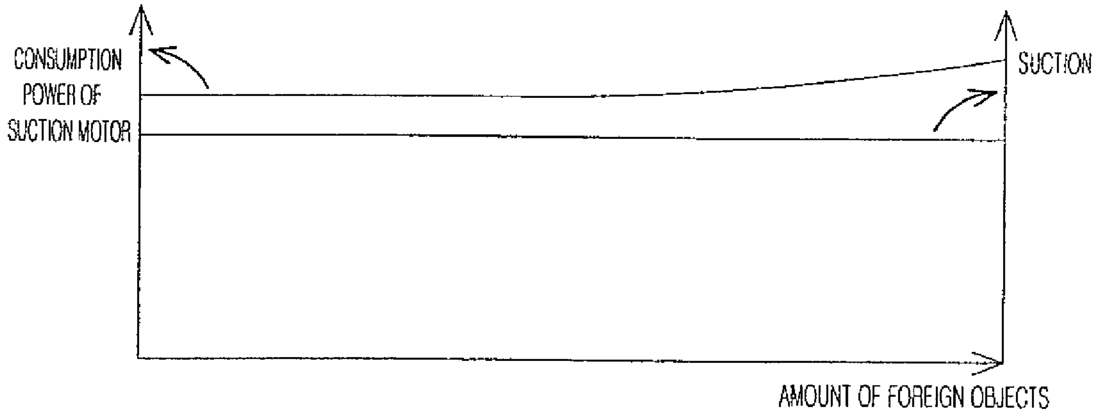

FIG. 33*b* show how a vacuum cleaner would operate when the suction power of the vacuum cleaner is kept substantially the same as the dust collection unit becomes full. As can be noted in FIG. 33*b*, it is necessary to increase the power applied to the suction motor, as the dust collection unit becomes full, in order to ensure that the same amount of suction force is generated.

Figure 32:
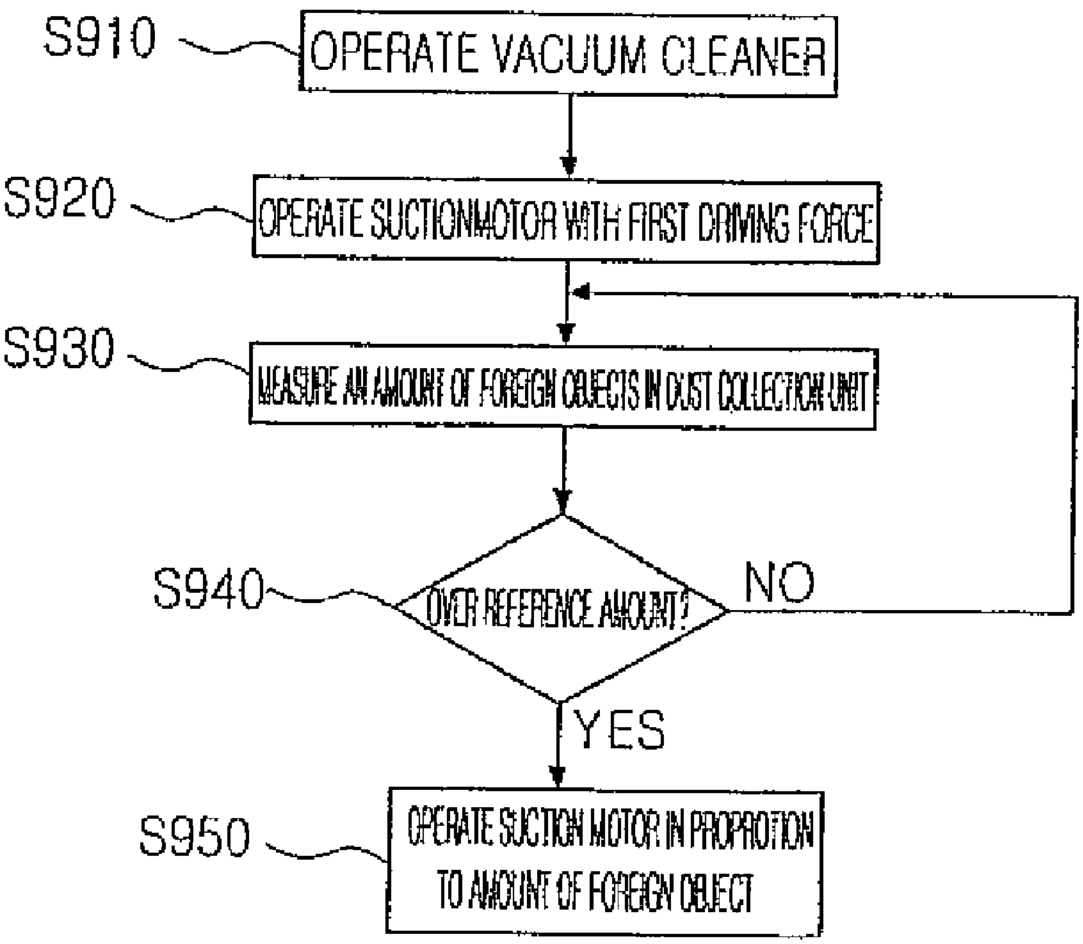
FIG. 32 illustrates another method of operating a vacuum cleaner.

FIG. 32 illustrates another method for controlling a vacuum cleaner so that it behaves as illustrated in FIG. 33*b*. In this method, a driving force of a suction motor is varied based on an amount of dust collected in the dust collection unit so that the suction force remains substantially constant.

Referring to FIG. 32, in step S910, the user would begin to operate the vacuum cleaner. During initial operations, in step S920, when the dust collection unit is substantially empty, a relatively low power applied to the suction motor will ensure a certain amount of suction force is generated by the vacuum cleaner.

In step S930, the controller would measure the amount of dust collected in the dust collection unit. This could be done, as described above, by checking the amount of angular movements being made by the dust compressing plates. In step S940, the amount of collected dust would be compared to a predetermined reference amount. If the amount of collected dust is less than the predetermined reference amount, the method would loop back to step S930. If the result of the checking step indicates that the amount of collected dust exceeds the predetermined amount, the method would proceed to step S950, where the amount of power applied to the suction motor would be increased, based on the amount of collected dust, so that the suction force remains substantially the same as when the dust collection unit was empty.

Figure 34:
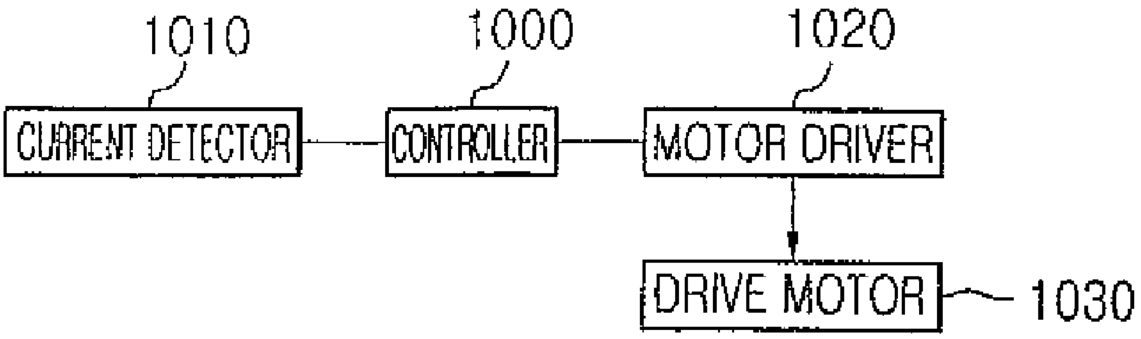
FIG. 34 is a block diagram of elements of an a vacuum cleaner.
Figure 35:
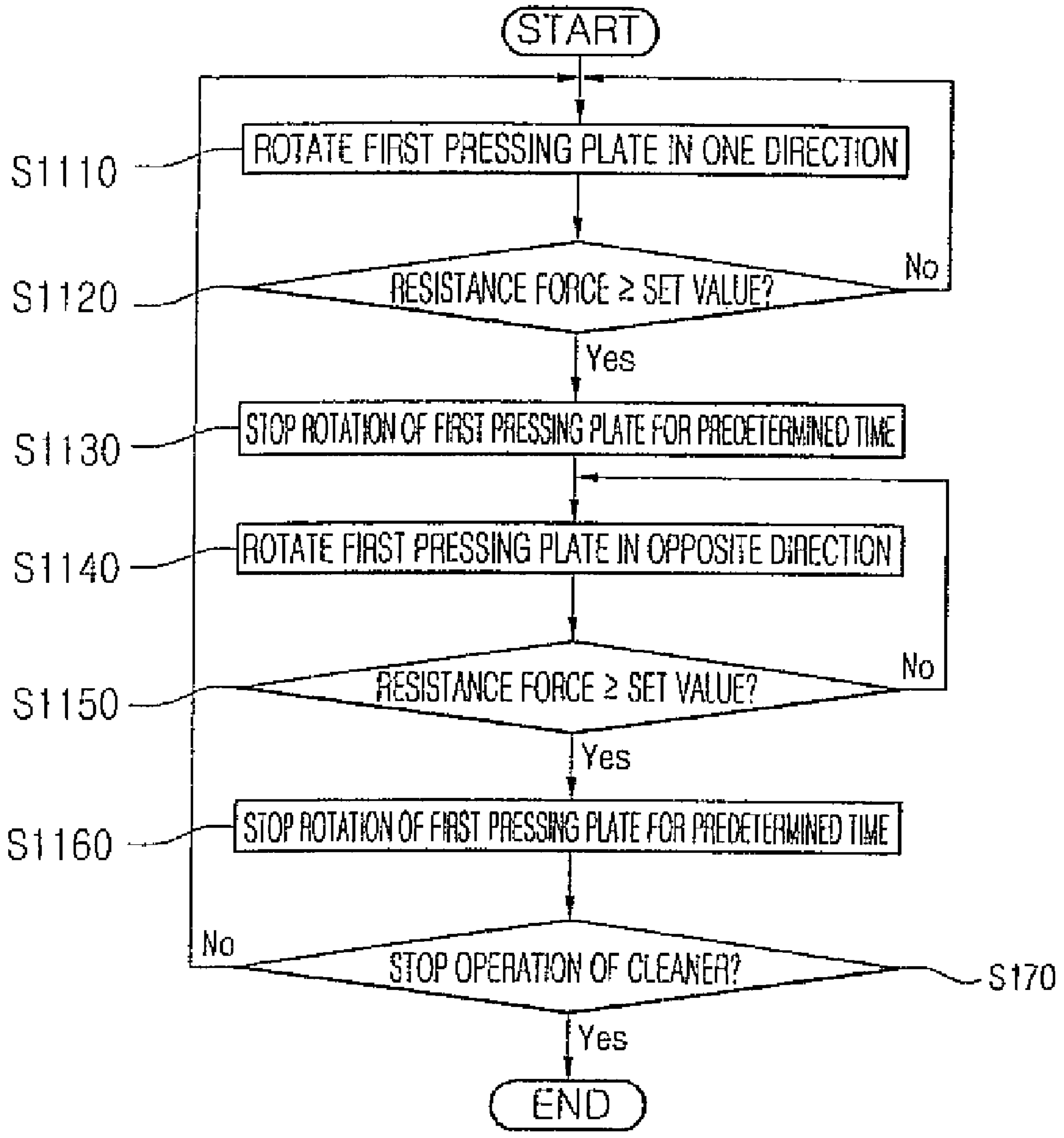
FIG. 35 illustrates another method of compressing dust in a dust collection unit of a vacuum cleaner
Figure 36:
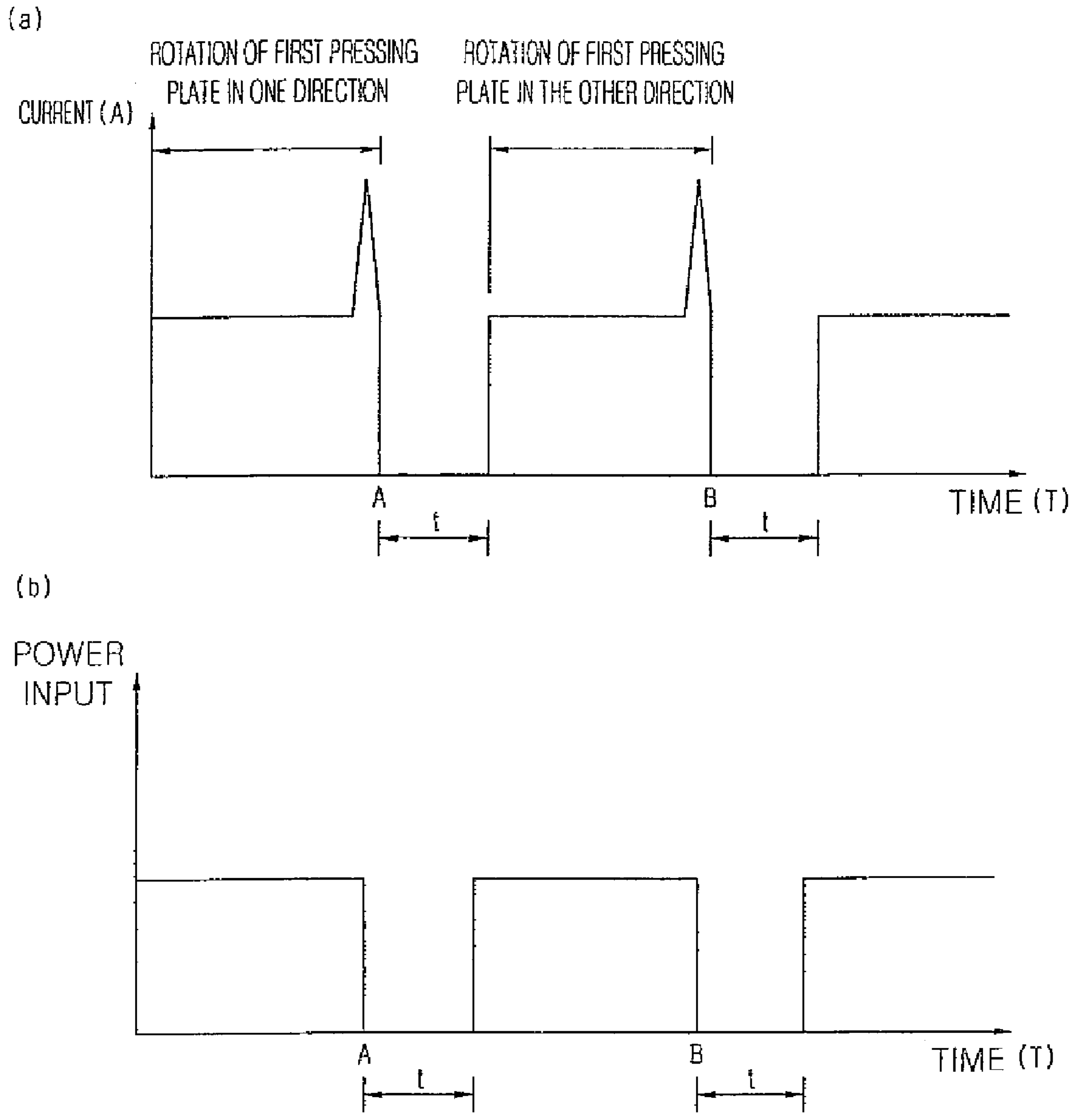
FIGS. 36*a* and 36*b* illustrate current and power applied to a dust compressing plate motor of a vacuum cleaner as a dust compressing operation is performed.

Another method of controlling the pressing plates of a vacuum cleaner will now be described with reference to FIGS. 34-36. FIG. 34 is a block diagram showing elements of a vacuum cleaner. FIG. 35 is a flow chart illustrating steps of a method of controlling a dust compression process. FIG. 36*a* illustrates the current applied to a motor used to move a compression plate of the vacuum cleaner. FIG. 36*b* illustrates a waveform of power supplied to the compressing plate drive motor Referring to FIG. 34, the vacuum cleaner includes a current detector 1010 which detects the amount of current applied to a drive motor 1030 that drives a pressing plate. A motor driver 1020 drives the drive motor 1030 based on signals from a controller 1000. The controller 1000 also receives a signal from the current detector 1010 indicative of the current being applied to the drive motor 1030.

As explained above, during a dust compressing operation, one or more pressing plates are driven back and forth in opposite rotational directions to compress dust. The drive motor 1030 switches its rotation direction when a value of a resistance force applied by a pressing plate 310 becomes equal to or greater than a set value.

In this method, the way that the resistance force is determined is by checking the current being applied to the drive motor. As shown in FIG. 36*a*, when the value of the resistance force applied by the pressing plate 310 becomes equal to or greater than a predetermined value, the current of the drive motor 430 momentarily increases. This momentary increase can be detected by the current detector.

In the method illustrated in FIG. 35, in step S1110, the pressing plate is first rotated in one direction. In step S1120, a check is performed to determine if the force applied by the pressing plate has exceeded a predetermined about. If not, the process returns to step S1110, and the pressing plate continues to rotate. If the result of the checking step indicates that the predetermined force has been exceeded, then the method proceeds to step S1130, where the pressing plate drive motor is stopped. The resistance value check is made by checking the current applied to the drive motor. When the current value spikes, the controller 1000 knows that the resistance value has exceeded the predetermined amount, and the controller 1000 sends signals to the motor driver 1020 to cut off power to the drive motor 1030.

In step S1130, a predetermined period of time is allowed to elapse while the pressing plate remains stationary. Then, in step S1140, the drive motor is operated again to move the pressing plate in the opposite direction.

In step S1150, a check is again performed to determine if the predetermined resistance force has been exceeded as the pressing plate is moving in the opposite direction. Here again, this check is performed by monitoring the current applied to the motor. When the predetermined resistance force has been exceeded, the method proceeds to step S1160 where another predetermined period of time is allowed to elapse while the pressing plate remains stationary.

These steps would be repetitively performed until either the user turns the vacuum cleaner off, or the controller determines that the duct collection unit is full and needs to be emptied.

Figure 37:
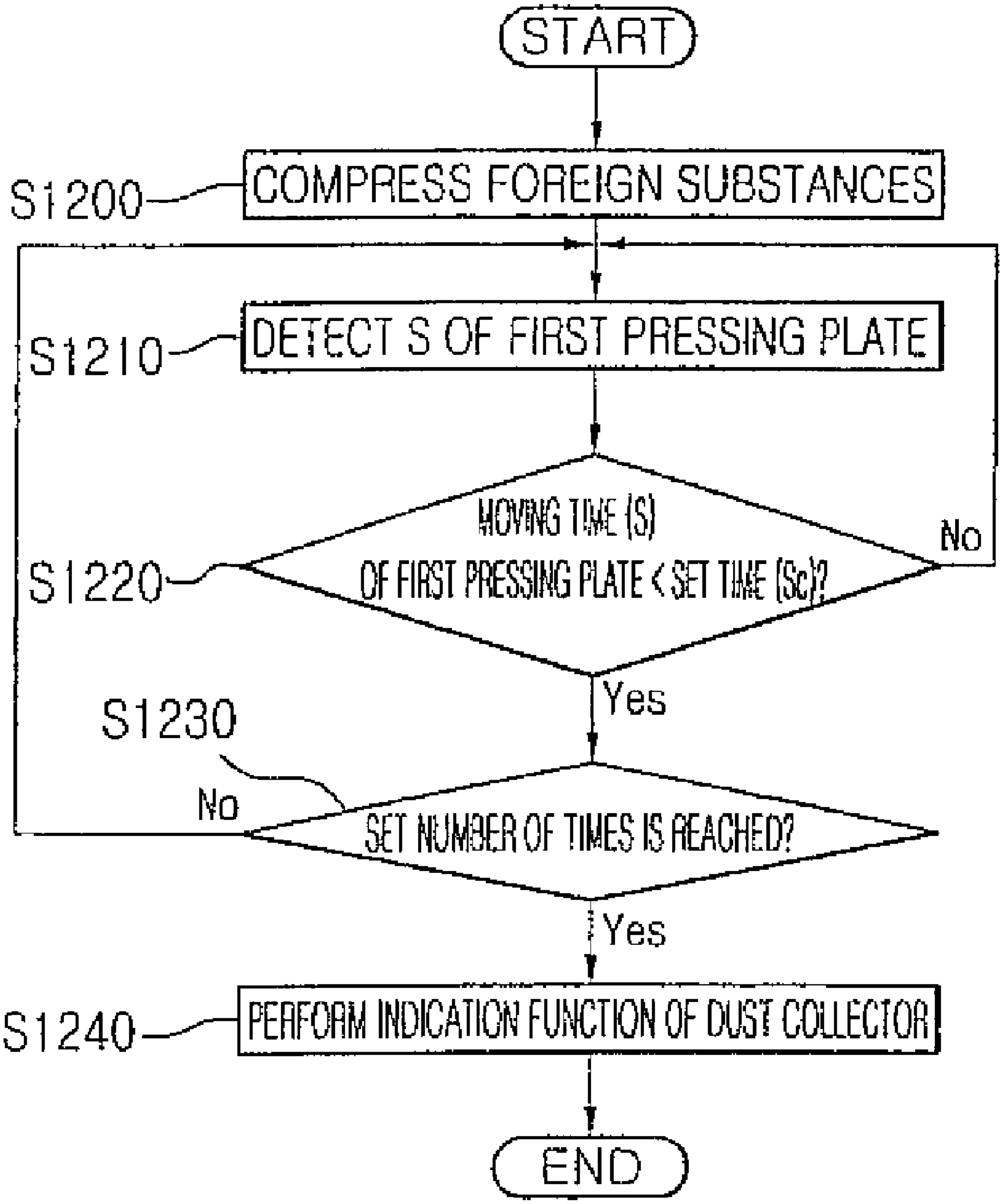
FIG. 37 illustrates another method of compressing dust in a dust collection unit and of providing an indication that a dust collection unit is full.

FIG. 37 illustrates another method of determining when it is necessary to empty the duct collection unit. The method starts in step S1200 where the compression process would be initiated. In step S1210, the controller would note the time period S between point in time when the compression plate begins moving in a particular direction, and the point in time that it stops moving in that direction. Then, in step S1220, the time period S would be compared to a predetermined value. If the time period S is greater than the predetermined time period, the method loops back to step S1210 and the compressing steps continue.

If the time period S is less than the predetermined time period, the controller determines that the dust collection unit may be full. The method would then continue to step S1230 where a check is performed to see if the time period S has been judged to be less than the predetermined period of time for a predetermined number of checks. If not, the method loops back to step S1210. If the time period S has been smaller than the predetermined time period for a predetermined number of checks, the controller determines that the dust collection unit is full, and the method proceeds to steps S1240 where the indicator is activated to inform the user that the dust collection unit needs to be emptied.

In some embodiments, the check performed in step S1230 might be skipped. Thus, the first time that the time period S is less than the predetermined time period, the method would proceed to step S1240 and the indicator would be activated.

However, the check performed in step S1230 may be helpful in preventing a false determination that the dust collection unit is full. For instance, the compressing plate might be halted after less than a full sweep in one direction by factors other than a full dust collection unit. A dust particle might be trapped between the dust container and the compressing plate to prevent normal movement of the compressing plate. In this case, the moving time (S) of the first pressing plate 310 may be artificially reduced. To prevent a false full indication, the checking step S1230 ensures that the movement time period S must be smaller than the predetermined time period for multiple successive sweeps of the compressing plate.

Figure 38:
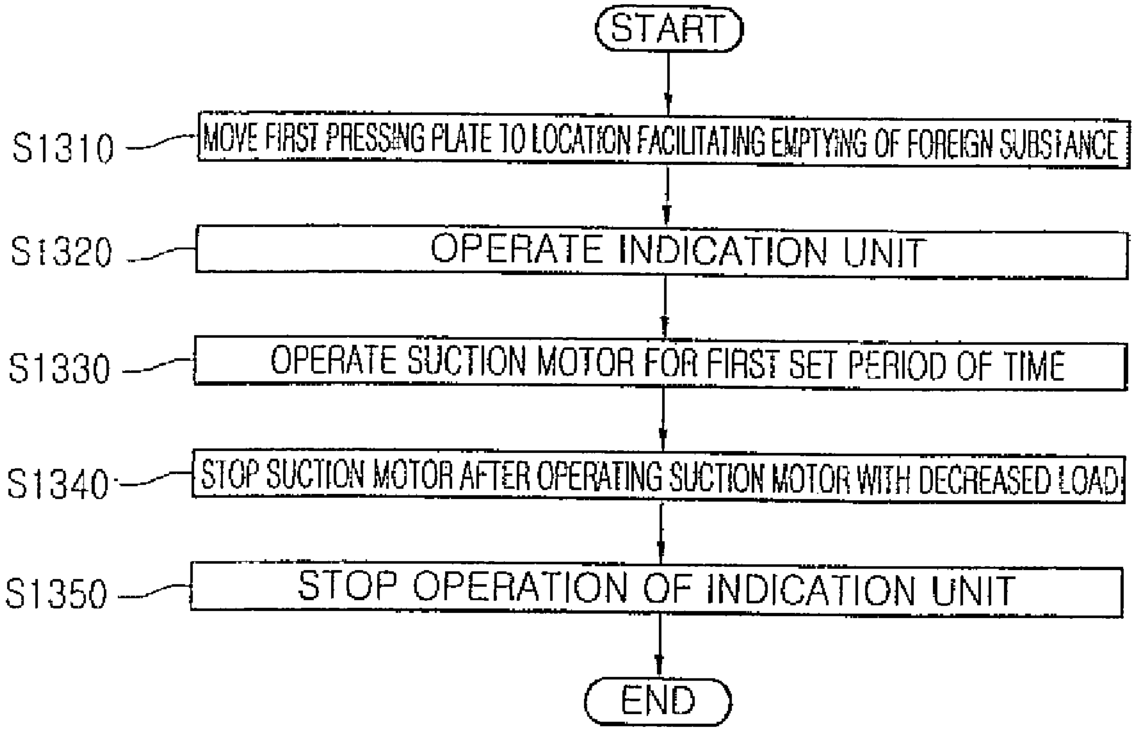
FIG. 38 illustrates a method of stopping a vacuum cleaner when the dust collection unit becomes full.

FIG. 38 illustrates a method that a vacuum cleaner would perform when the dust collection unit is full and needs to be emptied. First, in step S1310, the pressing plate would be moved to a position that facilitates emptying of the dust collection unit. The pressing plate could be rotated to a location that is about 180 apart from a stationary pressing plate 320. That is, the pressing plate is moved to the maximum distance from the stationary pressing plate 320 In other embodiments, the pressing plate may be stopped after it has moved for half of the most recently noted travel time period S discussed above. In this case, the pressing plate would be positioned approximately equi-distant from the opposite ends of the collected and compressed dust.

Next, in step S1320, the indicator would be activated. In the case of an indicator light, the lights may be repetitively turned ON and OFF so that user can easily recognize the signal. If the indicator includes a speaker, the speaker may output a buzzing sound or a melody.

Next, in step S1330, a suction motor of the vacuum cleaner would be operated at a predetermined load level for a first set period of time. After the suction motor is operated for the first set period of time at the first load level, in step S1340, the operational load of the suction motor is decreased to a different lower predetermined value. The suction motor is operated at the decreased load level for a second set period of time, and is then shut off. Operation of the suction motor at the two different load levels, before shutting it off, is a signal to the user that the vacuum cleaner is being shut down because the dust collector is full. If this was not done, the user might incorrectly conclude that the vacuum cleaner was simply broken. When the operation of the suction motor is stopped, in step S1350, the operation of the indicator(s) is also stopped.

U.S. Pat. Nos. 6,974,488, 6859,975, 6,782,584, 6,766,558, 6,732,406, 6,601,265, 6,553,612, 6,502,277, 6,391,095, 6,168,641, and 6,090,174 all disclose various types of vacuum cleaners. The methods and devices described above would all be applicable and useful in the vacuum cleaners described in these patents. The disclosure of all of the above-listed patents is hereby incorporated by reference.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A vacuum cleaner, comprising:
- a main body having a suction motor;
- a dust separator that communicates with the main body and that separates dust and dirt from a suction air stream, the dust separator including an air inlet and an air outlet;
- a filter located in the dust separator;
- a dust container located under the dust separator and detachably mounted to the main body, that stores dust separated the dust separator;
- a dividing plate that partitions an inner space of the dust separator from an inner space of the dust container;
- at least one plate provided in the dust container; and
- a drive mechanism comprising at least one gear coupled to the at least one plate and configured to drive the at least one plate.

2. The vacuum cleaner according to claim 1, wherein the least one plate is rotatably mounted in the dust container and the drive mechanism is configured to rotate the at least one plate.

3. The vacuum cleaner according to claim 1, wherein the dividing plate is located at an upper portion of the at least one plate.

4. The vacuum cleaner according to claim 1, wherein the dust container is detachably coupled to the dust separator.

5. The vacuum cleaner according to claim 1, wherein the dividing plate includes at least one opening configured to communicate the inner space of dust separator with the inner space of the dust container.

6. The vacuum cleaner according to claim 5, wherein the opening is formed from an edge of the dividing plate towards a center thereof.

7. The vacuum cleaner according to claim 1, wherein the at least one plate comprises a first movable plate and a second fixed plate that interacts with the first movable plate to compress dust in the dust container, wherein the fixed plate is fixed to the dust container, and wherein an upper end of the fixed plate is formed to be proximal to a bottom surface of the dividing plate.

8. The vacuum cleaner according to claim 1, wherein a case of the dust separator is similar in shape to a case of the dust container.

9. The vacuum cleaner according to claim 1, wherein the at least one gear includes a first gear and a second gear engaged with the first gear and connected to the at least one plate.

10. The vacuum cleaner according to claim 9, wherein the first gear is driven by a motor.

11. The vacuum cleaner according to claim 9, where the first gear is driven by operation of a lever by a user.

12. The vacuum cleaner according to claim 11, wherein the first gear mates with a rack provided on a connecting part attached to the lever.

13. A vacuum cleaner, comprising:
- a main body having a suction motor;
- a dust separator that communicates with the main body and that separates dust and dirt from a suction air stream, the dust separator including an air inlet and an air outlet;
- a dust container located under the dust separator and detachably mounted to the main body, that stores dust separated from the dust separator;
- a first plate movably provided in the dust container;
- a second plate fixedly provided in the dust container and configured to compress the dust together with the first plate;
- a dividing plate configured to cover at least a portion of an upper part of the second plate; and
- a drive mechanism comprising at least one gear coupled to the first plate and configured to drive the first plate.

14. The vacuum cleaner according to claim 13, wherein the first plate is rotatably mounted in the dust container and the drive mechanism is configured to rotate the first plate.

15. The vacuum cleaner according to claim 13, wherein the dividing plate includes at least one opening formed at an outer edge thereof, and wherein the dust separated in the dust separator is discharged to the dust container through the opening.

16. The vacuum cleaner according to claim 15, wherein the opening is located at a side of an inner space of the dust container that is opposite to a location of the second plate.

17. The vacuum cleaner according to claim 13, wherein the dust container includes a bottom wall provided under the first and second plates, and wherein the first plate or the driving mechanism is mounted on the bottom wall.

18. The vacuum cleaner according to claim 13, wherein the first plate is connected to a rotating shaft and the dividing plate covers an upper portion of the rotating shaft.

19. The vacuum cleaner according to claim 13, wherein a case of the dust separator is similar in shape to a case of the dust container.

20. The vacuum cleaner according to claim 13, wherein the at least one gear includes a first gear and a second gear engaged with the first gear and connected to the at least one plate.

21. The vacuum cleaner according to claim 20, wherein the first gear is driven by a motor.

22. The vacuum cleaner according to claim 20, where the first gear is driven by operation of a lever by a user.

23. The vacuum cleaner according to claim 22, wherein the first gear mates with a rack provided on a connecting part attached to the lever.

24. A vacuum cleaner, comprising:

a main body having a suction motor;

a dust separator that communicates with the main body and that separates dust and dirt from a suction air stream, the dust separator including an air inlet and an air outlet;

a dust container located under the dust separator and detachably mounted to the main body, that stores dust separated from the dust separator;

a dividing plate that partitions an inner space of the dust separator from an inner space of the dust container;

at least one plate provided under the dividing plate; and a drive mechanism comprising at least one gear coupled to the at least one plate and configured to drive the at least one plate, wherein the dividing plate includes an opening configured to communicate the dust separator with the dust container.

25. The vacuum cleaner according to claim 1, wherein the least one plate is rotatably mounted in the dust container and the drive mechanism is configured to rotate the at least one plate.

26. The vacuum cleaner according to claim 24, wherein the at least one plate is connected to a rotational shaft so that the at least one plate is rotatable with respect to the dust container, and wherein the opening in the dividing plate is spaced apart from a center line of the rotational shaft.

27. The vacuum cleaner according to claim 15, wherein the at least one plate comprising a first movable plate and a second fixed plate provided in an approximate radial disposition between the inner surface of the dust container and the rotational shaft of the first movable plate.

28. The vacuum cleaner according to claim 24, wherein the at least one gear comprises a first gear and a second gear engaged with the first gear and connected to the at least one plate.

29. The vacuum cleaner according to claim 28, wherein the first gear is driven by a motor.

30. The vacuum cleaner according to claim 28, where the first gear is driven by operation of a lever by a user.

31. The vacuum cleaner according to claim 30, wherein the first gear mates with a rack provided on a connecting part attached to the lever.

32. The vacuum cleaner according to claim 28, wherein the first gear has more teeth than the second gear to rotate the at least one plate to exceed an angle to which the first gear is rotated.

33. The vacuum cleaner according to claim 28, wherein the first gear and the second gear are provided under the dust container.

34. A vacuum cleaner, comprising:

a main body having a suction motor;

a dust separator that communicates with the main body and that separates dust and dirt from a suction air stream, the dust separator including an air inlet and an air outlet;

a filter located in the dust separator;

a dust container located under the dust separator and detachably mounted to the main body, that stores dust separated the dust separator;

a dividing plate that partitions an inner space of the dust separator from an inner space of the dust container;

a first plate having a rotational axis;

a second plate fixedly coupled to the dust container to remain in a stationary position, wherein the rotational axis of the first plate is disposed adjacent one end of the second plate;

a first gear coupled to the rotational shaft and having a first radius; and a second gear engaged with the first gear and having a second radius, wherein the second radius is at least two times larger that the first radius.

35. A vacuum cleaner, comprising:

a main body having a suction motor;

a dust separator that communicates with the main body and that separates dust and dirt from a suction air stream, the dust separator including an air inlet and an air outlet;

a filter located in the dust separator;

a dust container located under the dust separator and detachably mounted to the main body, that stores dust separated the dust separator;

a dividing plate that partitions an inner space of the dust separator from an inner space of the dust container;

a first plate having a rotational axis;

a second plate fixed coupled to the dust container to remain in a stationary position;

a first gear coupled to the rotational shaft to rotate the first plate;

a second gear engaged with the first gear; and a plate with a rod extending therefrom, wherein a width of the plate is larger than a diameter of the second gear and wherein a movement of the rod in a first predetermined direction rotates the second gear in a second predetermined direction.

36. The vacuum cleaner according to claim 34, wherein the second predetermined direction is a forward or backward direction.

* * * * *